(12) United States Patent
Genko et al.

(10) Patent No.: US 8,635,993 B2
(45) Date of Patent: Jan. 28, 2014

(54) AIR-FUEL RATIO CONTROL DEVICE OF INTERNAL COMBUSTION ENGINE

(75) Inventors: Takeshi Genko, Toyota (JP); Kenya Maruyama, Toyota (JP); Tsukasa Abe, Susono (JP); Yousuke Matsumoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/595,485

(22) Filed: Aug. 27, 2012

(65) Prior Publication Data

US 2013/0054114 A1    Feb. 28, 2013

(30) Foreign Application Priority Data

Aug. 29, 2011    (JP) .................. 2011-186042

(51) Int. Cl.
F02B 47/08       (2006.01)
F02D 41/00       (2006.01)

(52) U.S. Cl.
USPC ....... 123/568.11; 123/698; 123/673; 701/108

(58) Field of Classification Search
USPC ......... 123/673, 698, 568.11, 568.16; 701/108
See application file for complete search history.

(56) References Cited

U.S. PATENT DOCUMENTS

| | | | | |
|---|---|---|---|---|
| 5,806,506 A | * | 9/1998 | Kitamura et al. | 123/673 |
| 7,027,910 B1 | * | 4/2006 | Javaherian et al. | 701/111 |
| 7,497,210 B2 | * | 3/2009 | Okamoto | 123/673 |
| 7,519,467 B2 | * | 4/2009 | Katoh | 701/103 |
| 7,603,994 B2 | * | 10/2009 | Ueda | 123/673 |
| 7,762,244 B2 | * | 7/2010 | Aliakbarzadeh | 123/693 |
| 7,921,707 B2 | | 4/2011 | Ishizuka et al. | |
| 8,510,017 B2 | * | 8/2013 | Sawada et al. | 701/103 |
| 2011/0174282 A1 | | 7/2011 | Maruyama et al. | |
| 2013/0006505 A1 | * | 1/2013 | Shinagawa et al. | 701/108 |
| 2013/0006506 A1 | * | 1/2013 | Takada et al. | 701/108 |

FOREIGN PATENT DOCUMENTS

| | | |
|---|---|---|
| JP | 2004-245118 A | 9/2004 |
| JP | 2008-038785 A | 2/2008 |
| JP | 2009-108713 A | 5/2009 |
| JP | 2011-144785 A | 7/2011 |

* cited by examiner

Primary Examiner — Thomas Moulis
(74) Attorney, Agent, or Firm — Gifford, Krass, Sprinkle, Anderson & Citkowski, P.C.

(57) ABSTRACT

The invention relates to an air-fuel ratio control device of an internal combustion engine, comprising a plurality of means for independently introducing into each combustion chamber an exhaust gas discharged from combustion chambers to an exhaust passage. When at least one exhaust gas introduction means is under an exhaust gas introduction shortage state, a target value of an air-fuel ratio of a mixture gas is changed depending on whether an exhaust gas introduction control for introducing the exhaust gas into the combustion chamber by the exhaust gas introduction means is performed.

12 Claims, 22 Drawing Sheets

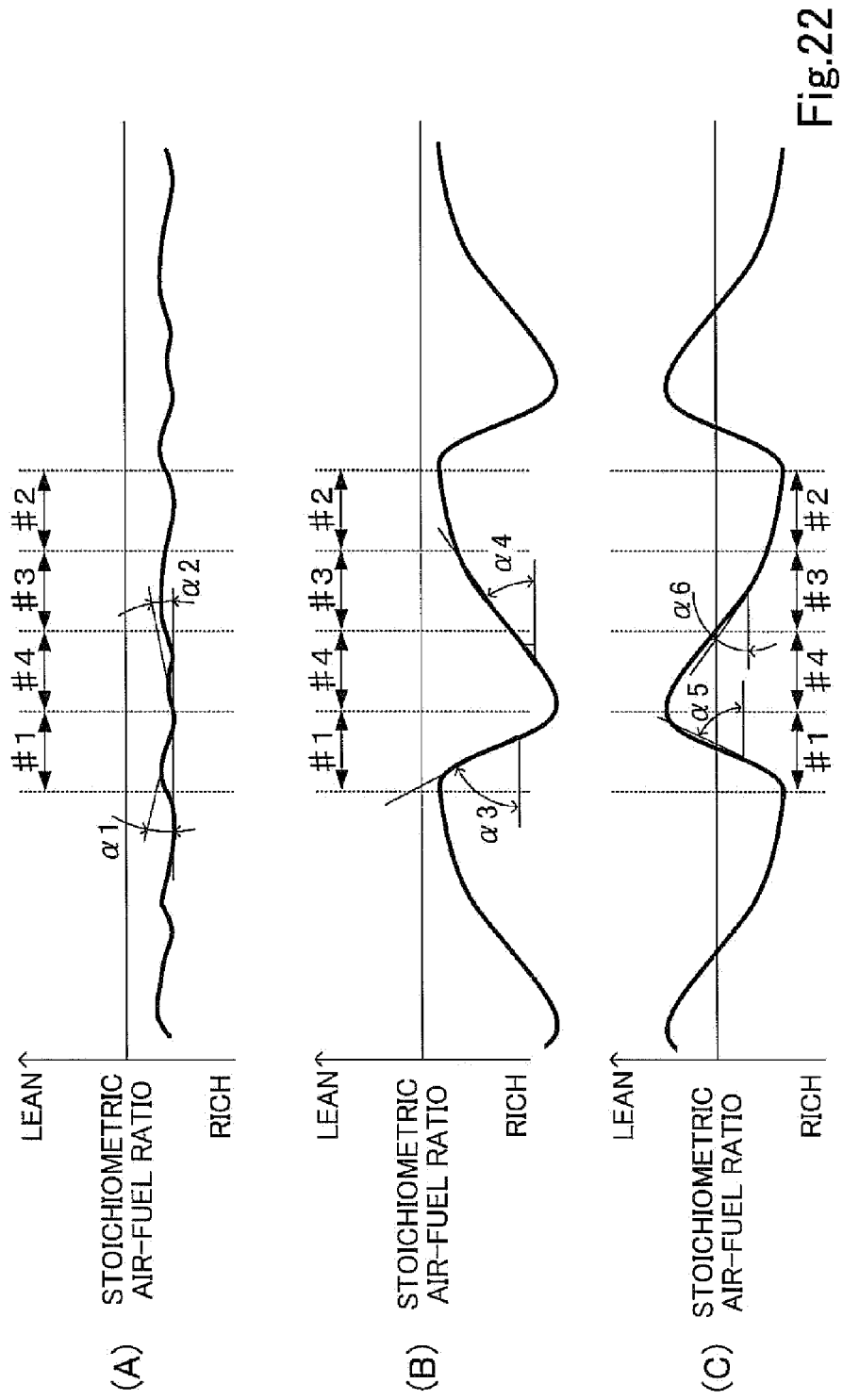

AIR-FUEL RATIO CONTROL DEVICE OF INTERNAL COMBUSTION ENGINE

CROSS-REFERENCE TO RELATED APPLICATIONS

This application claims priority to Japanese Patent Application No. 2011-186042, filed Aug. 29, 2011, which is herein incorporated by reference in its entirety including the specification, drawings, and abstract.

TECHNICAL FIELD

This invention relates to an air-fuel ratio control device of an internal combustion engine.

BACKGROUND ART

An air-fuel ratio control device of an internal combustion engine comprising combustion chambers and fuel injectors each arranged corresponding to each combustion chamber is described in the unexamined Japanese Patent Publication No. 2008-38785. In this air-fuel ratio control device, an air-fuel ratio of a mixture gas formed in each combustion chamber is estimated, the average value of the estimated air-fuel ratios is calculated as an average air-fuel ratio, this calculated average air-fuel ratio is set as a target air-fuel ratio, and the air-fuel ratio of the mixture gas formed in each combustion chamber is controlled to the target air-fuel ratio by amending an amount of a fuel supplied from each fuel injector to the corresponding combustion chamber such that the air-fuel ratio of the mixture gas formed in each combustion chamber becomes the target air-fuel ratio.

SUMMARY OF INVENTION

1. Technical Problem

An exhaust gas recirculation device for introducing into an intake passage an exhaust gas discharged from the combustion chambers to an exhaust passage to introduce the exhaust gas into the combustion chambers is known. For the exhaust gas recirculation device, there is an exhaust gas recirculation device of an internal combustion engine comprising a plurality of combustion chambers for independently introducing the exhaust gas into each combustion chamber by introducing into the intake passage corresponding to each combustion chamber the exhaust gas discharged from the combustion chambers to the exhaust passage. In the case that the engine comprises such an exhaust gas recirculation device, for example, if a state in which no exhaust gas is introduced into at least one of the combustion chambers when the exhaust gas should be introduced into each combustion chamber occurs by an error of the exhaust gas recirculation device, an amount of air introduced into this combustion chamber becomes larger than the amount of the air introduced into the remaining combustion chambers and therefore, an air-fuel ratio of a mixture gas formed in this combustion chamber becomes larger than that formed in each remaining combustion chamber (i.e., becomes a lean air-fuel ratio). On the other hand, for example, if a state in which the exhaust gas is introduced into at least one of the combustion chambers when the exhaust gas should not be introduced into each combustion chamber occurs, the amount of the air introduced in this combustion chamber becomes smaller than the amount of the air introduced into each remaining combustion chamber and therefore, the air-fuel ratio of the mixture gas formed in this combustion chamber becomes smaller than that formed in each remaining combustion chamber (i.e., becomes a rich air-fuel ratio).

If the concept regarding the setting of the target air-fuel ratio described in the Unexamined Japanese Patent Publication No. 2008-38785 is applied to the above-mentioned situation, the average air-fuel ratio (i.e., the average value of the air-fuel ratios of the mixture gases formed in the combustion chambers) is set as the target air-fuel ratio and then, the air-fuel ratio of the mixture gas formed in each combustion chamber is controlled to this set target air-fuel ratio. In this regard, it cannot be said that the thus set target air-fuel ratio is, for example, a target air-fuel ratio for maintaining a property regarding an emission in the exhaust gas discharged from the combustion chambers high (hereinafter, this property will be referred to as—exhaust emission property—). This is because the variation occurring between the air-fuel ratios of the mixture gases formed in the combustion chambers includes a variation derived from an error of the exhaust gas recirculation device.

Further, in the air-fuel ratio control device described in the Unexamined Japanese Patent Publication No. 2008-38785, an amendment value is prepared for amending an amount of the fuel supplied to each combustion chamber so as to dissolve the variation between the air-fuel ratios of the mixture gases formed in the combustion chambers. Therefore, when the variation occurs between the air-fuel ratios of the mixture gases formed in the combustion chambers due to the error of the exhaust gas recirculation device, the above-mentioned amendment value is corrected so as to dissolve such a variation. However, it cannot be said that the thus corrected amendment value is, for example, an amendment value for amending the air-fuel ratio formed in each combustion chamber (concretely, the amount of the fuel supplied to each combustion chamber) so as to maintain the exhaust emission property high. This is because the variation occurring between the air-fuel ratios of the mixture gases formed in the combustion chambers include the variation derived from the error of the exhaust gas recirculation device.

Under the circumstances, the object of the invention is to set a target air-fuel ratio or an amendment value regarding the air-fuel ratio of the mixture gas so as to maintain the exhaust emission property high in the engine comprising the above-mentioned exhaust gas recirculation device and thereby, maintain the exhaust emission property high.

2. Solution to Problem

The invention of this application relates to an air-fuel ratio control device of an internal combustion engine, comprising a plurality of exhaust gas introduction means for independently introducing into each combustion chamber an exhaust gas discharged from combustion chambers to an exhaust passage. In this invention, when at least one exhaust gas introduction means is under an exhaust gas introduction shortage state in which an amount of the exhaust gas which can be introduced into the corresponding combustion chamber is smaller than a target amount thereof, a target value of an air-fuel ratio of a mixture gas formed in the combustion chamber is changed depending on whether an exhaust gas introduction control for introducing the exhaust gas into the combustion chamber by the exhaust gas introduction means is performed.

According to this invention, the following effect can be obtained. That is, when at least one exhaust gas introduction means is under the exhaust gas introduction shortage state, even if the exhaust gas having a predetermined amount is intended to be introduced into each combustion chamber, the exhaust gas having an amount smaller than the predetermined amount is introduced into at least one combustion chamber.

In this regard, when the exhaust gas having a predetermined amount is intended to be introduced into each combustion chamber, however, the exhaust gas having an amount smaller than the predetermined amount is introduced into a certain combustion chamber (hereinafter, this combustion chamber will be referred to as—particular combustion chamber—), the amount of the exhaust gas introduced into the particular combustion chamber becomes smaller than that introduced into the remaining combustion chamber and as a result, the amount of the air introduced into the particular combustion chamber becomes larger than that introduced into the remaining combustion chamber. Thus, the air-fuel ratio of the mixture gas formed in the particular combustion chamber becomes larger than that formed in the remaining combustion chamber (i.e., becomes lean). Otherwise, depending on the situation other than the amount of the air introduced into each combustion chamber, the air-fuel ratio of the mixture gas formed in the particular combustion chamber may become smaller than that formed in the remaining combustion chamber (i.e., may become rich). In any event, when the exhaust gas having the predetermined amount is intended to be introduced into each combustion chamber, however, the exhaust gas having an amount smaller than the predetermined amount is introduced into the particular combustion chamber, the air-fuel ratio of the mixture gas formed in the particular combustion chamber is different from that formed in the remaining combustion chamber.

Then, when at least one exhaust gas introduction means is under the exhaust gas introduction shortage state and the air-fuel ratio of the mixture gas formed in the particular combustion chamber is different from that formed in the remaining combustion chamber, the exhaust gas introduction control is performed. That is, whether the air-fuel ratio of the mixture gas formed in the particular combustion chamber is different from that formed in the remaining combustion chamber when at least one exhaust gas introduction means is under the exhaust gas introduction shortage state depends on whether the exhaust gas introduction control is performed.

In this regard, in this invention, when at least one exhaust gas introduction means is under the exhaust gas introduction shortage state, the target value of the air-fuel ratio of the mixture gas formed in the combustion chamber is changed, depending on whether the exhaust gas introduction control is performed. Thus, according to this invention, even when at least one exhaust gas introduction means is under the exhaust gas introduction shortage state, the effect that the exhaust emission property is maintained high can be obtained.

It should be noted that in this invention, when at least one exhaust gas introduction means is under the exhaust gas introduction shortage state and the exhaust gas introduction control is performed, the exhaust gas introduction control may be stopped. In this case, the following effect can be obtained. That is, if the exhaust gas introduction control has been stopped when at least one exhaust gas introduction means is under the exhaust gas introduction shortage state, no variation derived from the variation between the amounts of the exhaust gases introduced into the combustion chambers occurs between the air-fuel ratios of the mixture gases formed in the combustion chambers. Therefore, by stopping the exhaust gas introduction control when at least one exhaust gas introduction means is under the exhaust gas introduction shortage state, the effect that the exhaust emission property is maintained high can be obtained.

Further, another invention of this application relates to an air-fuel ratio control device of an internal combustion engine comprising a plurality of exhaust gas introduction means for independently introducing into each combustion chamber an exhaust gas discharged from the combustion chambers to an exhaust passage. Then, in this invention, when at least one exhaust gas introduction means is under an exhaust gas introduction shortage state in which an amount of the exhaust gas which can be introduced into the corresponding combustion chamber is smaller than its target amount and an exhaust gas introduction control for introducing the exhaust gas into the combustion chamber by the exhaust gas introduction means, the air-fuel ratio of the mixture gas is controlled by changing a target value of the air-fuel ratio of the mixture gas formed in the combustion chamber. On the other hand, in this invention, when at least one exhaust gas introduction means is under the exhaust gas introduction shortage state and the exhaust gas introduction control is not performed, the air-fuel ratio of the mixture gas is controlled using an amendment coefficient obtained when all exhaust gas introduction means are not under the exhaust gas introduction shortage state without changing the target value of the mixture gas.

According to this invention, the following effect can be obtained. That is, as explained above, whether the air-fuel ratio of the mixture gas formed in the particular combustion chamber is different from that formed in the remaining combustion chamber when at least one exhaust gas introduction means is under the exhaust gas introduction shortage state depends on whether the exhaust gas introduction control is performed.

In this regard, in this invention, when at least one exhaust gas introduction means is under the exhaust gas introduction shortage state and the exhaust gas introduction control is performed, the air-fuel ratio of the mixture gas is controlled by changing the target value of the air-fuel ratio of the mixture gas formed in the combustion chamber. Thus, according to this invention, even when at least one exhaust gas introduction means is under the exhaust gas introduction shortage state and the exhaust gas introduction control is performed, the effect that the exhaust emission property is maintained high can be obtained.

Further, although at least one exhaust gas introduction means is under the exhaust gas introduction shortage state and therefore, at least one exhaust gas introduction means can introduce only exhaust gas having an amount smaller than the predetermined amount, if the exhaust gas introduction control is not performed, no variation derived from the variation between the amounts of the exhaust gases introduced into the combustion chambers occurs between the air-fuel ratios of the mixture gases formed in the combustion chambers. That is, the matter causing the variation between the air-fuel ratios of the mixture gases formed in the combustion chambers when at least one exhaust gas introduction means is under the exhaust gas shortage state and the exhaust gas introduction control is not performed is an error relative to the suitable amendment coefficient included in the current amendment coefficient. Then, it can be said that the amendment coefficient when all exhaust gas introduction means are not under the exhaust gas introduction shortage state is the suitable amendment coefficient as the amendment coefficient used when at least one exhaust gas introduction means is under the exhaust gas introduction shortage state and the exhaust gas introduction control is not performed.

In this regard, in this invention, when at least one exhaust gas introduction means is under the exhaust gas introduction shortage state and the exhaust gas introduction control is not performed, the air-fuel ratio of the mixture gas is controlled using the amendment coefficient when all exhaust gas introduction means are not under the exhaust gas introduction shortage state without changing the target value of the air-fuel ratio of the mixture gas. Thus, according to this invention, the effect that the exhaust emission property is maintained high when at least one exhaust gas introduction means is under the exhaust gas introduction shortage state and the exhaust gas introduction control is not performed can be obtained.

It should be noted that in the invention, when at least one exhaust gas introduction means is under the exhaust gas introduction shortage state and the exhaust gas introduction control is performed, the exhaust gas introduction control may be stopped. In this case, the following effect can be obtained. That is, as explained above, if the exhaust gas introduction control has been stopped when at least one exhaust gas introduction means is under the exhaust gas introduction shortage state, no variation derived from the variation between the amounts of the exhaust gases introduced into the combustion chambers occurs between the air-fuel ratios of the mixture gases formed in the combustion chambers. Therefore, by stopping the exhaust gas introduction control when at least one exhaust gas introduction means is under the exhaust gas introduction shortage state and the exhaust gas introduction control is performed, the effect that the exhaust emission property is maintained high can be obtained.

Further, another invention of this application relates to an air-fuel ratio control device of an internal combustion engine, comprising a plurality of exhaust gas introduction means for independently introducing into each combustion chamber an exhaust gas discharged from combustion chambers to an exhaust passage. In this invention, when at least one exhaust gas introduction means is under an exhaust gas introduction shortage state in which an amount of the exhaust gas which can be introduced into the corresponding combustion chamber is smaller than a target amount thereof and an exhaust gas introduction control for introducing the exhaust gas into the combustion chamber by the exhaust gas introduction means is performed, an air-fuel ratio of a mixture gas formed in the combustion chamber is controlled by changing a target value of the air-fuel ratio of the mixture gas. Further, in this invention, when at least one exhaust gas introduction means is under the exhaust gas introduction shortage state, the exhaust gas introduction control is not performed and an amendment coefficient for amending the air-fuel ratio of the mixture gas to control the air-fuel ratio of the mixture gas to the target value thereof is a value for compensating a stationary deviation of the air-fuel ratio, the air-fuel ratio is controlled using the amendment coefficient without changing the target value of the air-fuel ratio of the mixture gas. On the other hand, in this invention, when at least one exhaust gas introduction means is under the exhaust gas introduction shortage state, the exhaust gas introduction control is not performed and the amendment coefficient is not a value for compensating a stationary deviation of the air-fuel ratio, the air-fuel ratio of the mixture gas is controlled using the amendment coefficient obtained when all of the exhaust gas introduction means are not under the exhaust gas introduction shortage state without changing the target value of the air-fuel ratio of the mixture gas.

According to this invention, the following effect can be obtained. That is, as explained above, whether the air-fuel ratio of the mixture gas formed in the particular combustion chamber is different from that formed in the remaining combustion chamber when at least one exhaust gas introduction means is under the exhaust gas introduction shortage state depends on whether the exhaust gas introduction control is performed.

In this regard, in this invention, when at least one exhaust gas introduction means is under the exhaust gas introduction shortage state and the exhaust gas introduction control is performed, the air-fuel ratio of the mixture gas is controlled by changing the target value of the air-fuel ratio of the mixture gas formed in the combustion chamber. Thus, according to this invention, even when at least one exhaust gas introduction means is under the exhaust gas introduction shortage state and the exhaust gas introduction control is performed, the effect that the exhaust emission property is maintained high can be obtained.

Further, even when at least one exhaust gas introduction means is under the exhaust gas introduction shortage state and therefore, at least one exhaust gas introduction means introduces only the exhaust gas having an amount smaller than the predetermined amount into the combustion chamber, if the exhaust gas introduction control is not performed, no variation derived from the variation between the amounts of the exhaust gases introduced into the combustion chambers occurs between the air-fuel ratios of the mixture gases formed in the combustion chambers. That is, the matter causing the variation between the air-fuel ratios of the mixture gases formed in the combustion chambers when at least one exhaust gas introduction means is under the exhaust gas introduction shortage state and the exhaust gas introduction control is not performed is the error relative to the suitable amendment coefficient included in the current amendment coefficient.

In this regard, in this invention, when at least one exhaust gas introduction means is under the exhaust gas introduction shortage state, the exhaust gas introduction control is not performed and the amendment coefficient has become a value for compensating the stationary deviation of the air-fuel ratio, the air-fuel ratio of the mixture gas is controlled using the above-mentioned amendment coefficient without changing the target value of the air-fuel ratio of the mixture gas. Thus, according to this invention, when at least one exhaust gas introduction means is under the exhaust gas introduction shortage state, the exhaust gas introduction control is not performed and the amendment coefficient has become a value for compensating the stationary deviation of the air-fuel ratio, the effect that the exhaust emission is maintained high can be obtained.

On the other hand, when at least one exhaust gas introduction means is under the exhaust gas introduction shortage state, the exhaust gas introduction control is not performed and the amendment coefficient is not a value so as to compensate the stationary deviation of the air-fuel ratio, the air-fuel ratio of the mixture gas is controlled using the above-mentioned amendment coefficient when all exhaust gas introduction means is not under the exhaust gas introduction shortage state without changing the target value of the air-fuel ratio of the mixture gas. As explained above, it can be said that the amendment coefficient when all exhaust gas introduction means are under the exhaust gas introduction shortage state is an amendment coefficient suitable for an amendment coefficient used when at least one exhaust gas introduction means is under the exhaust gas introduction shortage state, the exhaust gas introduction control is not performed and the amendment coefficient is not a value so as to compensate the stationary deviation of the air-fuel ratio. Therefore, according to this invention, even when at least one exhaust gas introduction means is under the exhaust gas introduction shortage state, the exhaust gas introduction control is not performed and the amendment value is not a value so as to compensate the stationary deviation of the air-fuel ratio, the effect that the exhaust emission property is maintained high can be obtained.

It should be noted that in the invention, when at least one exhaust gas introduction means is under the exhaust gas introduction shortage state and the exhaust gas introduction control is performed, the performance of the exhaust gas introduction control may be stopped. In this case, the following effect can be obtained. That is, as explained above, if the exhaust gas introduction control has been stopped when at least one exhaust gas introduction means is under the exhaust gas introduction shortage state, no variation derived from the variation between the amounts of the exhaust gases introduced into the combustion chambers occurs between the air-fuel ratios of the mixture gases formed in the combustion chambers. Therefore, by stopping the exhaust gas introduction control when at least one exhaust gas introduction means is under the exhaust gas introduction shortage state and the exhaust gas introduction control is performed, the effect that the exhaust emission property is maintained high can be obtained.

BRIEF DESCRIPTION OF DRAWINGS

FIG. 22(A) is a view showing a movement of an output value from the upstream air-fuel ratio sensor when an air-fuel ratio of a mixture gas is controlled to an air-fuel ratio richer than the stoichiometric air-fuel ratio by a feedback control and all of the fuel injectors are under the normal state, FIG. 22(B) is a view showing a movement of the output value from the upstream air-fuel ratio sensor when the air-fuel ratio of the mixture gas is controlled to the air-fuel ratio richer than the stoichiometric air-fuel ratio by the feedback control, the injector corresponding to a first cylinder #1 is under an abnormal state in which the fuel of an amount larger than the command fuel injection amount is injected and the remaining injector are under the normal state, and FIG. 22(C) is a view showing a movement of the output value from the upstream air-fuel ratio sensor when the air-fuel ratio of the mixture gas is controlled to the air-fuel ratio richer than the stoichiometric air-fuel ratio by the feedback control, the injector corresponding to the first cylinder #1 is under an abnormal state in which the fuel of an amount smaller than the command fuel injection amount is injected and the remaining injectors are under the normal state.

DESCRIPTION OF EMBODIMENTS

Figure 1:
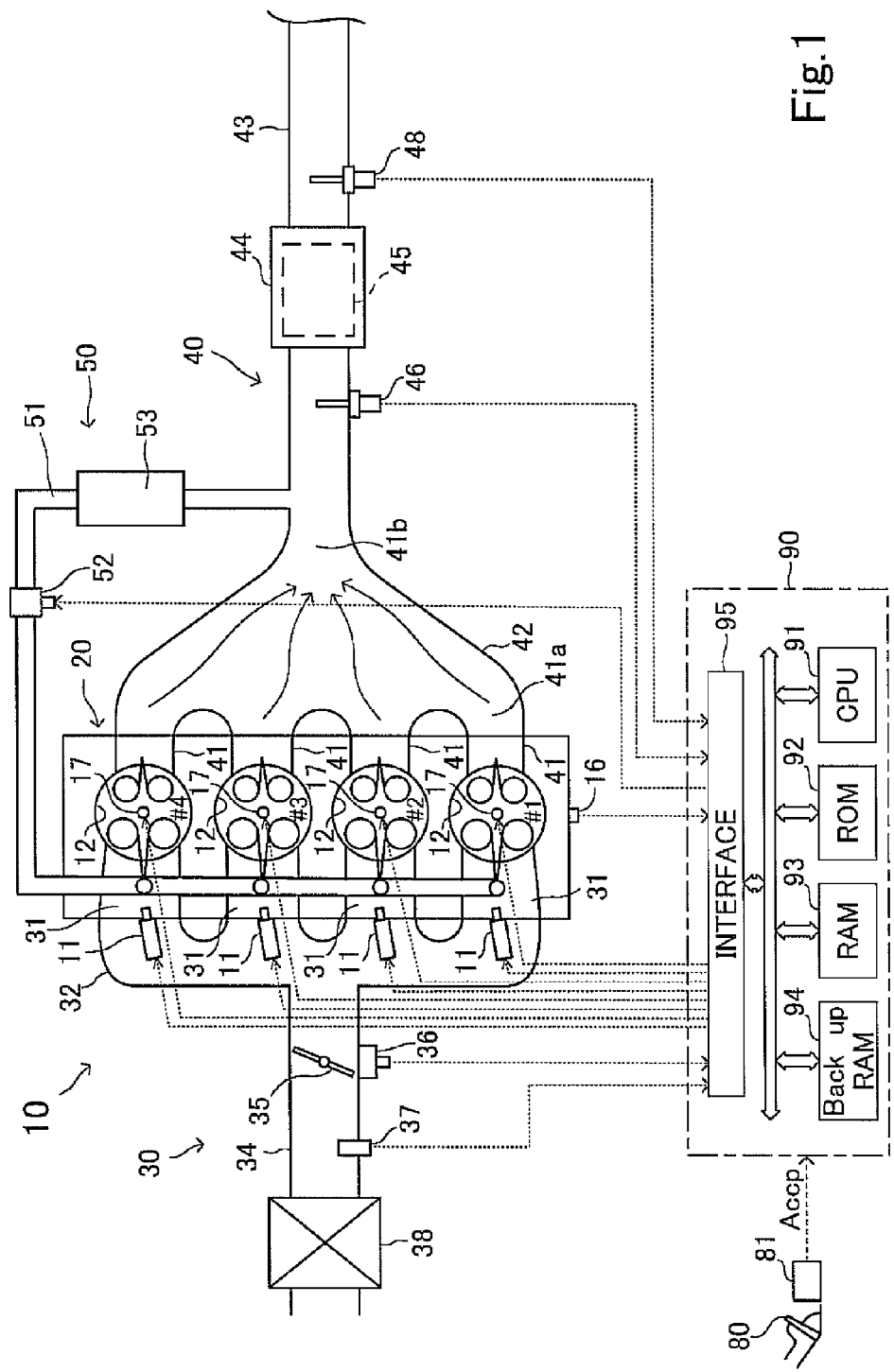
FIG. 1 is a view showing an internal combustion engine which an air-fuel ratio control device according to a first embodiment is applied.

Below, the embodiment of the invention will be explained. An internal combustion engine which the air-fuel ratio control device of the first embodiment of the invention is applied is shown in FIG. 1. The engine 10 shown in FIG. 1 is a spark ignition type of the engine (a so-called gasoline engine). In FIG. 1, 11 denotes fuel injectors, 12 denotes combustion chambers, 16 denotes a crank position sensor, 17 denotes spark plugs, 20 denotes a body of the engine, 80 is an acceleration pedal and 81 denotes an acceleration pedal depression amount sensor.

Further, in FIG. 1, 30 denotes an intake passage, 31 denotes intake ports, 32 denotes an intake manifold, 34 denotes an intake pipe, 35 denotes a throttle valve, 36 denotes an actuator for driving the throttle valve 35, 37 denotes an air flow meter, 38 denotes an air cleaner, 40 denotes an exhaust passage, 41 denotes exhaust ports, 42 denotes an exhaust manifold, 43 denotes an exhaust pipe, 44 denotes a catalyst converter, 46 denotes an air-fuel ratio sensor, 48 denotes an air-fuel ratio sensor and 50 denotes an exhaust gas re-circulation device. It should be noted that the intake passage 30 is constituted by the intake ports 31, the intake manifold 32 and the intake pipe 34. On the other hand, the exhaust passage 40 is constituted by the exhaust ports 41, the exhaust manifold 42 and the exhaust pipe 43.

An electronic control unit 90 is constituted by a microcomputer. Further, the unit 90 has a CPU (a microprocessor) 91, a ROM (a read only memory) 92, a RAM (a random access memory) 93, a back-up RAM 94 and an interface 95. The CPU 91, the ROM 92, the RAM 93, the back-up RAM 94 and the interface 95 are connected to each other by a bidirectional bus.

Next, each of the above-mentioned elements of the engine will be explained in detail. It should be noted that in the following explanation, a "mixture gas" means a—gas formed in the combustion chamber and having mixture gas of an air and a fuel, a "engine speed" means a—speed of the engine—, a "throttle valve opening degree" means an—opening degree of the throttle valve—, an "intake air amount" means an—amount of the air sucked into the combustion chamber—, an "acceleration pedal depression amount" means a—depression amount of the acceleration pedal—and a "required engine torque" means a—torque required as a torque output from the engine—.

The engine 10 comprises four combustion chambers and four fuel injectors 11. The fuel injectors 11 are arranged on the body 20 of the engine such that a fuel injection hole of each of the injectors exposes to the interior of the intake port 31 corresponding to each of the combustion chambers 12. Further, the injector 11 is electrically connected to the interface 95 of the electronic control unit 90. The unit 90 supplies a command signal for making the injector 11 inject the fuel of the target fuel injection amount to the injector 11 at the target fuel injection timing. When the command signal is supplied from the unit 90 to the injector 11, the injector 11 injects the fuel into the intake port 31 corresponding thereto.

The engine 10 comprises four spark plugs 17. The plugs 17 are arranged on the body 20 of the engine such that the discharge electrode of each of the plugs exposes to the interior of the corresponding combustion chamber 12. Further, the plugs 17 are electrically connected to the interface 95 of the electronic control unit 90. The unit 90 supplies a command signal for making the plugs 17 generate a spark at the target ignition timing to the plugs 17. When the command signal is supplied from the unit 90 to the plug 17, the plug 17 ignites the fuel in the respective combustion chamber 12. It should be noted that when the fuel in the combustion chamber 12 is ignited by the plug 17, the fuel in the combustion chamber 12 burns and then, the torque is output to a crank shaft (not shown) via a piston (not shown) and a connecting rod (not shown).

The crank position sensor 16 is arranged adjacent to the output shaft of the engine, i.e., adjacent to the crank shaft. Further, the sensor 16 is electrically connected to the interface 95 of the electronic control unit 90. The sensor 16 outputs an output value corresponding to the phase of the rotation of the crank shaft. The output value is input into the unit 90. The unit 90 calculates the engine speed on the basis of the output value.

The intake manifold 32 branches at one end thereof into a plurality of pipes and the branched pipes are connected to the intake ports 31, respectively. Further, the intake manifold 32 at the other end thereof is connected to one end of the intake pipe 34.

The throttle valve 35 is arranged in the intake pipe 34. The actuator 36 for changing the opening degree of the throttle valve 35 (hereinafter, this actuator will be referred to as—throttle valve actuator—) is connected to the throttle valve 35. The throttle valve actuator 36 is electrically connected to the interface 95 of the electronic control unit 90. The unit 90 supplies to the throttle valve actuator 36 a control signal for driving the throttle valve actuator 36 to control the throttle valve opening degree to a target throttle valve opening degree. It should be noted that when the throttle valve opening degree is changed, a flow area of an interior of the intake pipe 34 at a region which the throttle valve 35 is arranged changes. Thereby, an amount of an air passing through the throttle valve 35 changes and as a result, an amount of an air introduced into the combustion chamber changes.

The air flow meter 37 is arranged on the intake passage 30 (concretely, on the intake pipe 34) upstream of the throttle valve 35. Further, the air flow meter 37 is electrically connected to the interface 95 of the electronic control unit 90. The air flow meter 37 outputs an output value corresponding to an amount of an air passing through the air flow meter 37. This output value is input into the unit 90. The unit 90 calculates on this output value an amount of an air passing through the air flow meter 37, that is, calculates the intake air amount.

The air cleaner 38 is arranged on the intake passage 30 (concretely, the intake pipe 34) upstream of the air flow meter 37.

The exhaust manifold 42 branches at one end thereof into a plurality of pipes and the branched pipes are connected to the exhaust ports 41, respectively. Further, the exhaust manifold 42 at the other end thereof is connected to one end of the exhaust pipe 43. The exhaust pipe 43 opens at the other end thereof to the outside air.

The catalyst converter 44 is arranged on the exhaust passage 40 (concretely, on the exhaust pipe 43). Further, the catalyst converter 44 houses a catalyst 45 therein. This catalyst 45 is a so-called three-way catalyst which can purify nitrogen oxide (NOx), carbon monoxide (CO) and unburned hydrocarbon (HC) included in the exhaust gas simultaneously with high purification efficiency when the air-fuel ratio of the exhaust gas flowing into the catalyst 45 is a stoichiometric ratio. It should be noted that the air-fuel ratio of the exhaust gas means a ratio of an amount of an air sucked into the combustion chamber 12 (i.e., the intake air amount) relative to an amount of a fuel supplied into the combustion chamber 12 (i.e., the fuel injection amount).

Figure 2:
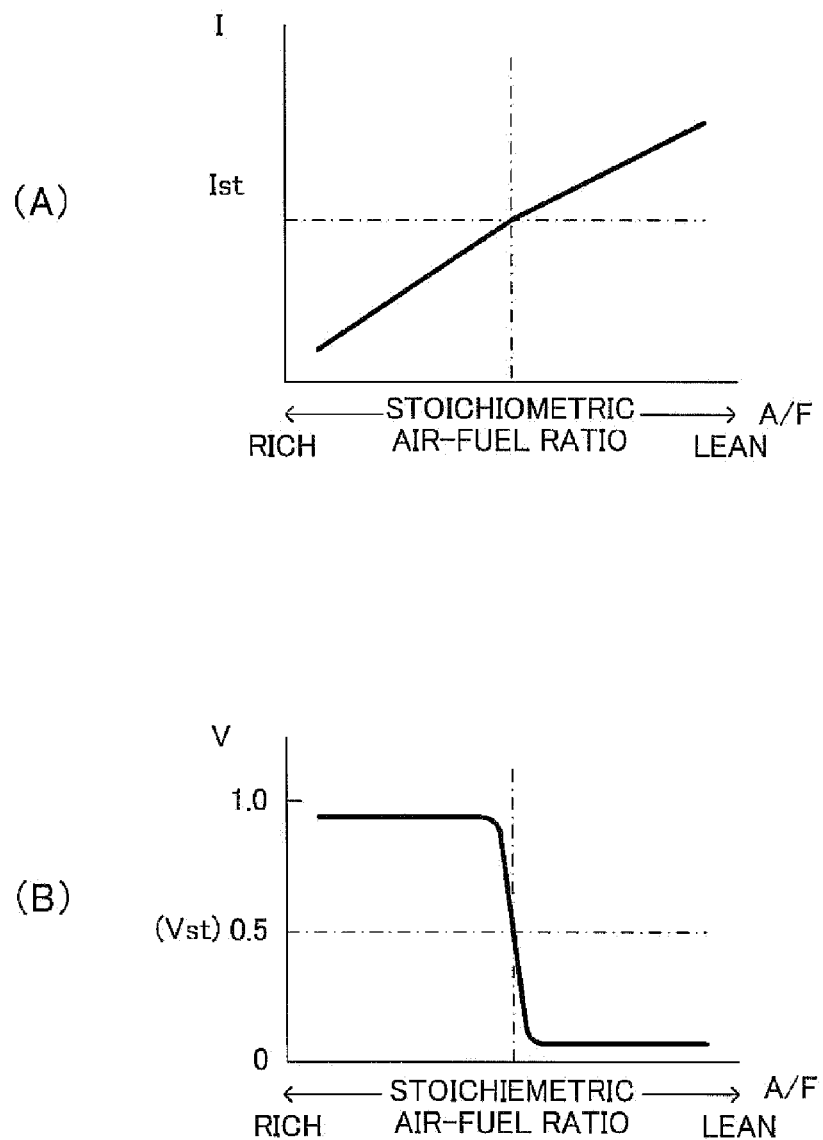
FIG. 2(A) is a view showing an output property of an upstream air-fuel ratio sensor.
FIG. 2(B) is a view showing an output property of a downstream air-fuel ratio sensor.

The air-fuel ratio sensor (hereinafter, will be also referred to as—upstream air-fuel ratio sensor—) 46 is secured on the exhaust passage 40 (concretely, the exhaust pipe 43) upstream of the catalyst converter 44. Further, the air-fuel ratio sensor 46 is electrically connected to the interface 95 of the electronic control unit 90. The air-fuel ratio sensor 46 outputs an output value corresponding to the air-fuel ratio of the exhaust gas reaching the same. This output value is input to the unit 90. The unit 90 calculates the air fuel ratio of the exhaust gas reaching the air-fuel ratio sensor 46 on this output value. Therefore, it can be said that the air-fuel ratio sensor 46 is a sensor for detecting an air-fuel ratio of the exhaust gas reaching the same. It should be noted that the air-fuel ratio sensor 46 is not limited to a particular sensor as far as it is a sensor for detecting the air-fuel ratio of the exhaust gas reaching the same and for example, a so-called limiting current type oxygen concentration sensor having a output property shown in FIG. 2(A) can be employed as the air-fuel ratio sensor 46. As shown in FIG. 2(A), this oxygen concentration sensor outputs a large electrical current value as the air-fuel ratio of the exhaust gas reaching the same is large.

The air-fuel ratio sensor (hereinafter, will be also referred to as—downstream air-fuel ratio sensor) 48 is secured on the exhaust passage 40 (concretely, the exhaust pipe 43) downstream of the catalyst converter 44. Further, the air-fuel ratio sensor 48 is electrically connected to the interface 95 of the electronic control unit 90. The air-fuel ratio sensor 48 outputs an output value corresponding to the air-fuel ratio of the exhaust gas reaching the same. This output value is input to the unit 90. The unit 90 calculates the air-fuel ratio of the exhaust gas reaching the air-fuel ratio sensor 48 on the basis of this output value. Therefore, it can be said that the air-fuel ratio sensor 48 is a sensor for detecting the air-fuel ratio of the exhaust gas reaching the same. It should be noted that the air-fuel ratio 48 is not limited to any particular sensor as far as it is a sensor for detecting the air-fuel ratio of the exhaust gas reaching the same and for example, a so-called electromotive type oxygen concentration sensor having an output value shown in FIG. 2(B) can be employed as the air-fuel ratio sensor 48. As shown in FIG. 2(B), this oxygen concentration sensor outputs a relatively large constant voltage value as the output value when the air-fuel ratio of the exhaust gas reaching the same is richer than the stoichiometric air-fuel ratio and outputs a relatively small constant voltage value as the output value when the air-fuel ratio of the exhaust gas reaching the same is leaner than the stoichiometric air-fuel ratio. Further, this oxygen concentration sensor outputs a voltage value intermediate between the above-mentioned relatively large and small constant voltage values when the air-fuel ratio of the exhaust gas reaching the same is the stoichiometric air-fuel ratio. Therefore, the output value from this oxygen concentration sensor decreases at once from the above-mentioned relatively large constant voltage value to the above-mentioned relatively small constant voltage value via the above-mentioned intermediate voltage value when the air-fuel ratio of the exhaust gas reaching the oxygen concentration sensor changes from the air-fuel ratio richer than the stoichiometric air-fuel ratio to the air-fuel ratio leaner than the stoichiometric air-fuel ratio. On the other hand, the output value from this oxygen concentration sensor increases at once from the above-mentioned small constant voltage value to the above-mentioned relatively large constant voltage value via the above-mentioned intermediate voltage value when the air-fuel ratio of the exhaust gas reaching the oxygen concentration sensor changes from the air-fuel ratio leaner than the stoichiometric air-fuel ratio to the air-fuel ratio richer than the stoichiometric air-fuel ratio.

The exhaust gas re-circulation device (hereinafter, will be referred to as—EGR device—) 50 is a device for introducing into the intake passage 30 and as a result, into the combustion chamber 12 the exhaust gas discharged from the combustion chamber 12 to the exhaust passage 40. The EGR device 50 has an exhaust gas re-circulation passage (hereinafter, will be referred to as—EGR passage—) 51, an exhaust gas re-circulation control valve (hereinafter, will be referred to as—EGR control valve—) 52 and an exhaust gas re-circulation cooler (hereinafter, will be referred to as—EGR cooler—) 53. The EGR passage 51 connects the exhaust passage 40 upstream of the catalyst converter 44 to each intake port 31. The EGR control valve 52 is arranged on the EGR passage 51. Further, the EGR control valve 52 is electrically connected to the interface 95 of the electronic control unit 90. The unit 90 supplies to the EGR control valve a control signal for driving the EGR control valve 52 to control an opening degree of the EGR control valve 52 (hereinafter, this opening degree will be referred to as—EGR control valve opening degree—) to its target value (hereinafter, this target value will be referred to as—target EGR control valve opening degree—). It should be noted that when the EGR control valve opening degree is changed, the flow area of the EGR passage 51 at an area where the EGR control valve 52 is arranged changes. Thereby, the amount of the exhaust gas passing the EGR control value 52 changes and as a result, the amount of the exhaust gas introduced into each intake port 31 changes. Further, only one EGR control valve 52 is prepared commonly for the four intake ports 31 and collectively controls the amount of the exhaust gas introduced into the four intake ports 31. The EGR cooler 53 is arranged on the EGR passage 51 upstream of the EGR control valve 52. The EGR cooler 53 cools the exhaust gas passing the same.

The acceleration pedal depression amount sensor 81 is connected to the acceleration pedal 80. Further, the sensor 81 is electrically connected to the interface 95 of the electronic control unit 90. The sensor 81 outputs an output value corresponding to the depression amount of the acceleration pedal 80. This output value is input to the unit 90. The unit 90 calculates on this output value the depression amount of the acceleration pedal 80 and as a result, the required engine torque.

Figure 3:
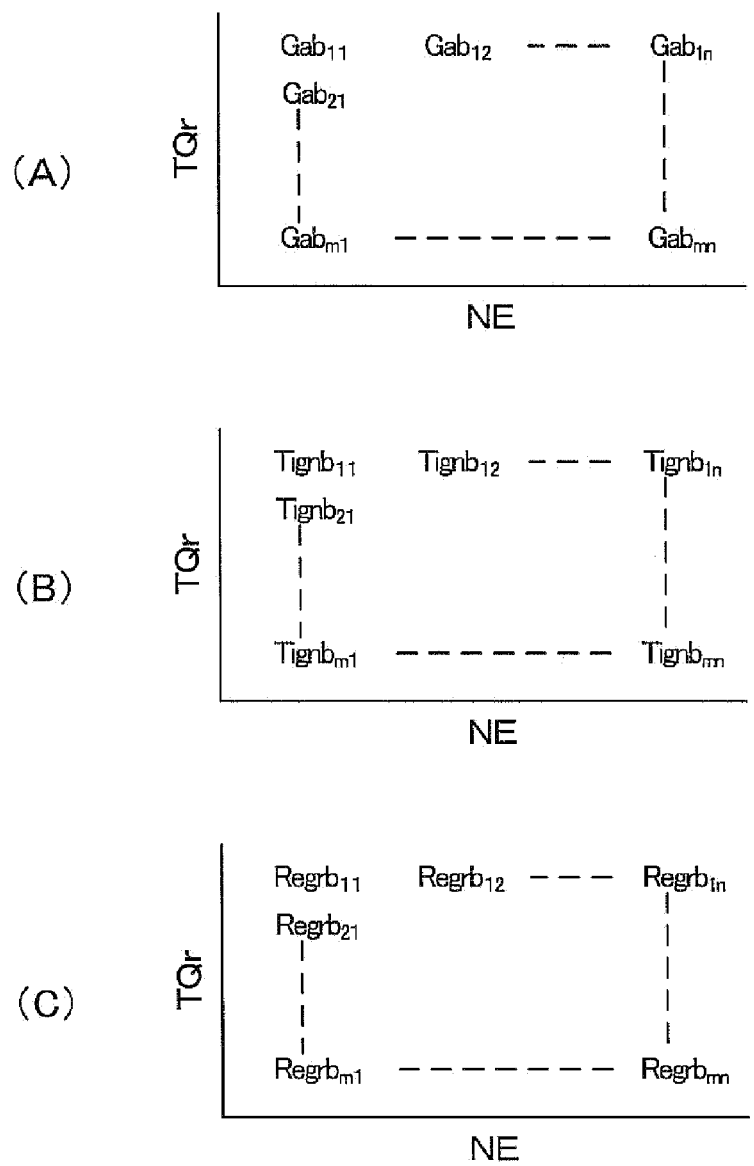
FIG. 3(A) is a view showing a map used for acquiring a base intake air amount according to the first embodiment.
FIG. 3(B) is a view showing a map used for acquiring a base ignition timing according to the first embodiment.
FIG. 3(C) is a view showing a map used for acquiring a base EGR ratio according to the first embodiment.

Next, the control of the throttle valve of the first embodiment will be explained. It should be noted that in the following explanation, a "target intake air amount" means—a target value of the intake air amount—. In the first embodiment, suitable intake air amounts are previously obtained by an experiment, etc. depending on the engine operation state defined by the engine speed and the required engine torque. Then, as shown in FIG. 3(A), the thus obtained intake air amounts are stored in the electronic control unit as base intake air amounts Gab in the form of a map as a function of the engine speed NE and the required engine torque TQr. Then, during the engine operation, a base intake air amount Gab corresponding to the current engine speed NE and the current required engine torque TQr is acquired from the map shown in FIG. 3(A). Then, the thus acquired base intake air amount Gab is set as a target intake air amount. Then, a throttle valve opening degree for introducing into the combustion chamber the air of the thus set target intake air amount is calculated as a target throttle valve opening degree. Then, a control signal to be supplied to the throttle valve to open the throttle valve by the target throttle valve opening degree is calculated. Then, the thus calculated control signal is supplied to the throttle valve. Thus, the throttle valve opening degree is controlled to the target throttle valve opening degree.

Next, the control of the spark plug of the first embodiment will be explained. It should be noted that in the following explanation, an "ignition timing" means—a timing for igniting the mixture gas formed in the combustion chamber by the spark plug—. In the first embodiment, suitable ignition timings are previously obtained by an experiment, etc. depending the engine operation state defined by the engine speed and the required engine torque. Then, as shown in FIG. 3(B), the thus obtained ignition timings are stored in the electronic control unit as base ignition timings Tignb in the form of a map as a function of the engine speed NE and the required engine torque TQr. Then, during the engine operation, a base ignition timing Tignb corresponding to the current engine speed NE and the current required engine torque TQr is acquired from the map shown in FIG. 3(B). Then, this acquired base ignition timing Tignb is set as a target ignition timing. Then, when the thus set target ignition timing has come, a command signal for activating the spark plug is supplied to the spark plug. Thus, the spark plug is activated at the target ignition timing.

Next, the control of the EGR control valve of the first embodiment will be explained. It should be noted that in the following explanation, an "EGR ratio" means—a ratio of the amount of the exhaust gas introduced into each combustion chamber relative to the amount of the gas introduced into each combustion chamber (i.e., the total amount of the air and the exhaust gas introduced into each combustion chamber) and a "target EGR ratio" means—target value of the EGR ratio—. In the first embodiment, suitable EGR ratios are previously obtained by an experiment, etc. depending on the engine operation state defined by the engine speed and the required engine torque. Then, as shown in FIG. 3(C), these obtained EGR ratios are stored in the electronic control unit as base EGR ratios Regrb in the form of a map as a function of the engine speed NE and the required engine torque TQr. Then, during the engine operation, a base EGR ratio Regrb corresponding to the current engine speed NE and the current required engine torque TQr is acquired from the map shown in FIG. 3(C). Then, this acquired base EGR ratio Regrb is set as a target EGR ratio. Then, an EGR control valve opening degree for accomplishing the thus set target EGR ratio is calculated as a target EGR control valve opening degree. Then, a control signal to be supplied to the EGR control valve to open the EGR control valve by the target EGR control valve opening degree is calculated. Then, this calculated control signal is supplied to the EGR control valve. Thus, the EGR control valve is controlled to the target EGR control valve opening degree.

Next, the control of the fuel injector of the first embodiment will be explained. It should be noted that in the following explanation, a "target fuel injection amount" means—a target value of the amount of the fuel injected from the fuel injector—and a "target fuel injection timing" means—a timing for injecting the fuel from the fuel injector—. In the first embodiment, a target fuel injection amount is calculated and a target fuel injection timing is set. The calculation of the target fuel injection amount and the setting of the target fuel injection timing will be explained later. Then, a command signal to be supplied to the fuel injector to make the fuel injector inject the fuel of the target fuel injection amount (hereinafter, this command signal will be referred to as—fuel injection command signal—) is calculated on the target fuel injection amount. Then, when the target fuel injection timing has come, the fuel injection command signal is supplied to the fuel injector. Thus, the fuel is injected from the fuel injector.

Next, the calculation of the target fuel injection amount of the first embodiment will be explained. It should be noted that in the following explanation, an "engine operation state" means—an operation state of the engine—, an "engine operation" means—an operation of the engine—and a "fuel injection amount" means—an amount of the fuel injected from the fuel injector—. In the first embodiment, the current intake air amount and the current target air-fuel ratio are acquired. Then, a base fuel injection amount Qb which is a fuel injection amount necessary to accomplish the target air-fuel ratio is calculated by applying the intake air amount and the target air-fuel ratio to the following formula 1. That is, the base fuel injection amount Qb is calculated by dividing the intake air amount Ga by the target air-fuel ratio AFt.

$$Qb=Ga/Aft \quad (1)$$

Then, a current main feedback amendment coefficient (hereinafter, this amendment coefficient will be referred to as—main FB amendment coefficient—) is acquired. Then, a target fuel injection amount at is calculated by applying this main FB amendment coefficient and the base fuel injection amount Qb calculated by the above formula 1 to the following formula 2. That is, the target fuel injection amount at is calculated by adding the main FB amendment coefficient Kqm to the base fuel injection amount Qb.

$$Qt=Qb+Kqm \quad (2)$$

It should be noted that in the first embodiment, the fuel injection amount is controlled according to the target fuel injection amount set as explained above and therefore, the air-fuel ratio of the mixture gas is controlled to the target air-fuel ratio by a feedback control.

Figure 4:
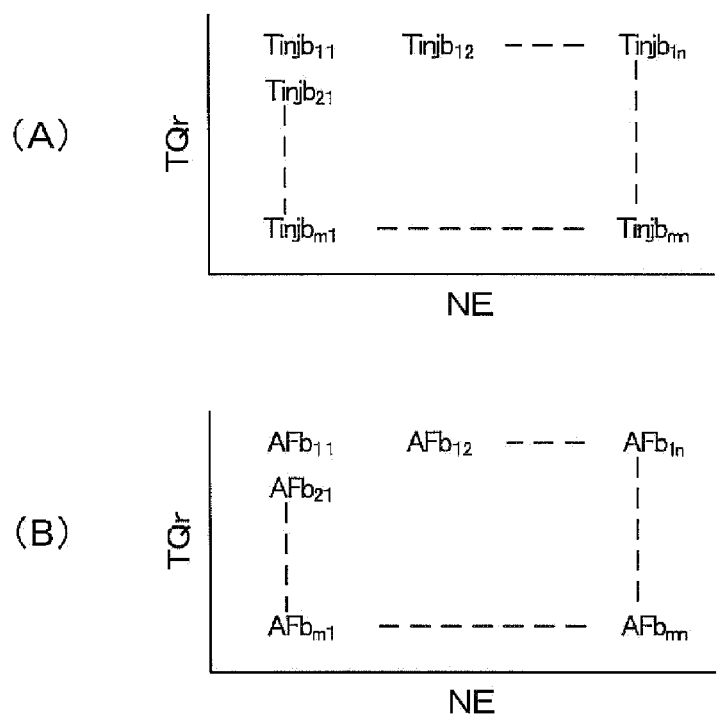
FIG. 4(A) is a view showing a map used for acquiring a base fuel injection timing according to the first embodiment.
FIG. 4(B) is a view showing a map used for acquiring a base air-fuel ratio according to the first embodiment.

Next, the setting of the target fuel injection timing of the first embodiment will be explained. It should be noted that in the following explanation, a "fuel injection timing" means—a timing for making the fuel injector inject the fuel—. In the first embodiment, suitable fuel injection timings are previously obtained by an experiment, etc. depending on the engine operation state defined by the engine speed and the required engine torque. Then, as shown in FIG. 4(A), these obtained fuel injection timings are stored in the electronic control unit as base fuel injection timings Tinjb in the form of a map as a function of the engine speed NE and the required engine torque TQr. Then, during the engine operation, a base fuel injection timing Tinjb corresponding to the current engine speed NE and the current required engine torque TQr is acquired from the map shown in FIG. 4(A). Then, the thus acquired base fuel injection timing Tinjb is set as a target fuel injection timing.

Next, the calculation of the main FB amendment coefficient of the first embodiment will be explained. In the first embodiment, the air-fuel ratio of the mixture gas is acquired on the basis of the current output value from the upstream air-fuel ratio sensor (hereinafter, this air-fuel ratio will be referred to as—upstream air-fuel ratio—) and a current sub feedback amendment coefficient is acquired (hereinafter, this amendment coefficient will be referred to as—sub FB amendment coefficient—). Then, an amended upstream air-fuel ratio is calculated by applying the upstream air-fuel ratio and the sub FB amendment coefficient to the following formula 3. That is, the amended upstream air-fuel ratio AFua is calculated by adding the sub FB amendment coefficient Kqs to the upstream air-fuel ratio AFu.

$$AFua=AFu+Kqs \quad (3)$$

Then, the current target air-fuel ratio is acquired. Then, by applying this target air-fuel ratio and the amended upstream air-fuel ratio calculated by the formula 3 to the following formula 4, a difference of the amended upstream air-fuel ratio relative to the target air-fuel ratio is calculated (hereinafter, this difference will be referred to as—instant upstream air-fuel ratio difference—). That is, by subtracting the amended upstream air-fuel ratio AFua from the target air-fuel ratio AFt, the instant upstream air-fuel ratio difference $\Delta AFu$ is calculated.

$$\Delta AFu=AFt-AFua \quad (4)$$

Then, by the instant upstream air-fuel ratio difference $\Delta AFu$ calculated by the formula 4 to the following formula 5, a main learning amendment coefficient Kqmg is calculated and then, this calculated main learning amendment coefficient Kqmg is stored in the electronic control device. It should be noted that in the formula 5, "Kqmg" in the left member is a main learning amendment coefficient calculated presently, "Kqmg" in the right member is a main learning amendment coefficient calculated last time by the formula 5 and "ΔAFu" in the right member is an instant upstream air-fuel ratio difference calculated by the formula 4. Further, in the formula 5, "A" is a coefficient for determining an averaging degree and is set as a value larger than—0—and smaller than—1—depending on a desired averaging degree.

$$Kqmg = A \times \Delta AFu + (1-A) \times Kqmg \tag{5}$$

Then, by applying the instant upstream air-fuel ratio difference calculated by the formula 4 and the main learning amendment coefficient calculated by the formula 5 to the following formula 6, a main FB amendment coefficient is calculated. That is, by adding a value obtained by multiplying a coefficient Ki by the main learning amendment coefficient Kqmg to a value obtained by multiplying a coefficient Kp by the instant upstream air-fuel ratio difference ΔAFu, the main FB amendment coefficient Kqm is calculated. It should be noted that in the following formula 6, "Kpm" is a proportional gain of a so-called PI control and "Kim" is an integral gain of the PI control. Further, the main learning amendment coefficient is an amendment coefficient for compensating a stationary deviation of the air-fuel ratio of the mixture gas relative to the target air-fuel ratio (hereinafter, this deviation will be referred to as—stationary air-fuel ratio deviation—).

$$Kqm = Kpm \times \Delta AFu + Kim \times Kqmg \tag{6}$$

Next, the calculation of the sub FB amendment coefficient of the first embodiment is explained. In the first embodiment, the air-fuel ratio of the exhaust gas is acquired on the current output value from the downstream air-fuel ratio sensor (hereinafter, this air-fuel ratio will be referred to as—downstream air-fuel ratio—) and the current target air-fuel ratio is acquired. Then, by applying this downstream air-fuel ratio and this target air-fuel ratio to the following formula 7, a deviation of the downstream air-fuel ratio relative to the target air-fuel ratio is calculated (hereinafter, this deviation will be referred to as—instant downstream air-fuel ratio deviation—). That is, by subtracting the downstream air-fuel ratio AFd from the target air-fuel ratio AFt, the instant downstream air-fuel ratio deviation ΔAFd is calculated.

$$\Delta AFd = AFt - AFd \tag{7}$$

Then, by applying the instant downstream air-fuel ratio deviation ΔAFd calculated by the formula 7 to the following formula 8, a sub learning amendment coefficient Kqsg is calculated. It should be noted that in the following formula 8, "Kqsg" in the left member is a sub learning amendment coefficient calculated presently, "Kqsg" in the right member is the sub learning amendment coefficient calculated last time by the formula 8 and "ΔAFd" is the instant downstream air-fuel ratio deviation calculated by the formula 7. Further, in the following formula 8, "B" is a coefficient for determining an averaging degree and is set as a value larger than—0—and smaller than—1—depending on a desired averaging degree. Further, the sub learning amendment coefficient is an amendment coefficient for compensating the stationary air-fuel deviation.

$$Kqsg = B \times \Delta AFd + (1-B) \times Kqsg \tag{8}$$

Then, by applying the instant downstream air-fuel ratio deviation calculated by the formula 7 and the sub learning amendment coefficient calculated by the formula 8 to the following formula 9, a sub FB amendment coefficient is calculated. That is, by adding a value obtained by multiply a coefficient Ki by the sub learning amendment coefficient Kqsg to a value obtained by multiplying a coefficient Kp by the instant downstream air-fuel ratio deviation ΔAFd, the sub FB amendment coefficient Kqs is calculated. It should be noted that in the following formula 9, "Kps" is a proportional gain of the so-called PI control and "Kis" is an integral gain of the PI control.

$$Ksm = Kps \times \Delta AFd + Kis \times Kqsg \tag{9}$$

Next, the setting of the target air-fuel ratio of the first embodiment will be explained. It should be noted that in the following explanation, "exhaust gas introduction shortage state" means a state in which when the exhaust gas of a predetermined amount should be introduced into each combustion chamber, the amount of the exhaust gas introduced into at least one combustion chamber is smaller than the above-mentioned predetermined amount, "EGR control" means a control for introducing the EGR gas into the combustion chambers by the EGR device, "error of the main learning amendment coefficient" means an error of the actual main learning amendment coefficient relative to the main learning amendment coefficient which can compensate the stationary air-fuel ratio deviation sufficiently and "error of the sub learning amendment coefficient" means an error of the actual sub learning amendment coefficient relative to the sub learning amendment coefficient which can compensate the stationary air-fuel ratio deviation sufficiently.

In the first embodiment, suitable air-fuel ratios of the mixture gas depending on the engine operation state defined by the engine speed and the required engine torque are previously obtained by an experiment, etc. Then, as shown in FIG. 4(B), these obtained air-fuel ratios of the mixture gas are stored in the electronic control unit as base air-fuel ratios AFb in the form of a map as a function of the engine speed NE and the required engine torque TQr. Then, during the engine operation, a base air-fuel ratio corresponding to the current engine speed NE and the current required engine torque TQr is acquired from the map shown in FIG. 4(B). Then, when it is not judged that the EGR device is under the exhaust gas introduction shortage state, the acquired base air-fuel ratio is set as the target air-fuel ratio.

On the other hand, when it is judged that the EGR device is under the exhaust gas introduction shortage state and the EGR control is performed, a correction determined so as to eliminate the errors of the main and sub learning amendment coefficients is applied to the acquired base air-fuel ratio (hereinafter, this correction will be referred to as—first correction under the exhaust gas introduction shortage state—) and this corrected base air-fuel ratio is set as the target air-fuel ratio. Then, while it is judged that the EGR device is under the exhaust gas introduction shortage state and the EGR is performed, the first correction under the exhaust gas introduction shortage state is applied to the acquired base air-fuel ratio and the corrected base air-fuel ratio is set as the target air-fuel ratio.

On the other hand, when it is judged that the EGR device is under the exhaust gas introduction shortage state and the EGR control is not performed, a correction determined so as to eliminate the errors of the main and sub learning amendment coefficients is applied to the acquired base air-fuel ratio (hereinafter, this correction will be referred to as—second correction under the exhaust gas introduction shortage state—) and this corrected base air-fuel ratio is set as the target air-fuel ratio. Then, while it is judged that the EGR device is under the exhaust gas introduction shortage state and the EGR control is not performed, the second correction under the exhaust gas introduction shortage state is applied to the acquired base air-fuel ratio and the corrected base air-fuel ratio is set as the target air-fuel ratio.

It should be noted that in the first embodiment, the exhaust gas introduction shortage state is, for example, a state occurring due to the closing of the EGR passage by the deposit of soot in the exhaust gas, etc. in the EGR passage connected to a certain particular intake port.

According to the first embodiment, the following effect is obtained. That is, when the EGR device is under the exhaust gas introduction shortage state (hereinafter, this will be referred to as—exhaust gas introduction shortage period—), even if it is intended to introduce the exhaust gas of a predetermined amount into each combustion chamber, the amount of the exhaust gas introduced into at least one combustion chamber is smaller than the predetermined amount.

In this regard, in the case that the amount of the exhaust gas introduced into a certain combustion chamber is smaller than the predetermined amount (hereinafter, this combustion chamber will be referred to as—particular combustion chamber—) when it is intended to introduce the exhaust gas of the predetermined amount into each combustion chamber, the amount of the exhaust gas introduced into the particular combustion chamber is smaller than that introduced into the each remaining combustion chamber and as a result, the amount of the air introduced into the particular combustion chamber is larger than that introduced into the each remaining combustion chamber. Thereby, the air-fuel ratio of the mixture gas formed in the particular combustion chamber is larger (i.e., learner) than that formed in the each remaining combustion chamber. Otherwise, depending on the circumstances other than the amount of the air introduced into the each combustion chamber, the air-fuel ratio of the mixture gas formed in the particular combustion chamber may be smaller (i.e., richer) than that formed in the each remaining combustion chamber. In any event, in the case that the amount of the exhaust gas introduced into the particular combustion chamber is smaller than the predetermined amount when it is intended to introduce the exhaust gas of the predetermined amount into the each combustion chamber, the air-fuel ratio of the mixture gas formed in the particular combustion chamber is different from that formed in the each remaining combustion chamber.

In this regard, the main learning amendment coefficient of the first embodiment is calculated on the basis of the instant upstream air-fuel ratio deviation and the sub learning amendment coefficient of the first embodiment is calculated on the basis of the instant downstream air-fuel ratio deviation. Therefore, there is a possibility that the main and sub learning amendment coefficients calculated when it is judged that the EGR device is under the exhaust gas introduction shortage state are those calculated in the state in which the air-fuel ratio of the mixture gas formed in the particular combustion chamber is different from that formed in the each remaining combustion chamber (hereinafter, the main and sub learning amendment coefficients will be collectively referred to as—learning amendment coefficients—) and therefore, there is a possibility that the learning amendment coefficients at the exhaust gas introduction shortage state being realized at least include errors relative to the learning amendment coefficients which can compensate the stationary air-fuel ratio deviation sufficiently (hereinafter, these learning amendment coefficients will be referred to as—suitable learning amendment coefficients—). Therefore, even if the fuel injection amount is controlled to the target fuel injection amount calculated using the learning amendment coefficients at the exhaust gas introduction shortage state being realized, the property regarding the emission of the exhaust gas discharged from the combustion chambers (hereinafter, this property will be referred to as—exhaust emission property—) may not be maintained to the high property. Under the circumstances, as one of means for maintaining the exhaust emission property to the high property, there is means for correcting the base air-fuel ratio and setting this corrected base air-fuel ratio as the target air-fuel ratio, not setting the base air-fuel ratio itself as the target air-fuel ratio.

The errors of the learning amendment coefficients at the exhaust gas introduction shortage state being realized relative to the suitable learning amendment coefficients changes depending on whether the learning amendment coefficients at the exhaust gas introduction shortage state being realized are those calculated during the performance of the EGR control. Therefore, in the case that means for correcting the base air-fuel ratio and setting the corrected base air-fuel ratio as the target air-fuel ratio is employed as means for maintaining the exhaust emission property to the high property after it is judged that the EGR device is under the exhaust gas introduction shortage state, it is necessary to change the correction relative to the base air-fuel ratio depending on whether the learning amendment coefficients at the exhaust gas introduction shortage state being realized or depending on whether the EGR control is performed after it is judged that the EGR device is under the exhaust gas introduction shortage state.

In this regard, in the first embodiment, when it is realized that the EGR device is under the exhaust gas introduction shortage state (hereinafter, this will be referred to as—at the exhaust gas introduction shortage state being realized—), the correction relative to the base air-fuel ratio in the case that the EGR control is performed (i.e., the first correction under the exhaust gas introduction shortage state) is different from that in the case that the EGR control is not performed (i.e., the second correction under the exhaust gas introduction shortage state). Further, the first and second corrections are determined considering at least one of the error relating to the learning of at least one of the main and sub learning amendment coefficients at the exhaust gas introduction shortage state being realized (hereinafter, this error will be referred to as—the learning error at the exhaust gas introduction shortage state being realized—), the error relating to the entire feedback control of the air-fuel ratio of the mixture gas at the exhaust gas introduction shortage state being realized (hereinafter, this error will be referred to as—FB control error at the exhaust gas introduction shortage state being realized) and the decrease of the exhaust emission property due to the fact that the exhaust gas re-circulation device is under the exhaust gas introduction shortage state at the exhaust gas introduction shortage state being realized (hereinafter, this decrease will be referred to as—decrease of the exhaust emission property due to the exhaust gas introduction shortage—). That is, in the first embodiment, at the exhaust gas introduction shortage state being realized, a suitable target air-fuel ratio is set from the point of view of obtaining the high exhaust emission property and then the air-fuel ratio of the mixture gas is control by the feedback control on the basis of the thus set target air-fuel ratio. Thereby, according to the first embodiment, at the exhaust gas introduction shortage state being realized, the effect that the exhaust emission property is maintained to the high property can be obtained.

Further, in the first embodiment, the correction to the base air-fuel ratio when the EGR control has been performed after the exhaust gas introduction shortage state being realized (i.e., the first correction under the exhaust gas introduction shortage state) is different from that when the EGR control has not been performed after the exhaust gas introduction shortage state being realized (i.e., the second correction under the exhaust gas introduction shortage state). Further, the first and second corrections are determined considering at least one of the air-fuel ratio FB control error at the exhaust gas introduction shortage state being realized and the decrease of the exhaust emission property due to the exhaust gas introduction shortage. That is, in the first embodiment, after the exhaust gas introduction shortage state being realized, a suitable target air-fuel ratio is set from the point of view of obtaining the high exhaust emission property and then, the air-fuel ratio of the mixture gas is controlled by the feedback control on the basis of the thus set target air-fuel ratio. Thereby, according to the first embodiment, after the exhaust gas introduction shortage state being realized, the effect that the exhaust emission property is maintained to the high property can be obtained.

It should be noted that the degree of the correction, that is, the correction amount to the base air-fuel ratio by the first correction under the exhaust gas introduction shortage state may be an amount determined depending on the amount of the air introduced into each combustion chamber per unit time or an amount determined depending on the integral value of the amount of the air introduced into each combustion chamber for a predetermined time period or an amount determined depending on the difference of the amount of the exhaust gas introduced into the above-mentioned particular combustion chamber relative to the above-mentioned predetermined amount or an amount determined depending on the combination of the engine speed and the charging efficiency of the gas introduced into each combustion chamber.

Similarly, the degree of the correction, that is, the correction amount to the base air-fuel ratio by the second correction under the exhaust gas introduction shortage state may be an amount determined depending on the amount of the air introduced into each combustion chamber per unit time or an amount determined depending on the integral value of the amount of the air introduced into each combustion chamber for a predetermined time period or an amount determined depending on the difference of the amount of the exhaust gas introduced into the above-mentioned particular combustion chamber relative to the above-mentioned predetermined amount or an amount determined depending on the combination of the engine speed and the charging efficiency of the gas introduced into each combustion chamber.

Figure 5:
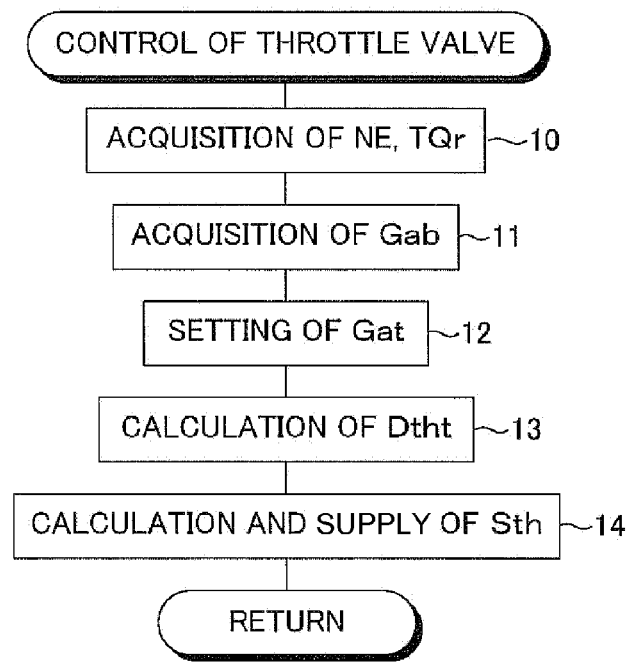
FIG. 5 is a view showing an example of a routine for performing a control of a throttle valve according to the first embodiment.

Next, an example of a routine for performing the control of the throttle valve according to the first embodiment will be explained. This example of the routine is shown in FIG. 5. It should be noted that this routine starts every time a predetermined time has been elapsed. When the routine shown in FIG. 5 starts, at first, at the step 10, the current engine speed NE and the current required engine torque TQr are acquired. Next, at the step 11, a base intake air amount Ga corresponding to the engine speed NE and the required engine torque TQr acquired at the step 10 is acquired from the map shown in FIG. 3(A). Next, at the step 12, the base intake air amount Gab acquired at the step 11 is set as a target intake air amount Gat. Next, at the step 13, a throttle valve opening degree for introducing into the combustion chamber the air of the target intake air amount Gat set at the step 12 is calculated as a target throttle valve opening degree Dtht. Next, at the step 14, a control signal Sth to be supplied to the throttle valve for opening the throttle valve by the target throttle valve opening degree Dtht calculated at the step 13 is calculated and this calculated control signal Sth is supplied to the throttle valve and then, the routine terminates.

Figure 6:
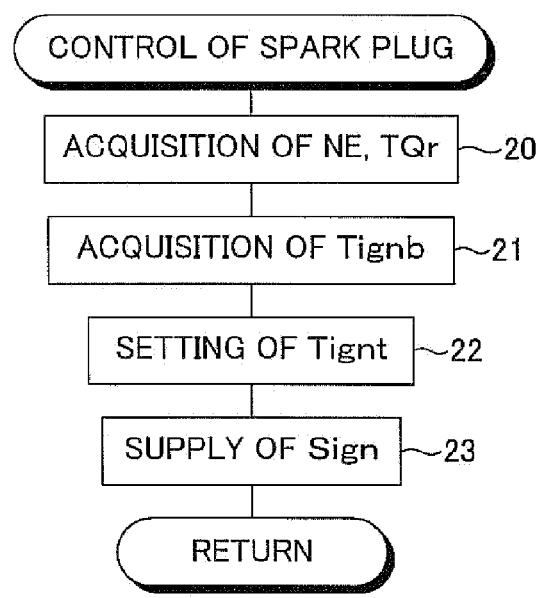
FIG. 6 is a view showing an example of a routine for performing a control of a spark plug according to the first embodiment.

Next, an example of a routine for performing the control of the spark plug according to the first embodiment will be explained. This example of the routine is shown in FIG. 6. It should be noted that this routine starts every time a predetermined time has been elapsed. When the routine shown in FIG. 6, at first, at the step 20, the current engine speed NE and the current required engine torque TQr are acquired. Next, at the step 21, a base ignition timing Tignb corresponding to the engine speed NE and the required engine torque TQr acquired at the step 20 is acquired from the map shown in FIG. 3(B). Next, at the step 22, the base ignition timing Tignb acquired at the step 21 is set as a target ignition timing Tignt. Next, at the step 23, a command signal Sign for activating the spark plug is supplied to the spark plug at the target ignition timing set at the step 22 and then, the routine terminates.

Figure 7:
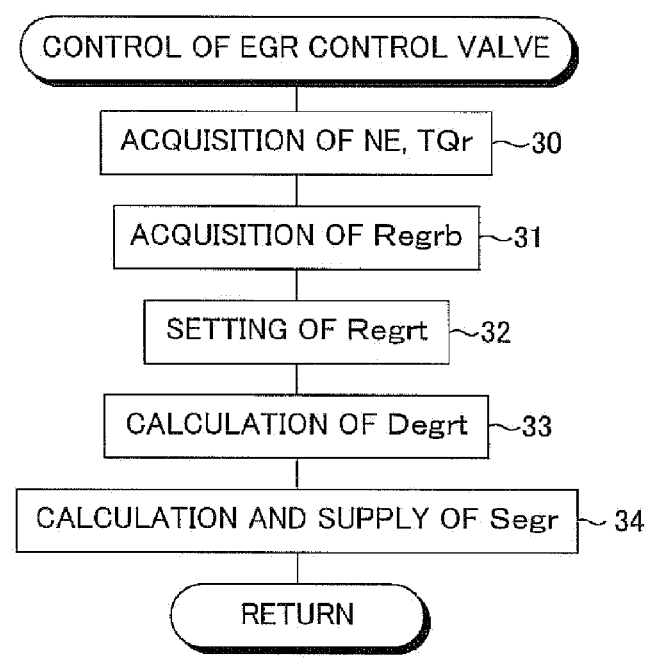
FIG. 7 is a view showing an example of a routine for performing a control of an EGR control valve according to the first embodiment.

Next, an example of a routine for performing the control of the EGR control valve according to the first embodiment will be explained. This example of the routine is shown in FIG. 7. It should be noted that this routine starts every time a predetermined time has been elapsed. When the routing shown in FIG. 7, at first, at the step 30, the current engine speed NE and the current required engine torque TQr are acquired. Next, at the step 31, a base EGR ratio Regrb corresponding to the engine speed NE and the required engine torque TQr acquired at the step 30 is acquired from the map shown in FIG. 3(C). Next, at the step 32, the base EGR ratio Regrb acquired at the step 31 is set as a target EGR ratio Regrt. Next, at the step 33, an EGR control valve opening degree for accomplishing the target EGR ratio Regrt set at the step 32 is calculated as a target EGR control valve opening degree Degrt. Next, at the step 34, a control signal Segr to be supplied to the EGR control valve for opening the EGR control valve by the target EGR control valve opening degree Degrt calculated at the step 33 is calculated and this calculated control signal Segr is supplied to the EGR control valve and then, the routine terminates.

Figure 8:
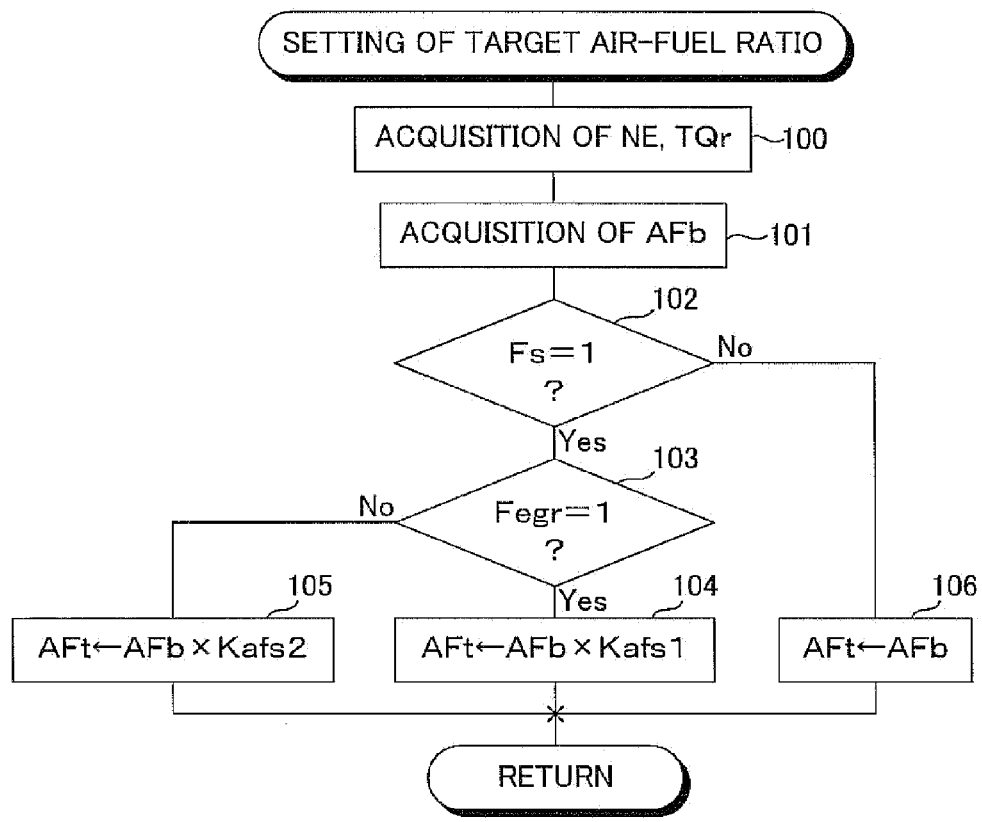
FIG. 8 is a view showing an example of a routine for performing a setting of a target air-fuel ratio according to the first embodiment.

Next, an example of a routine for performing the setting of the target air-fuel ratio according to the first embodiment will be explained. This example of the routine is shown in FIG. 8. It should be noted that this routine starts every time a predetermined time has been elapsed. When the routine shown in FIG. 8 starts, at first, at the step 100, the current engine speed NE and the current required engine torque TQr are acquired. Next, at the step 101, a base air-fuel ratio AFb corresponding to the engine speed NE and the required engine torque TQr acquired at the step 100 are acquired from the map shown in FIG. 4(B). Next, at the step 102, it is judged if an exhaust gas introduction shortage flag Fs is set (Fs=1). This exhaust gas introduction shortage flag Fs is set when it is recognized that the EGR device is under the exhaust gas introduction shortage state and is reset when it is not recognized that the EGR device is under the exhaust gas introduction shortage state. When it is judged that Fs=1 at the step 102, the routine proceeds to the step 103. On the other hand, when it is not judged that Fs=1 at the step 102, the routine proceeds to the step 106 in which the base air-fuel ratio AFb acquired at the step 101 is set as a target air-fuel ratio AFt and then, the routine terminates.

When the routine proceeds to the step 103, it is judged if an EGR control flag Fegr is set (Fegr=1). This EGR control flag Fegr is set when the EGR control starts and is reset when the EGR control terminates. When it is judged that Fegr=1 at the step 103, the routine proceeds to the step 104 in which a value obtained by multiplying the base air-fuel ratio AFb acquired at the step 101 by a first amendment coefficient Kafs1 under the exhaust gas introduction shortage state (i.e., a value obtained by applying the first correction under the exhaust gas introduction shortage state to the base air-fuel ratio AFb) is set as a target air-fuel ratio AFt and then, the routine terminates. On the other hand, when it is judged that Fegr=1 at the step 103, the routine proceeds to step 105 in which a value obtained by multiplying the base air-fuel ratio AFb acquired at the step 101 by the second amendment coefficient Kafs2 under the exhaust gas introduction shortage state (i.e., a value obtained by applying the second correction under the exhaust gas introduction shortage state to the base air-fuel ratio AFb) is set as a target air-fuel ratio AFt and then, the routine terminates.

Figure 9:
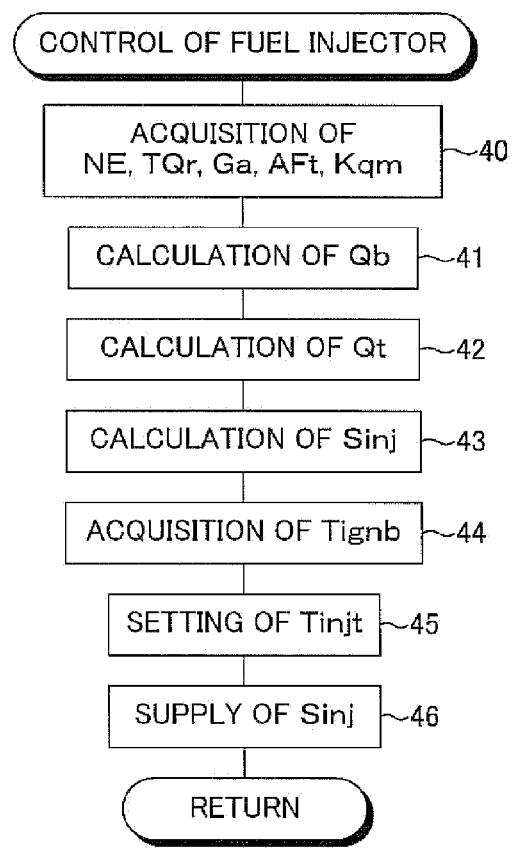
FIG. 9 is a view showing an example of a routine for performing a control of a fuel injector according to the first embodiment.

Next, an example of a routine for performing the control of the fuel injection according to the first embodiment will be explained. This example of the routine is shown in FIG. 9. It should be noted that this routine starts every time a predetermined time has been elapsed. When the routine shown in FIG. 9 starts, at first, at the step 40, the current engine speed NE, the current required engine torque TQr, the current intake air amount Ga, the current target air-fuel ratio AFt and the current main FB amendment coefficient Kqm are acquired. Next, at the step 41, a base fuel injection amount Qb is calculated by applying the intake air amount Ga and the target air-fuel ratio AFt acquired at the step 40 to the above formula 1. Next, at the step 42, a target fuel injection amount Qt is calculated by applying the main FB amendment coefficient Kqm acquired at the step 40 and the base fuel injection amount Qb calculated at the step 41 to the above formula 2. Next, a command signal Sinj to be supplied to the fuel injector for making the fuel injector inject the fuel of the target fuel injection amount Qt calculated at the step 42 is calculated. Next, at the step 44, a base fuel injection timing Tinjb corresponding to the engine speed NE and the required engine torque TQr acquired at the step 40 is acquired from the map shown in FIG. 4(A). Next, the base fuel injection timing Tinjb acquired at the step 44 is set as a target fuel injection timing Tinjt. Next, at the step 46, the command signal Sinj calculated at the step 43 is supplied to the fuel injector at the target fuel injection timing Tinjt set at the step 45 and then, the routine terminates.

Figure 10:
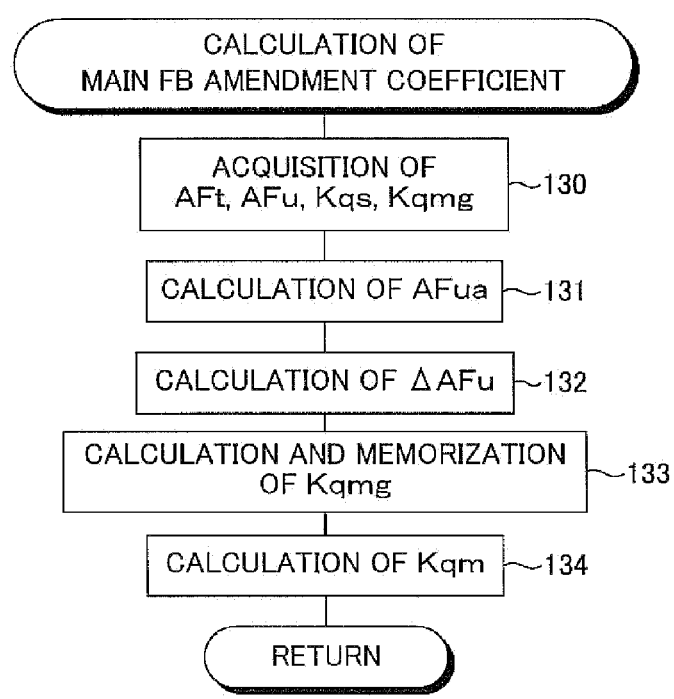
FIG. 10 is a view showing an example of a routine for performing a calculation of a main feedback amendment efficient (i.e., a main FB amendment coefficient) according to the first embodiment.

Next, an example of a routine for performing the calculation of the main FB amendment coefficient according to the first embodiment will be explained. This example of the routine is shown in FIG. 10. It should be noted that this routine starts every a predetermined time has been elapsed. When the routine shown in FIG. 10 starts, at first, at the step 130, the current air-fuel ratio AFt, the current upstream air-fuel ratio AFu, the current sub FB amendment coefficient Kqs and the current main learning amendment coefficient Kqmg are acquired. Next, at the step 131, an amended upstream air-fuel ratio AFua is calculated by applying the upstream air-fuel ratio AFu and the sub FB amendment coefficient Kqs acquired at the step 130 to the above formula 3. Next, at the step 132, an instant upstream air-fuel ratio deviation $\Delta AFu$ is calculated by applying the target air-fuel ratio AFt acquired at the step 130 and the amended upstream air-fuel ratio AFua calculated at the step 131 to the above formula 4. Next, at the step 133, a new main learning amendment coefficient Kqmg is calculated by applying the main learning amendment coefficient Kqmg acquired at the step 130 and the instant upstream air-fuel ratio deviation $\Delta AFu$ calculated at the step 132 and this newly calculated main learning amendment coefficient Kqmg is stored in the electronic control unit as a latest main learning amendment. That is, thereby, the main learning amendment coefficient is updated. Next, at the step 134, a new main FB amendment coefficient Kqm is calculated by applying the instant upstream air-fuel ratio deviation $\Delta AFu$ calculated at the step 132 and the main learning amendment coefficient Kqmg calculated at the step 133 to the above formula 6 and then, the routine terminates.

Figure 11:
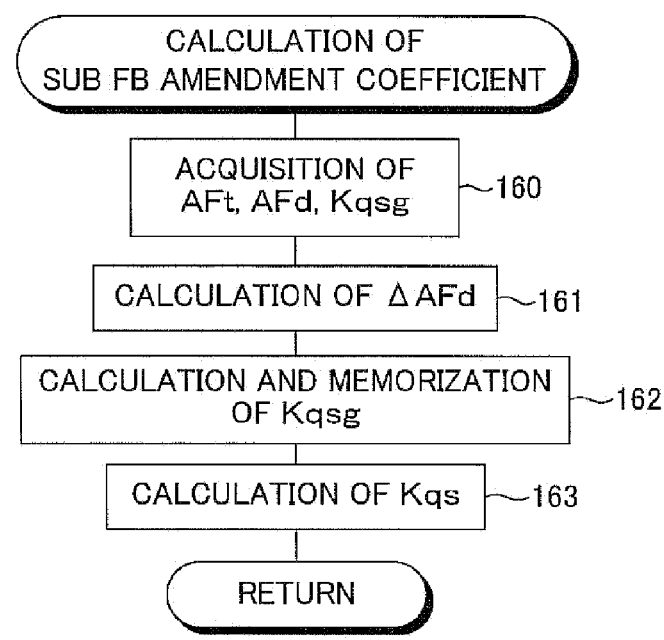
FIG. 11 is a view showing an example of a routine for performing a calculation of a sub feedback amendment coefficient (i.e., sub FB amendment coefficient) according to the first embodiment.

Next, an example of a routine for performing the calculation of the sub FB amendment coefficient according to the first embodiment will be explained. This example of the routine is shown in FIG. 11. It should be noted that this routine starts every time a predetermined time has been elapsed. When the routine shown in FIG. 11 starts, at first, at the step 160, the current target air-fuel ratio AFt, the current downstream air-fuel ratio AFd and the current sub learning amendment coefficient Kqsg are acquired. Next, at the step 161, an instant downstream air-fuel ratio deviation $\Delta AFd$ is calculated by applying the target and downstream air-fuel ratios AFt and AFd acquired at the step 160 to the above formula 7. Next, at the step 162, a new sub learning amendment coefficient Kqsg is calculated by applying the sub learning amendment coefficient Kqsg acquired at the step 160 and the instant downstream air-fuel ratio deviation $\Delta AFd$ calculated at the step 161 to the above formula 8 and this newly calculated sub learning amendment coefficient Kqsg is stored in the electronic control unit as a latest sub learning amendment coefficient. That is, thereby, the sub learning amendment coefficient is updated. Next, at the step 163, a new sub FB amendment coefficient Kqs is calculated by applying the instant downstream air-fuel ratio deviation $\Delta AFd$ calculated at the step 161 and the sub learning amendment coefficient Kqsg calculated at the step 162 to the above formula 9 and then, the routine terminates.

Next, the second embodiment will be explained. It should be noted that the constitution and control of the second embodiment which are not explained below are the same as those of the first embodiment or are ones obviously derived from the technical concept of the invention embodied in the second embodiment. In the second embodiment, when it is realized that the EGR device is under the exhaust gas introduction shortage state and the EGR control is performed in the first embodiment, a predetermined correction (i.e., the first correction under the exhaust gas introduction shortage state) is applied to the above-mentioned acquired base air-fuel ratio and then, this corrected base air-fuel ratio is set as a target air-fuel ratio and the EGR control is stopped.

According to the second embodiment, the following effects can be obtained. That is, if the EGR control is stopped when the EGR device is under the exhaust gas introduction shortage state, no or almost no deviation derived from the deviation between the amounts of the exhaust gas introduced into combustion chambers occurs between the air-fuel ratios of the mixture gases formed in the combustion chambers. Therefore, if the main and sub learning amendment coefficients are being calculated while the EGR control is stopped, the thus calculated learning amendment coefficients converge to those which can maintain the exhaust emission property to the high property even if the EGR device is under the exhaust gas introduction shortage state. Therefore, when the EGR device is under the exhaust gas introduction shortage state, the exhaust emission property is maintained to the high property with a high possibility in the case that the air-fuel ratio of the mixture gas is controlled by the feedback control while the EGR control is stopped, compared with the case that the air-fuel ratio of the mixture gas is controlled by the feedback control while the EGR control is performed. In this regard, in the second embodiment, when it is realized that the EGR device is under the exhaust gas introduction shortage state and the EGR control is performed, the EGR control is stopped and therefore, after the exhaust gas introduction shortage state being realized, the main and sub learning amendment coefficients is continued to be calculated while the EGR control is stopped. Thereby, according to the second embodiment, the effect that the exhaust emission property is maintained to the high property can be obtained.

Figure 12:
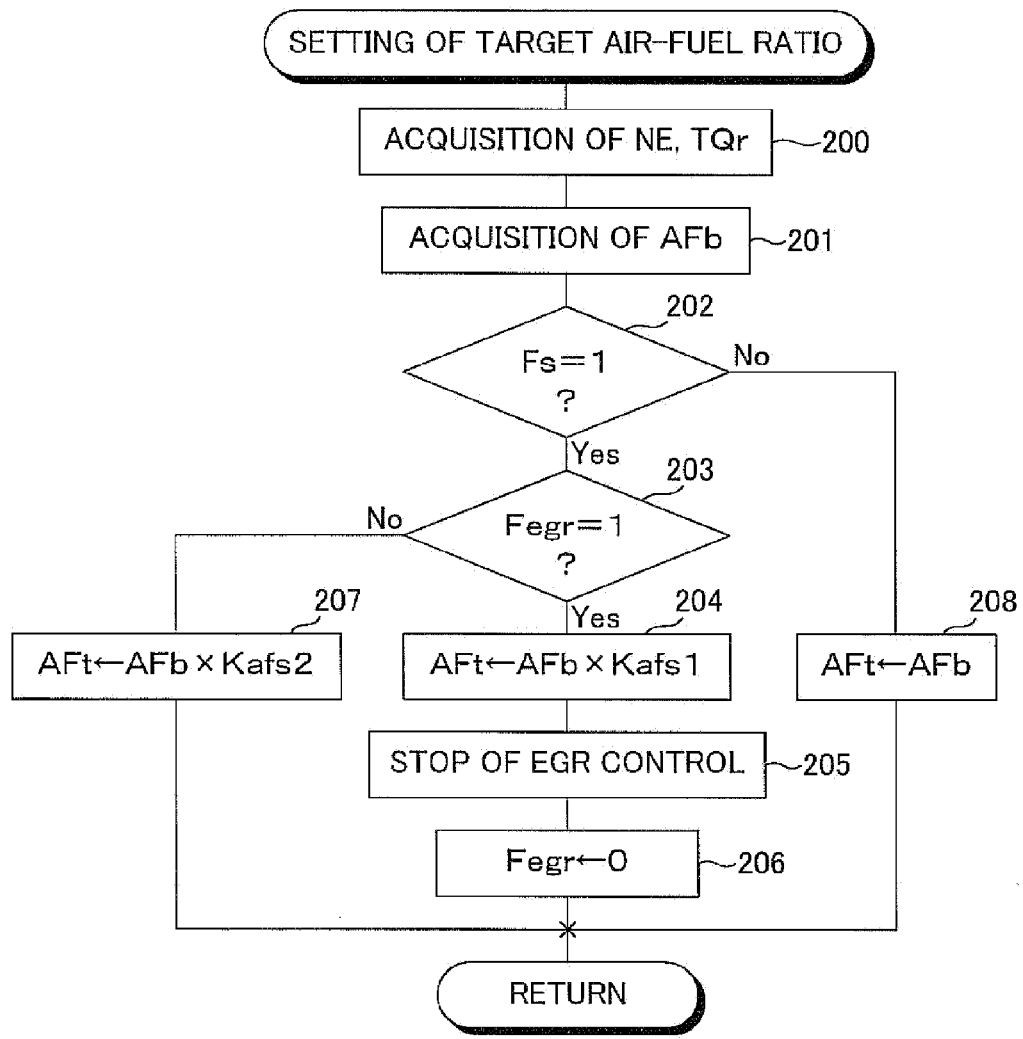
FIG. 12 is a view showing an example of a routine for performing a setting of a target air-fuel ratio according to a second embodiment.

Next, an example of a routine for performing the setting of the target air-fuel ratio according to the second embodiment will be explained. This example of the routine is shown in FIG. 12. It should be noted that the routine starts every time a predetermined time has been elapsed. When the routine shown in FIG. 12 starts, at first, at the step 200, the current engine speed NE and the current required engine torque TQr are acquired. Next, at the step 201, a base air-fuel ratio AFb corresponding to the engine speed NE and the required engine torque TQr acquired at the step 200 is acquired from the map shown in FIG. 4(B). Next, at the step 202, it is judged if an exhaust gas introduction shortage flag Fs is set (Fs=1). This exhaust gas introduction shortage flag is set when it is realized that the EGR device is under the exhaust gas introduction shortage state and is reset when it is not realized that the EGR device is under the exhaust gas introduction shortage state. When it is judged that Fs=1 at the step 20, the routine proceeds to the step 203. On the other hand, when it is not judged that Fs=1 at the step 202, the routine proceeds to the step 208 in which the base air-fuel ratio AFb acquired at the step 201 is set as a target air-fuel ratio AFt and then, the routine terminates.

When the routine proceeds to the step 203, it is judged if an EGR control flag Fegr is set (Fegr=1). This EGR control flag Fegr is set when the EGR control starts and is reset when the EGR control stops. When it is judged that Fegr=1 at the step 203, the routine proceeds to the step 204. On the other hand, when it is not judged that Fegr=1 at the step 203, the routine proceeds to the step 207 in which a value obtained by multiplying the base air-fuel ratio AFb acquired at the step 201 by a second amendment coefficient Kafs2 under the exhaust gas introduction shortage state (i.e., a value obtained by applying the second correction under the exhaust gas introduction shortage state to the base air-fuel ratio AFb) is set as a target air-fuel ratio Aft and then, the routine terminates.

When the routine proceeds to the step 204, a value obtained by multiplying the base air-fuel ratio AFb acquired at the step 201 by a first amendment coefficient Kafs1 under the exhaust gas introduction shortage state (i.e., a value obtained by applying the first correction under the exhaust gas introduction shortage state to the base air-fuel ratio AFb) is set as a target air-fuel ratio AFt. Next, at the step 205, the EGR control is stopped. Next, at the step 206, the EGR control flag Fegr is reset (Fegr←0) and then, the routine terminates.

It should be noted that for example, a routine shown in FIG. 10 may be employed as the routine for performing the calculation of the main FB amendment coefficient according to the second embodiment and for example, a routine shown in FIG. 11 may be employed as the routine for performing the calculation of the sub FB amendment coefficient according to the second embodiment.

Next, a third embodiment will be explained. It should be noted that constitutions and controls of the third embodiment which are not explained below are the same as those of the above-explained embodiments or are those obviously derived from the technical concept of the invention embodied in the third embodiment. In the third embodiment, during the engine operation, a base air-fuel ratio AFb corresponding to the current engine speed NE and the current required engine torque TQr is acquired from the map shown in FIG. 4(B). Then, when it is not realized that the EGR device is under the exhaust gas introduction shortage state, the acquired base air-fuel ratio is set as a target air-fuel ratio. It should be noted that in this case, the currently calculated main learning amendment coefficient is used for the amendment of the base fuel injection amount and the currently calculated sub learning amendment coefficient is used for the amendment of the upstream air-fuel ratio.

On the other hand, when it is realized that the EGR device is under the exhaust gas introduction shortage state and the EGR control is performed, a correction determined to eliminate the errors of the main and sub learning amendment coefficients (hereinafter, this correction will be referred to as—correction under the exhaust gas introduction shortage state—) is applied to the acquired base air-fuel ratio and then, the corrected base air-fuel ratio is set as a target air-fuel ratio. It should be noted that in this case, the main learning amendment coefficient at the exhaust gas introduction shortage state being realized is used for the amendment of the base fuel injection amount and the sub learning amendment coefficient at the exhaust gas introduction shortage state being realized is used for the amendment of the upstream air-fuel ratio.

Then, while it is realized that the EGR device is under the exhaust gas introduction shortage state and the EGR control is performed, the correction under the exhaust gas introduction shortage state is applied to the acquired base air-fuel ratio and then, the corrected base air-fuel ratio is set as the target air-fuel ratio. It should be noted that in this case, the currently calculated main learning amendment coefficient is used for the amendment of the base fuel injection amount and the currently calculated sub learning amendment coefficient is used for the amendment of the upstream air-fuel ratio.

On the other hand, when it is realized that the EGR device is under the exhaust gas introduction shortage state and the EGR control is not performed, the acquired base air-fuel ratio is set as the target air-fuel ratio while in place of the currently calculated main learning amendment coefficient, a new main learning amendment coefficient is calculated as a transient main learning amendment coefficient on the basis of the main learning amendment coefficient calculated at the timing where it is deemed that the EGR control is not performed and the EGR device is not under the exhaust gas introduction shortage state (hereinafter, this main learning amendment coefficient will be referred to as—main learning amendment coefficient under the normal state—) and then, a main FB amendment coefficient is calculated using the calculated transient main learning amendment coefficient. That is, in this case, the base fuel injection amount is amended by a new main learning amendment coefficient calculated on the basis of the currently calculated main learning amendment coefficient (i.e., is amended by the transient main learning amendment coefficient). It should be noted that in this case, at the exhaust gas introduction shortage state being realized, a new sub learning amendment coefficient is calculated on the basis of the currently calculated sub learning amendment coefficient.

Then, during it being realized that the EGR device is under the exhaust gas introduction shortage state and the EGR control being not performed, the acquired base air-fuel ratio is set as the target air-fuel ratio while a new transient main learning amendment coefficient is calculated on the basis of the transient main learning amendment coefficient calculated on the basis of the main learning amendment coefficient under the normal state and then, the main FB amendment coefficient is calculated using the calculated transient main learning amendment coefficient. That is, in this case, the base fuel injection amount is amended by the transient main learning amendment coefficient calculated on the basis of the transient main learning amendment coefficient calculated on the basis of the main learning amendment coefficient under the normal state. It should be noted that in this case, after the exhaust gas introduction shortage state being realized, the sub learning amendment coefficient calculated on the basis of the sub learning amendment coefficient at the exhaust gas introduction shortage state being realized is used as the sub learning amendment coefficient for amending the upstream air-fuel ratio.

Otherwise, in the third embodiment, when it is realized that the EGR device is under the exhaust gas introduction shortage state and the EGR control is not performed, the acquired base air-fuel ratio is set as the target air-fuel ratio while in place of the currently calculated sub learning amendment coefficient, a new sub learning amendment coefficient is calculated as a transient sub learning amendment coefficient on the basis of the sub learning amendment coefficient calculated at the timing where it is deemed that the EGR control is not performed and the EGR device is not under the exhaust gas introduction shortage state (hereinafter, this sub learning amendment coefficient will be referred to as—sub learning amendment coefficient under the normal state—) and then, the upstream air-fuel ratio is amended using the calculated transient sub learning amendment coefficient. That is, in this case, as a result, the base fuel injection amount is amended by a new sub learning amendment coefficient (i.e., the transient sub learning amendment coefficient) calculated on the basis of the sub learning amendment coefficient under the normal state. It should be noted that in this case, at the exhaust gas introduction shortage state being realized, a new main learning amendment coefficient is calculated on the basis of the currently calculated main learning amendment coefficient.

Then, during it being realized that the EGR device is under the exhaust gas introduction shortage state and the EGR control being not performed, the acquired base air-fuel ratio is set as the target air-fuel ratio while a new transient sub learning amendment coefficient is calculated on the basis of the transient learning amendment coefficient calculated on the basis of the sub learning amendment coefficient under the normal state and then, the upstream air-fuel ratio is amended using this newly calculated transient sub leaning amendment coefficient. That is, in this case, as a result, the base fuel injection amount is amended by the transient sub learning amendment coefficient calculated on the basis of the transient sub learning amendment coefficient calculated on the basis of the sub learning amendment coefficient under the normal state. It should be noted that in this case, after the exhaust gas introduction shortage state being realized, the main learning amendment coefficient calculated on the basis of the main learning amendment coefficient at the exhaust gas introduction shortage state being realized is used as the main learning amendment coefficient for calculating the main FB amendment coefficient.

Otherwise, in the third embodiment, when it is realized that the EGR device is under the exhaust gas introduction shortage state and the EGR control is not performed, the acquired base air-fuel ratio is set as a target air-fuel ratio, a new main learning amendment coefficient is calculated as a transient main learning amendment coefficient on the basis of the main learning amendment coefficient under the normal state in place of the currently calculated main learning amendment coefficient, a main FB amendment coefficient is calculated using the calculated transient main learning amendment coefficient while a new sub learning amendment coefficient is calculated as a transient sub learning amendment coefficient on the basis of the sub learning amendment coefficient under the normal state in place of the currently calculated sub learning amendment coefficient, and the upstream air-fuel ratio is amended using the calculated transient sub learning amendment coefficient. That is, in this case, as a result, the base fuel injection amount is amended by new main and sub learning amendment coefficients (i.e., the transient main and sub learning amendment coefficients) calculated on the basis of the currently calculated main and sub learning amendment coefficients under the normal state, respectively.

Then, during it being realized that the EGR device is under the exhaust gas introduction shortage state and the EGR control being not performed, the acquired base air-fuel ratio is set as a target air-fuel ratio, a new transient main learning amendment coefficient is calculated on the basis of the transient main learning amendment coefficient currently calculated on the basis of the main learning amendment coefficient under the normal state, a main FB amendment coefficient is calculated using this newly calculated transient main learning amendment coefficient while a new transient sub learning amendment coefficient is calculated on the basis of the transient sub learning amendment coefficient currently calculated on the basis of the sub learning amendment coefficient under the normal state, and the upstream air-fuel ratio is amendment using this newly calculated transient sub learning amendment coefficient. That is, in this case, as a result, the base fuel injection amount is amended by the transient main learning amendment coefficient calculated on the basis of the transient main learning amendment coefficient calculated on the basis of the main learning amendment coefficient under the normal state and the transient sub learning amendment coefficient calculated on the basis of the transient sub learning amendment coefficient calculated on the basis of the sub learning amendment coefficient.

According to the third embodiment, the following effects can be obtained. That is, as explained above, the main and sub learning amendment coefficients at the exhaust gas introduction shortage state being realized (hereinafter, the main and sub learning amendment coefficients will be collectively referred to as—learning amendment coefficients—) may be those calculated under the state in which the air-fuel ratio of the mixture gas formed in a particular combustion chamber (i.e., the combustion chamber which the exhaust gas of an amount smaller than a predetermined amount is introduced) is different from that formed in the remaining combustion chamber and therefore, there is at least an error relative to the suitable learning amendment coefficient in the learning amendment coefficients at the exhaust gas introduction shortage state being realized. Thus, even when the base fuel injection amount is amended using the learning amendment coefficients at the exhaust gas introduction shortage state being realized, there is a possibility that the exhaust emission property is not maintained high. Under the circumstances, as one of means for maintaining the exhaust emission property high, as explained above, there is means for correcting the base air-fuel ratio and setting the corrected base air-fuel ratio as a target air-fuel ratio without setting the base air-fuel as a target air-fuel ratio. However, according to the study by the inventors of this application, it has been realized that the exhaust emission property can be maintained high by applying a suitable measure to the learning amendment coefficients used for the amendment of the base fuel injection amount if the EGR control is not performed at and after the exhaust gas introduction shortage state being realized.

In this regard, in the third embodiment, when the EGR control is performed at the exhaust gas introduction shortage state being realized, a correction determined considering at least one of the learning error at the exhaust gas introduction shortage state being realized, the air-fuel ratio FB control error at the exhaust gas introduction shortage state being realized and the decrease of the exhaust emission property due to the exhaust gas introduction shortage is applied to the base air-fuel ratio and this corrected base air-fuel ratio is set as the target air-fuel ratio. That is, in the third embodiment, when the EGR control is performed at the exhaust gas introduction shortage state being realized, a suitable target air-fuel ratio is set in terms of obtaining the high exhaust emission property and then, the air-fuel ratio of the mixture gas is controlled by the feedback control on the basis of the thus set target air-fuel ratio. Thus, when the EGR control is performed at the exhaust gas introduction shortage state being realized, the effect that the exhaust emission property is maintained high can be obtained.

Further, in the third embodiment, thereafter, during the EGR control being performed, a correction determined considering at least one of the learning error at the exhaust gas introduction shortage state being realized, the air-fuel ratio FB control error at the exhaust gas introduction shortage state being realized and the decrease of the exhaust emission property due to the exhaust gas introduction shortage is applied to the base air-fuel ratio and this corrected base air-fuel ratio is set as the target air-fuel ratio. That is, in the third embodiment, after the exhaust gas introduction shortage state being realized, when the EGR control is performed, a suitable target air-fuel ratio is set in terms of obtaining the high exhaust emission property and then, the air-fuel ratio of the mixture gas is controlled by the feedback control on the thus set target air-fuel ratio. Thus, after the exhaust gas introduction shortage state being realized, the effect that the exhaust emission property is maintained high can be obtained.

Further, even when the EGR device is under the exhaust gas introduction shortage state and therefore, the exhaust gas of an amount smaller than a predetermined amount is introduced into a particular combustion chamber, if the EGR control is not performed, no deviation due to the deviation between the amounts of the exhaust gas introduced into the combustion chambers occurs between the air-fuel ratios of the mixture gases formed in the combustion chambers. That is, the cause for generating the deviation between the air-fuel ratios of the mixture gases formed in the combustion chambers is the error relative to the suitable learning amendment coefficients included in the learning amendment coefficients at the exhaust gas introduction shortage state being realized. Then, if the EGR control is not performed when the EGR device is under the exhaust gas introduction shortage state, it can be said that the learning amendment coefficients calculated when the EGR control is not performed and the EGR device is not under the exhaust gas introduction shortage state are the suitable learning amendment coefficients as the main and sub learning amendment coefficients used at the exhaust gas introduction shortage state being realized.

In this regards, in the third embodiment, when the EGR control is performed at the exhaust gas introduction shortage state being realized, the base air-fuel ratio is set as the target air-fuel ratio while the main learning amendment coefficient under the normal state is employed as the main learning amendment coefficient forming the basis for the calculation of a new main learning amendment coefficient and then, the base fuel injection amount is amended using this newly calculated main learning amendment coefficient under the normal state or the sub learning amendment coefficient under the normal state is employed as the sub learning amendment coefficient forming the basis for the calculation of a new sub learning amendment coefficient and then, the base fuel injection amount is amended using this newly calculated sub learning amendment coefficient under the normal state or the main and sub learning amendment coefficients under the normal state are employed as the main and sub learning amendment coefficients forming the basis for the calculation of new main and sub learning amendment coefficients and then, the base fuel injection amount is amended using these newly calculated main and sub learning amendment coefficients under the normal state. Thus, according to the third embodiment, when the EGR control is not performed at the exhaust gas introduction shortage state being realized, the effect that the exhaust emission property is maintained high can be obtained.

Further, in the third embodiment, thereafter, during the EGR control being not performed, the main and sub learning amendment coefficients are calculated on the basis of the main and sub learning amendment coefficients under the normal state and then, the base fuel injection amount is amended using the thus calculated main and sub learning amendment coefficients. According to this, when the EGR control is not performed after the exhaust gas introduction shortage state being realized, the effect that the exhaust emission property is maintained high can be obtained.

Figure 13:
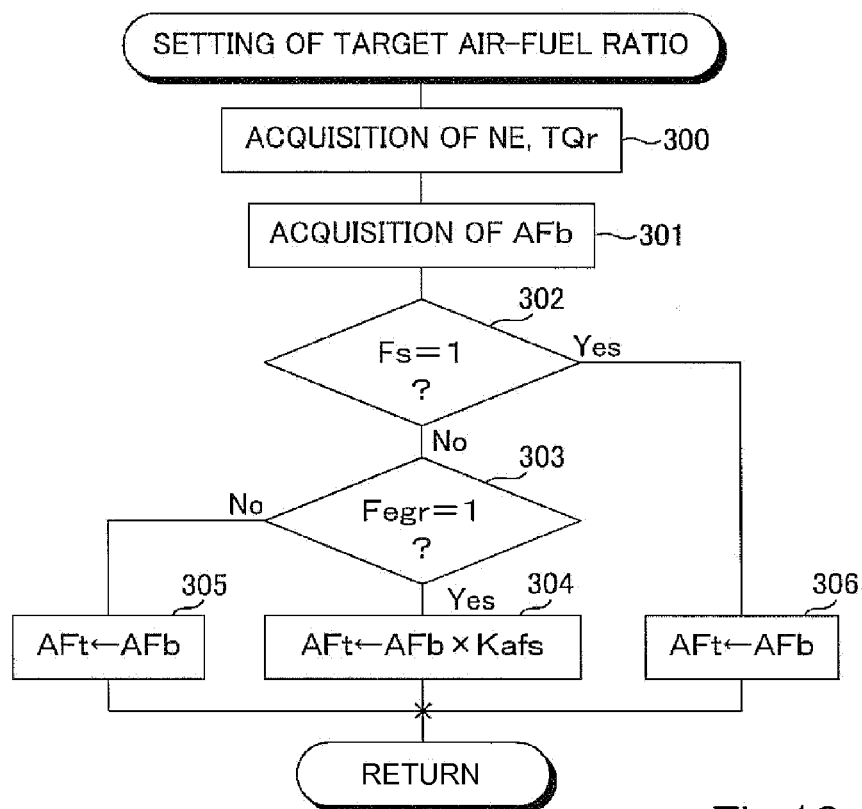
FIG. 13 is a view showing an example of a routine for performing a setting of a target air-fuel ratio according to a third embodiment.

Next, an example of a routine for performing the setting of the target air-fuel ratio according to the third embodiment will be explained. The example of this routine is shown in FIG. 13. It should be noted that this routine starts every time a predetermined time has been elapsed. Further, the steps 300 to 303 and 306 shown in FIG. 13 are the same as the steps 100 to 103 and 106 shown in FIG. 8, respectively and therefore, the explanations of these steps will be omitted. In the routine shown in FIG. 13, when the routine proceeds to the step 304, a value obtained by multiplying the base air-fuel ratio AFb acquired at the step 301 by the amendment coefficient Kafs under the exhaust gas introduction shortage state (i.e., a value obtained by applying the correction under the exhaust gas introduction shortage state to the base air-fuel ratio AFb) is set as the target air-fuel ratio AFt and then, the routine terminates. On the other hand, when the routine proceeds to the step 305, the base air-fuel ratio AFb acquired at the step 301 is set as the target air-fuel ratio AFt and then, the routine terminates.

Figure 14:
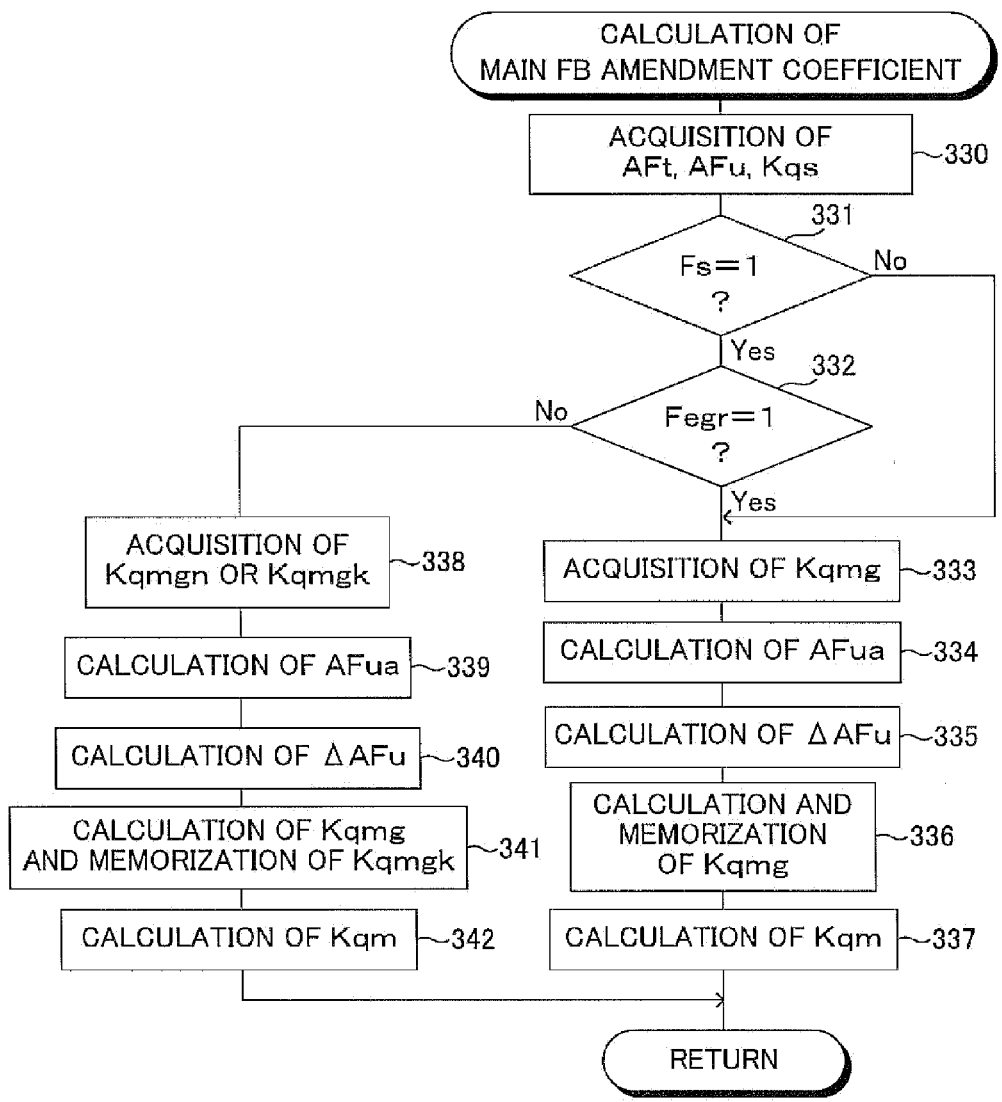
FIG. 14 is a view showing an example of a routine for performing a calculation of a main FB amendment coefficient according to the third embodiment.

Next, an example of a routine for performing the calculation of the main FB amendment coefficient according to the third embodiment will be explained. The example of this routine is shown in FIG. 14. It should be noted that this routine starts every time a predetermined time has been elapsed. When the routine shown in FIG. 14, at first, at the step 330, the current target air-fuel ratio AFt, the current upstream air-fuel ratio AFu and the current sub FB amendment coefficient Kqs are acquired. Next, at the step 331, it is judged if an exhaust gas introduction shortage flag Fs is set (Fs=1). This exhaust gas introduction shortage flag Fs is set when it is realized that the EGR device is under the exhaust gas introduction shortage state and is reset when it is not realized that the EGR device is under the exhaust gas introduction shortage state. When it is judged that Fs=1 at the step 331, the routine proceeds to the step 332. On the other hand, when it is not judged that Fs=1 at the step 331, the routine proceeds to the step 333.

When the routine proceeds to the step 332, it is judged if an EGR control flag Fegr is set (Fegr=1). This EGR control flag Fegr is set when the EGR control starts and is reset when the EGR control stops. When it is judged that Fegr=1 at the step 332, the routine proceeds to the step 333. On the other hand, when it is not judged that Fegr=1 at the step 332, the routine proceeds to the step 338.

When the routine proceeds to the step 333, the main learning amendment coefficient Kqmg memorized at the step 336 during the last performance of this routine. Next, at the step 334, an amended upstream air-fuel ratio AFua is calculated by applying the upstream air-fuel ratio AFu and the sub FB amendment coefficient Kqs acquired at the step 330 to the above formula 3. Next, at the step 335, an instant upstream air-fuel ratio deviation ΔAFu is calculated by applying the target air-fuel ratio AFt acquired at the step 330 and the amended upstream air-fuel ratio AFua calculated at the step 334 to the above formula 4. Next, at the step 336, a new main learning amendment coefficient Kqmg is calculated by applying the main learning amendment coefficient Kqmg acquired at the step 333 and the instant upstream air-fuel ratio deviation ΔAFu calculated at the step 335 to the above formula 5 and then, this newly calculated main learning amendment coefficient Kqmg is memorized in the electronic control unit as an updated main learning amendment coefficient. That is, thereby, the main learning amendment coefficient is updated. Next, at the step 337, a new main FB amendment coefficient Kqm is calculated by applying the instant upstream air-fuel ratio deviation ΔAFu calculated at the step 335 and the main learning amendment coefficient Kqmg calculated at the step 336 to the above formula 6 and then, the routine terminates.

When the routine having proceeded to the step 333 proceeds to the step 338 first, the main learning amendment coefficient Kqmgn under the normal state is acquired as the main learning amendment coefficient Kqmg and otherwise, the transient main learning amendment coefficient Kqmg memorized at the step 341 during the last performance of this routine is acquired as the main learning amendment coefficient Kqmg. Next, at the step 339, an amended upstream air-fuel ratio AFua is calculated by applying the upstream air-fuel ratio AFu and the sub FB amendment coefficient Kqs acquired at the step 330 to the above formula 3. Next, at the step 340, an instant upstream air-fuel ratio ΔAFu is calculated by applying the target air-fuel ratio AFt acquired at the step 330 and the amended upstream air-fuel ratio AFua calculated at the step 339 to the above formula 4. Next, at the step 341, a new main learning amendment coefficient Kqmg is calculated by applying the main learning amendment coefficient Kqmg acquired at the step 338 and the instant upstream air-fuel ratio deviation ΔAFu calculated at the step 340 to the above formula and then, this newly calculated main learning amendment coefficient Kqmg is memorized in the electronic control unit as an updated transient main learning amendment coefficient Kqmgk. That is, thereby, the transient main learning amendment coefficient is updated. Next, at the step 342, a new main FB amendment coefficient Kqm is calculated by applying the instant upstream air-fuel ratio deviation ΔAFu calculated at the step 340 and the main learning amendment coefficient Kqmg calculated at the step 341 to the above formula 6 and then, the routine terminates.

Figure 15:
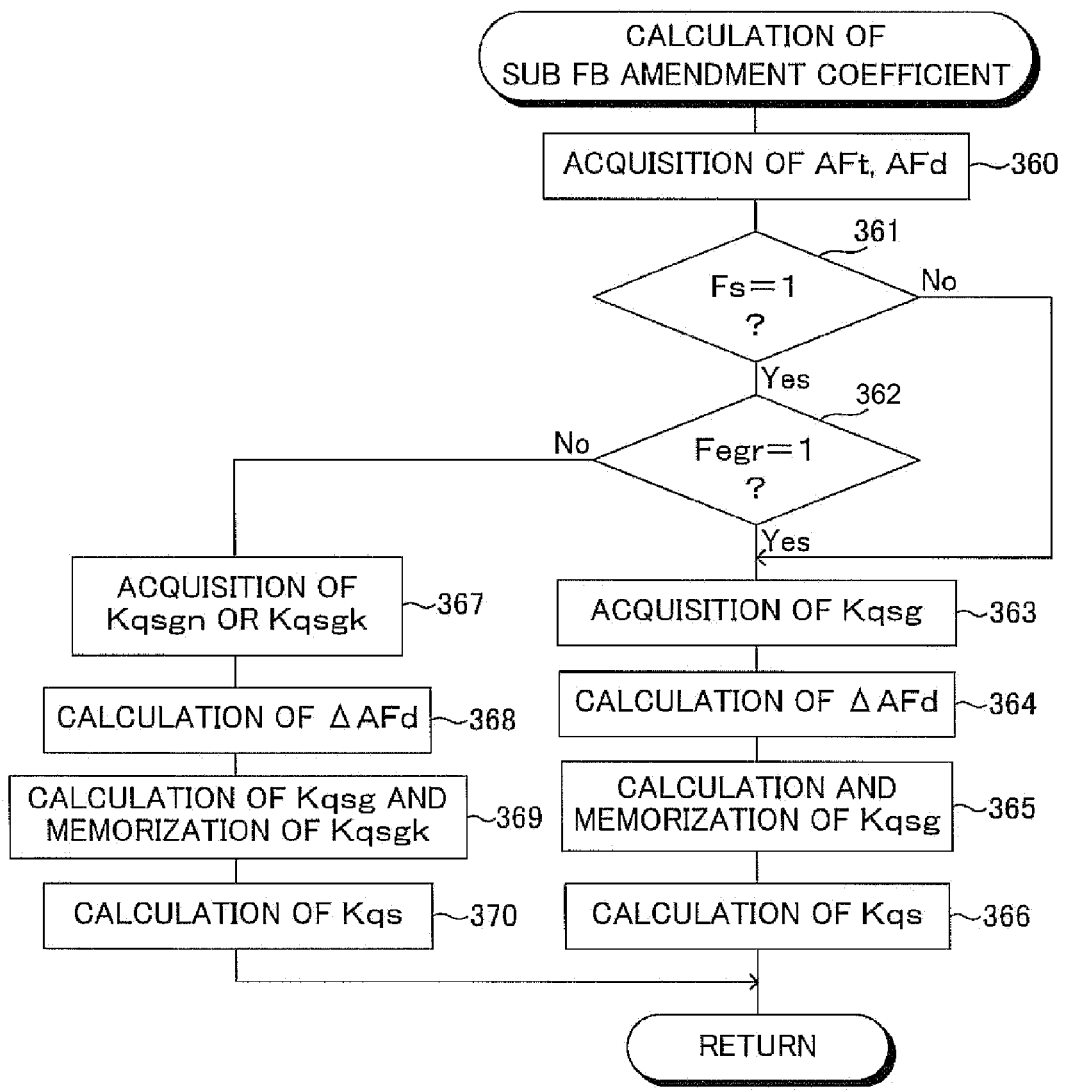
FIG. 15 is a view showing an example of a routine for performing a calculation of a sub FB amendment coefficient according to the third embodiment.

Next, an example of a routine for performing the calculation of the sub FB amendment coefficient according to the third embodiment will be explained. The example of this routine is shown in FIG. 15. It should be noted that this routine starts every time a predetermined time has been elapsed. When the routine shown in FIG. 15 starts, at first, at the step 360, the current target air-fuel ratio AFt and the current downstream air-fuel ratio AFd are acquired. Next, at the step 361, it is judged if an exhaust gas introduction shortage flag Fs is set (Fs=1). This exhaust gas introduction shortage flag Fs is set when it is realized that the EGR device is under the exhaust gas introduction shortage state and is reset when it is not realized that the EGR device is under the exhaust gas introduction shortage. When it is judged that Fs=1 at the step 361, the routine proceeds to the step 362. On the other hand, when it is not judged that Fs=1 at the step 361, the routine proceeds to the step 363.

When the routine proceeds to the step 362, it is judged if an EGR control flag Fegr is set (Fegr=1). This EGR control flag Fegr is set when the EGR control starts and is reset when the EGR control stops. When it is judged that Fegr=1 at the step 362, the routine proceeds to the step 363. On the other hand, when it is not judged that Fegr=1 at the step 362, the routine proceeds to the step 367.

When the routine proceeds to the step 363, the sub learning amendment coefficient Kqsg memorized at the step 365 during the last performance of this routine is acquired. Next, at the step 364, an instant downstream air-fuel ratio ΔAFd is calculated by applying the target and downstream air-fuel ratios AFt and AFd acquired at the step 360 to the above formula 7. Next, at the step 365, a new sub learning amendment coefficient Kqsg is calculated by applying the sub learning amendment coefficient Kqsg acquired at the step 363 and the instant downstream air-fuel ratio deviation ΔAFd calculated at the step 364 to the above formula 8 and then, this newly calculated sub learning amendment coefficient Kqsg is memorized in the electronic control unit as an updated sub learning amendment coefficient. That is, thereby, the sub learning amendment coefficient is updated. Next, at the step 366, a new sub FB amendment coefficient Kqs is calculated by applying the instant downstream air-fuel ratio deviation ΔAFd calculated at the step 364 and the sub learning amendment coefficient Kqsg calculated at the step 365 to the above formula 9 and then, the routine terminates.

When the routine having proceeded to the step 363 proceeds to the step 367 first, the sub learning amendment coefficient Kqsgn under the normal state is acquired as a sub learning amendment coefficient Kqsg and otherwise, the transient sub learning amendment coefficient Kqsg memorized at the step 368 during the last performance of this routine is acquired as the sub learning amendment coefficient Kqsgk. Next, at the step 368, an instant downstream air-fuel ratio deviation ΔAFd is calculated by applying the target and downstream air-fuel ratios AFt and AFd acquired at the step 360 to the above formula 7. Next, at the step 369, a new sub learning amendment coefficient Kqsg is calculated by applying the sub learning amendment coefficient Kqsg acquired at the step 367 and the instant downstream air-fuel ratio deviation ΔAFd calculated at the step 368 to the above formula 8 and then, this newly calculated sub learning amendment coefficient Kqsg is memorized in the electronic control unit as an updated transient sub learning amendment coefficient Kqsgk. That is, thereby, the transient sub learning amendment coefficient is updated. Next, at the step 370, a new sub FB amendment coefficient Kqs is calculated by applying the instant downstream air-fuel ratio deviation ΔAFd calculated at the step 368 and the sub learning amendment coefficient Kqsg calculated at the step 369 to the above formula 9 and then, the routine terminates.

Next, a fourth embodiment will be explained. It should be noted that the constitutions and controls of the fourth embodiment which are not explained below are the same as those of the above-explained embodiments or are those obviously derived from the technical concept of the invention embodied in the fourth embodiment. In the fourth embodiment, relating to the third embodiment, when it is realized that the EGR device is under the exhaust gas introduction shortage state and the EGR control is performed, a predetermined correction (i.e., the correction under the exhaust gas introduction shortage state) is applied to the acquired base air-fuel ratio and then, this corrected base air-fuel ratio is set as a target air-fuel ratio while the EGR control is stopped.

According to the fourth embodiment, the following effects can be obtained. That is, as explained above, when the EGR device is under the exhaust gas introduction shortage state, the possibility that the exhaust emission property can be maintained high increases by controlling the air-fuel ratio of the mixture gas by the feedback control while the EGR control is stopped, rather than by controlling the air-fuel ratio of the mixture gas while the EGR control is performed. In the fourth embodiment, when it is realized that the EGR device is under the exhaust gas introduction shortage state and the EGR control is performed, the EGR control is stopped and therefore, the calculation of the main and sub learning amendment coefficients is continued while the EGR control is stopped. Thus, according to the fourth embodiment, the effect that the exhaust emission property is maintained high can be obtained.

Figure 16:
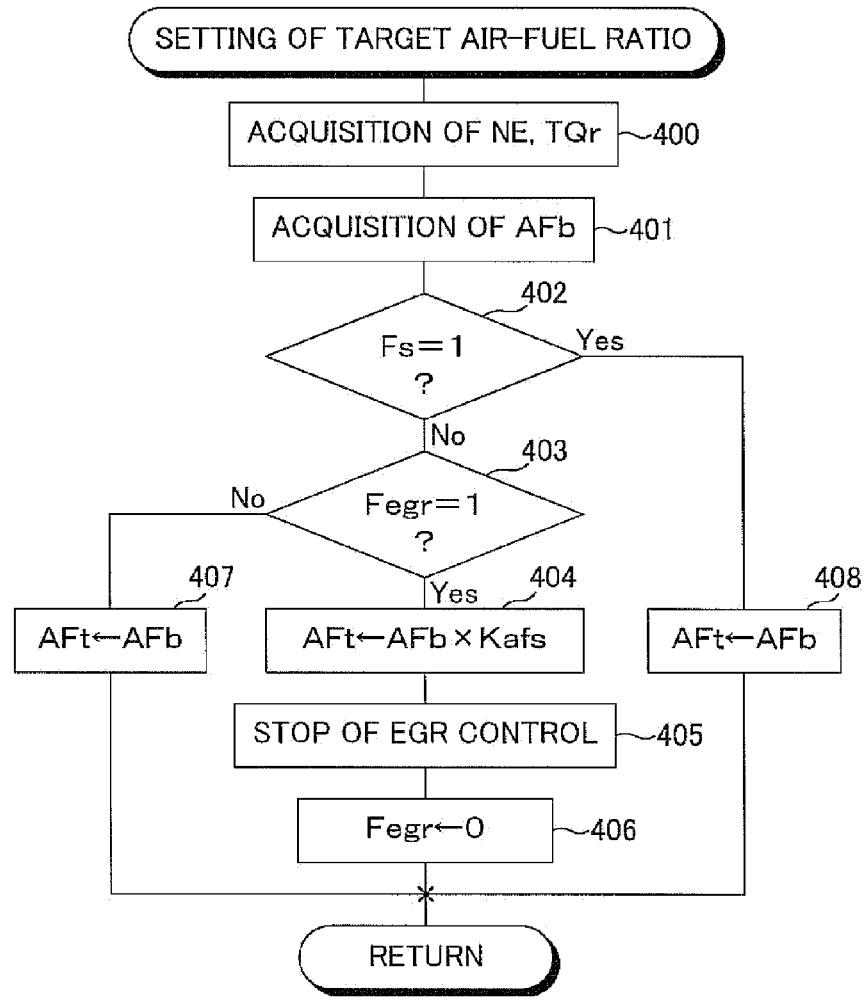
FIG. 16 is a view showing an example of a routine for performing a setting of a target air-fuel ratio according to a fourth embodiment.

Next, an example of a routine for performing the setting of the target air-fuel ratio according to the fourth embodiment will be explained. The example of this routine is shown in FIG. 16. It should be noted that this routine starts every time a predetermined time has been elapsed. When the routine shown in FIG. 16 starts, at first, at the step 400, the current engine speed NE and the current required engine torque TQ are acquired. Next, at the step 401, a base air-fuel ratio corresponding to the engine speed NE and the required engine torque TQr acquired at the step 400 is acquired from the map shown in FIG. 4(B). Next, at the step 402, it is judged if an exhaust gas introduction shortage flag Fs is set (Fs=1). This exhaust gas introduction shortage flag Fs is set when it is realized that the EGR device is under the exhaust gas introduction shortage state and is reset when it is not realized that the EGR device is under the exhaust gas introduction shortage state. When it is judged that Fs=1 at the step 402, the routine proceeds to the step 403. On the other hand, when it is not judged that Fs=1 at the step 402, the routine proceeds to the step 408 in which the base air-fuel ratio AFb acquired at the step 401 is set as a target air-fuel ratio AFt and then, the routine terminates.

When the routine proceeds to the step 403, it is judged if an EGR control flag Fegr is set (Fegr=1). This EGR control flag Fegr is set when the EGR control starts and is reset when the EGR control stops. When it is judged that Fegr=1 at the step 403, the routine proceeds to the step 404. On the other hand, when it is not judged that Fegr=1 at the step 403, the routine proceeds to the step 407 in which the base air-fuel ratio AFb acquired at the step 401 is set as the target air-fuel ratio AFt and then, the routine terminates.

When the routine proceeds to the step 404, a value obtained by multiplying the base air-fuel ratio AFb acquired at the step 401 by an amendment coefficient Kafs under the exhaust gas introduction shortage state (i.e., a value obtained by applying the correction under the exhaust gas introduction shortage state to the base air-fuel ratio AFb) is set as the target air-fuel ratio AFt. Next, at the step 405, the EGR control is stopped. Next, at the step 406, the EGR control flag Fegr is reset (Fegr←0) and then, the routine terminates.

It should be noted that for example, as the routine for performing the calculation of the main FB amendment coefficient according to the fourth embodiment, the routine shown in FIG. 14 can be employed and as the routine for performing the calculation of the sub FB amendment coefficient according to the fourth embodiment, the routine shown in FIG. 15 can be employed.

Next, a fifth embodiment will be explained. It should be noted that constitutions and controls of the fifth embodiment which are not explained below are the same as those of the above-explained embodiments or are those obviously derived from the technical concept of the invention embodied in the fifth embodiment. In the fifth embodiment, during the engine operation, a base air-fuel ratio AFb corresponding to the current engine speed NE and the current required engine torque TQr is acquired from the map shown in FIG. 4(B). Then, when it is not realized that the EGR device is under the exhaust gas introduction shortage state, the acquired base air-fuel ratio is set as a target air-fuel ratio. It should be noted that in this case, the currently calculated main and sub learning amendment coefficients are used for the amendments of the base fuel injection amount and the upstream air-fuel ratio, respectively.

On the other hand, when it is realized that the EGR device is under the exhaust gas introduction shortage state and the EGR control is performed, a correction determined for eliminating the errors of the main and sub learning amendment coefficients (hereinafter, this correction will be referred to as—correction under the exhaust gas introduction shortage state—) is applied to the acquired base air-fuel ratio and then, this corrected base air-fuel ratio is set as the target air-fuel ratio. It should be noted that in this case, the main and sub learning amendment coefficients at the exhaust gas introduction shortage state being realized are used for the amendments of the base fuel injection amount and the upstream air-fuel ratio, respectively.

Then, during it being realized that the EGR device is under the exhaust gas introduction shortage state and the EGR control being performed, the correction under the exhaust gas introduction shortage state is applied to the acquired base air-fuel ratio and then, this corrected base air-fuel ratio is set as the target air-fuel ratio. It should be noted that also in this case, the currently calculated main and sub learning amendment coefficients are used for the amendments of the base fuel injection amount and the upstream air-fuel ratio, respectively.

On the other hand, in the case that it is realized that the EGR device is under the exhaust gas introduction shortage state, the EGR control is not performed and the currently calculated main learning amendment coefficient is a value which can compensate a stationary air-fuel ratio deviation when the EGR control is not performed (hereinafter, this value will be referred to as—stationary air-fuel deviation compensation value at the EGR control being not performed), the acquired base air-fuel ratio is set as the target air-fuel ratio while a new main learning amendment coefficient is calculated as a continuous main learning amendment coefficient on the basis of the currently calculated main learning amendment coefficient and a main FB amendment coefficient is calculated using this newly calculated continuous main learning amendment coefficient. That is, in this case, the base fuel injection amount is amended by the new main learning amendment coefficient (i.e., the continuous main learning amendment coefficient) calculated on the basis of the main learning amendment coefficient at the exhaust gas introduction shortage state being realized. It should be noted that in this case, a new sub learning amendment coefficient is calculated on the basis of the currently calculated sub learning amendment coefficient and then, the sub FB amendment coefficient is calculated using this newly calculated sub learning amendment coefficient.

Then, thereafter, as far as it is realized that the EGR device is under the exhaust gas introduction shortage state and the EGR control is not performed, the acquired base air-fuel ratio is set as the target air-fuel ratio while a new continuous main learning amendment coefficient is calculated on the basis of the above-mentioned continuous main learning amendment efficient and then, the main FB amendment coefficient is calculated using this newly calculated continuous main learning amendment coefficient. It should be noted that also in this case, the sub FB amendment coefficient is calculated using the sub learning amendment coefficient calculated on the basis of the sub learning amendment coefficient at the exhaust gas introduction shortage state being realized.

On the other hand, in the case that it is realized that the EGR device is under the exhaust gas introduction shortage state, the EGR control is not performed and the currently calculated main learning amendment coefficient does not correspond to the stationary air-fuel ratio deviation compensation value at the EGR control being not performed, the acquired base air-fuel ratio is set as the target air-fuel ratio while a new main learning amendment coefficient is calculated as a transient main learning amendment coefficient on the basis of the currently calculated main learning amendment coefficient under the normal state and then, a main FB amendment coefficient is calculated using this newly calculated transient main learning amendment coefficient. That is, in this case, the base fuel injection amount is amended by the new main learning amendment coefficient (i.e., the transient main learning amendment coefficient) calculated on the basis of the main learning amendment coefficient under the normal state. It should be noted that also in this case, a new sub learning amendment coefficient is calculated on the basis of the currently calculated sub learning amendment coefficient and then, a sub FB amendment coefficient is calculated using this newly calculated sub learning amendment coefficient.

Then, thereafter, as far as the continuous main learning amendment coefficient which is the main learning amendment coefficient calculated on the basis of the main learning amendment coefficient at the exhaust gas introduction shortage state being realized does not correspond to the stationary air-fuel ratio deviation compensation value at the EGR control being not performed, the acquired base air-fuel ratio is set as the target air-fuel ratio while the main FB amendment coefficient is calculated using a new transient main learning amendment coefficient calculated on the basis of the currently calculated transient main learning amendment coefficient. It should be noted that in this case, the sub FB amendment coefficient is calculated using the sub learning amendment coefficient calculated on the basis of the sub learning amendment coefficient at the exhaust gas introduction shortage state being realized.

Then, thereafter, when the continuous main learning amendment coefficient becomes the stationary air-fuel ratio deviation compensation value at the EGR control being not performed, the acquired base air-fuel ratio is set as the target air-fuel ratio while the main FB amendment coefficient is calculated using a new continuous main learning amendment coefficient calculated on the basis of the currently calculated continuous main learning amendment efficient. It should be noted that in this case, the sub FB amendment coefficient is calculated using the sub learning amendment coefficient calculated on the basis of the sub learning amendment coefficient at the exhaust gas introduction shortage state being realized.

Then, thereafter, as far as it is realized that the EGR device is under the exhaust gas introduction shortage state and the EGR control is not performed, the acquired base air-fuel ratio is set as the target air-fuel ratio while the main FB amendment coefficient is calculated using a new continuous main learning amendment coefficient calculated on the basis of the currently calculated continuous main learning amendment coefficient. It should be noted that also in this case, the sub FB amendment coefficient is calculated using the sub learning amendment coefficient calculated on the basis of the sub learning amendment coefficient at the exhaust gas introduction shortage state being realized.

Otherwise, in the fifth embodiment, in the case that it is realized that the EGR device is under the exhaust gas introduction shortage state, the EGR control is not performed and the currently calculated sub learning amendment coefficient is a value which can compensate the stationary air-fuel ratio deviation when the EGR control is not performed (hereinafter, this value will be referred to as—stationary air-fuel ratio compensation value at the EGR control being not performed), the acquired base air-fuel ratio is set as the target air-fuel ratio while a new sub learning amendment coefficient is calculated as the continuous sub learning amendment coefficient on the basis of the currently calculated sub learning amendment coefficient and then, the sub FB amendment coefficient is calculated using this newly calculated continuous sub learning amendment coefficient. That is, in this case, the base fuel injection amount is amended by a new sub learning amendment coefficient (i.e., the continuous sub learning amendment coefficient) calculated on the basis of the currently calculated sub learning amendment coefficient at the exhaust gas introduction shortage state being realized. It should be noted that in this case, a new main learning amendment coefficient is calculated on the basis of the currently calculated main learning amendment coefficient and then, the main FB amendment coefficient is calculated using this newly calculated main learning amendment coefficient.

Then, thereafter, as far as it is realized that the EGR device is under the exhaust gas introduction shortage state and the EGR control is not performed, the acquired base air-fuel ratio is set as the target air-fuel ratio while a new continuous sub learning amendment coefficient is calculated on the basis of the currently calculated continuous sub learning amendment coefficient and then, the sub FB amendment coefficient is calculated using this newly calculated continuous sub learning amendment coefficient. It should be noted that also in this case, the main FB amendment coefficient is calculated using the main learning amendment coefficient calculated on the basis of the sub learning amendment coefficient at the exhaust gas introduction shortage state being realized.

On the other hand, in the case that it is realized that the EGR device is under the exhaust gas introduction shortage state, the EGR control is not performed and the currently calculated sub learning amendment coefficient does not correspond to the stationary air-fuel ratio deviation compensation value at the EGR control being not performed, the acquired base air-fuel ratio is set as the target air-fuel ratio while a new sub learning amendment coefficient is calculated as the transient sub learning amendment coefficient on the basis of the sub learning amendment coefficient under the normal state and then, the sub FB amendment coefficient is calculated using this newly calculated transient sub learning amendment coefficient. That is, in this case, the base fuel injection amount is amended by a new sub learning amendment coefficient (i.e., the transient sub learning amendment coefficient) calculated on the basis of the sub learning amendment coefficient under the normal state. It should be noted that also in this case, a new main learning amendment coefficient is calculated on the basis of the currently calculated main learning amendment coefficient and then, the main FB amendment coefficient is calculated using this newly calculated main learning amendment coefficient.

Then, thereafter, as far as the continuous sub learning amendment coefficient which is the sub learning amendment coefficient calculated on the basis of the sub learning amendment coefficient at the exhaust gas introduction shortage state being realized does not correspond to the stationary air-fuel ratio deviation compensation value at the EGR control being not performed, the acquired base air-fuel ratio is set as the target air-fuel ratio while the sub FB amendment coefficient is calculated using a new transient sub learning amendment coefficient calculated on the basis of the currently calculated transient sub learning amendment coefficient. It should be noted that in this case, the main FB amendment coefficient is calculated using the main learning amendment coefficient calculated on the basis of the main learning amendment coefficient at the exhaust gas introduction shortage state being realized.

Then, thereafter, when the continuous sub learning amendment coefficient becomes the stationary air-fuel ratio deviation compensation value at the EGR control being not performed, the acquired base air-fuel ratio is set as the target air-fuel ratio while the sub FB amendment coefficient is calculated using a new continuous sub learning amendment coefficient calculated on the basis of the currently calculated continuous sub learning amendment coefficient. It should be noted that in this case, the sub FB amendment coefficient is calculated using the main learning amendment coefficient calculated on the basis of the main learning amendment coefficient at the exhaust gas introduction shortage state being realized.

Then, thereafter, as far as it is realized that the EGR device is under the exhaust gas introduction shortage state and the EGR control is not performed, the acquired base air-fuel ratio is set as the target air-fuel ratio while the sub FB amendment coefficient is calculated using a new continuous sub learning amendment coefficient calculated on the basis of the currently calculated continuous sub learning amendment coefficient. It should be noted that also in this case, the main FB amendment coefficient is calculated using the main learning amendment coefficient calculated on the basis of the main learning amendment coefficient at the exhaust gas introduction shortage state being realized.

Otherwise, in the fifth embodiment, in the case that it is realized that the EGR device is under the exhaust gas introduction shortage state, the EGR control is performed and the currently calculated main and sub learning amendment coefficients correspond to the stationary air-fuel ratio deviation compensation values at the EGR control being not performed, the acquired base air-fuel ratio is set as the target air-fuel ratio, a new main learning amendment coefficient is calculated as the continuous main learning amendment coefficient on the basis of the currently calculated main learning amendment coefficient and then, the main FB amendment coefficient is calculated using this newly calculated continuous main learning amendment coefficient while a new sub learning amendment coefficient is calculated as the continuous sub learning amendment coefficient on the basis of the currently calculated sub learning amendment coefficient and then, the sub FB amendment coefficient is calculated using this newly calculated continuous sub learning amendment coefficient. That is, in this case, the base fuel injection amount is amended by new main and sub learning amendment coefficients (i.e., the continuous main and sub learning amendment coefficients) calculated on the basis of the main and sub learning amendment coefficients at the exhaust gas introduction shortage state being realized, respectively.

Then, thereafter, as far as it is realized that the EGR device is under the exhaust gas introduction shortage state and the EGR control is not performed, the acquired base air-fuel ratio is set as the target air-fuel ratio, a new continuous main learning amendment coefficient is calculated on the basis of the currently calculated continuous main learning amendment coefficient and then, the main FB amendment coefficient is calculated using this newly calculated continuous main learning amendment coefficient while a new continuous sub learning amendment coefficient is calculated on the basis of the currently calculated continuous sub learning amendment coefficient and then, the sub FB amendment coefficient is calculated using this newly calculated continuous sub learning amendment coefficient.

On the other hand, in the case that it is realized that the EGR device is under the exhaust gas introduction shortage state, the EGR control is performed, the currently calculated main learning amendment coefficient does not correspond to the stationary air-fuel ratio deviation compensation value at the EGR control being not performed and the currently calculated sub learning amendment coefficient corresponds to the stationary air-fuel ratio deviation compensation value at the EGR control being not performed, the acquired base air-fuel ratio is set as the target air-fuel ratio, a new main learning amendment coefficient is calculated as the transient main learning amendment coefficient on the basis of the currently calculated main learning amendment coefficient under the normal state and the main FB amendment coefficient is calculated using this newly calculated transient main learning amendment coefficient while a new sub learning amendment coefficient is calculated as the continuous sub learning amendment coefficient on the basis of the currently calculated sub learning amendment coefficient and then, the sub FB amendment coefficient is calculated using this newly calculated continuous sub learning amendment coefficient. That is, in this case, the base fuel injection amount is amended by the new main and sub learning amendment coefficients (i.e., the transient main and sub learning amendment coefficients) calculated on the basis of the currently calculated main and sub learning amendment coefficients, respectively.

Then, thereafter, as far as the continuous main learning amendment coefficient which is the main learning amendment coefficient calculated on the basis of the main learning amendment coefficient at the exhaust gas introduction shortage state being realized does not correspond to the stationary air-fuel ratio deviation compensation value at the EGR control being not performed, the acquired base air-fuel ratio is set as the target air-fuel ratio, the main FB amendment coefficient is calculated using a new transient main learning amendment coefficient calculated on the basis of the currently calculated transient main learning amendment coefficient while the sub FB amendment coefficient is calculated using a new continuous sub learning amendment coefficient calculated on the basis of the currently calculated continuous sub learning amendment coefficient.

Then, thereafter, when the continuous main learning amendment coefficient becomes the stationary air-fuel ratio deviation compensation value at the EGR control being not performed, the acquired base air-fuel ratio is set as the target air-fuel ratio and the main FB amendment coefficient is calculated using a new continuous main learning amendment coefficient calculated on the basis of the currently calculated continuous main learning amendment coefficient while the sub FB amendment coefficient is calculated using a new continuous sub learning amendment coefficient calculated on the basis of the currently calculated continuous sub learning amendment coefficient.

Then, thereafter, as far as it is realized that the EGR device is under the exhaust gas introduction shortage state and the EGR control is not performed, the acquired base air-fuel ratio is set as the target air-fuel ratio and the main FB amendment coefficient is calculated using a new continuous main learning amendment coefficient calculated on the basis of the currently calculated continuous main learning amendment coefficient while the sub FB amendment coefficient is calculated using a new continuous sub learning amendment coefficient calculated on the basis of the currently calculated continuous sub learning amendment coefficient.

On the other hand, when it is realized that the EGR device is under the exhaust gas introduction shortage state, the EGR control is not performed, the currently calculated main learning amendment coefficient corresponds to the stationary air-fuel ratio deviation compensation value at the EGR control being not performed and the currently calculated sub learning amendment coefficient is not the stationary air-fuel ratio deviation compensation value at the EGR control being not performed, the acquired base air-fuel ratio is set as the target air-fuel ratio, a new main learning amendment coefficient is calculated as the continuous main learning amendment coefficient on the basis of the currently calculated main learning amendment coefficient and the main FB amendment coefficient is calculated using this newly calculated main learning amendment coefficient while a new sub learning amendment coefficient is calculated as the transient sub learning amendment coefficient on the basis of the sub learning amendment coefficient under the normal state and the sub FB amendment coefficient is calculated using this newly calculated transient sub learning amendment coefficient. That is, in this case, the base fuel injection amount is amended by the main and sub learning amendment coefficients (i.e., the continuous main and sub learning amendment coefficients) newly calculated on the basis of the currently calculated main learning amendment coefficient and the sub learning amendment coefficient under the normal state, respectively.

Then, thereafter, as far as the continuous sub learning amendment coefficient which is the sub learning amendment coefficient calculated on the basis of the sub learning amendment coefficient at the exhaust gas introduction shortage state being realized, the acquired base air-fuel ratio is set as the target air-fuel ratio and the main FB amendment coefficient is calculated using a continuous main learning amendment coefficient newly calculated on the basis of the currently calculated main learning amendment coefficient while the sub FB amendment coefficient is calculated using a transient sub learning amendment coefficient newly calculated on the basis of the currently calculated transient sub learning amendment coefficient.

Then, thereafter, when the continuous sub learning amendment coefficient becomes the stationary air-fuel ratio deviation compensation value at the EGR control being not performed, the acquired base air-fuel ratio is set as the target air-fuel ratio and the main FB amendment coefficient is calculated using a continuous main learning amendment coefficient newly calculated on the basis of the currently calculated continuous main learning amendment coefficient while the sub FB amendment coefficient is calculated using a continuous sub learning amendment coefficient newly calculated on the basis of the currently calculated continuous sub learning amendment coefficient.

Then, thereafter, as far as it is realized that the EGR device is under the exhaust gas introduction shortage state and the EGR control is not performed, the acquired base air-fuel ratio is set as the target air-fuel ratio and the main FB amendment coefficient is calculated using a new continuous main learning amendment coefficient calculated on the basis of the current continuous main learning amendment coefficient while the sub FB amendment coefficient is calculated using a new continuous sub learning amendment coefficient calculated on the basis of the current continuous sub learning amendment coefficient.

On the other hand, when it is realized that the EGR device is under the exhaust gas introduction shortage state, the EGR control is not performed and the currently calculated main and sub learning amendment coefficients do not correspond to the stationary air-fuel ratio deviation compensation values at the EGR control being not performed, respectively, the acquired base air-fuel ratio is set as the target air-fuel ratio, a new main learning amendment coefficient is calculated as the transient main learning amendment coefficient on the basis of the main learning amendment coefficient under the normal state and the main FB amendment coefficient is calculated using this calculated transient main learning amendment coefficient while a new sub learning amendment coefficient is calculated as the transient sub learning amendment coefficient on the basis of the sub learning amendment coefficient under the normal state and the sub FB amendment coefficient is calculated using this calculated transient sub learning amendment coefficient. That is, in this case, the base fuel injection amount is amended by new main and sub learning amendment coefficients (i.e., the continuous main and transient sub learning amendment coefficients) calculated on the basis of the main and sub learning amendment coefficients under the normal state, respectively.

Then, thereafter, as far as the continuous main learning amendment coefficient which is the main learning amendment coefficient calculated on the basis of the main learning amendment coefficient at the exhaust gas introduction shortage state being realized does not correspond to the stationary air-fuel ratio deviation compensation value at the EGR control being not performed and the continuous sub learning amendment coefficient which is the sub learning amendment coefficient calculated on the basis of the sub learning amendment coefficient does not correspond to the stationary air-fuel ratio deviation compensation value at the EGR control being not performed, the acquired base air-fuel ratio is set as the target air-fuel ratio and the main FB amendment coefficient is calculated using a new transient main learning amendment coefficient calculated on the basis of the current transient main learning amendment coefficient while the sub FB amendment coefficient is calculated using a new transient sub learning amendment coefficient calculated on the basis of the current transient sub learning amendment coefficient.

Then, thereafter, when the continuous main and sub learning amendment coefficients become the stationary air-fuel ratio deviation compensation values at the EGR control being performed, respectively, the acquired base air-fuel ratio is set as the target air-fuel ratio and the main FB amendment coefficient is calculated using a new continuous main learning amendment coefficient calculated on the basis of the current continuous main learning amendment coefficient while the sub FB amendment coefficient is calculated using a new continuous sub learning amendment coefficient calculated on the basis of the current continuous sub learning amendment coefficient.

Then, thereafter, as far as it is realized that the EGR device is under the exhaust gas introduction shortage state and the EGR control is not performed, the acquired base air-fuel ratio is set as the target air-fuel ratio and the main FB amendment coefficient is calculated using a new continuous main learning amendment coefficient calculated on the basis of the current continuous main learning amendment coefficient while the sub FB amendment coefficient is calculated using a new continuous sub learning amendment coefficient calculated on the basis of the current continuous sub learning amendment coefficient.

According to the fifth embodiment, the following effects can be obtained. That is, as explained above, the main and sub learning amendment coefficients (hereinafter, these main and sub learning amendment coefficients will be collectively referred to as—learning amendment coefficients—) at the exhaust gas introduction shortage state being realized may be those calculated under the state in which the air-fuel ratio of the mixture gas formed in the particular combustion chamber (i.e., the combustion chamber which the exhaust gas having an amount smaller than a predetermined amount is introduced) is different from those formed in the remaining combustion chamber and therefore, the learning amendment coefficients at the exhaust gas introduction shortage state being realized may include at least a deviation relative to the suitable learning amendment coefficients. Thus, even when the base fuel injection amount is amendment using the learning amendment coefficients at the exhaust gas introduction shortage state being realized, the exhaust emission property may not be maintained high. Under the circumstances, as one of the means for maintaining the exhaust emission property high, as explained above, without setting the base air-fuel ratio as the target air-fuel ratio, means for correcting the base air-fuel ratio and setting this corrected base air-fuel ratio as the target air-fuel ratio may be employed. However, from the study by the inventors of this application, if the EGR control is not performed at the exhaust gas introduction shortage state being realized and thereafter, it has been realized that the exhaust emission property can be maintained high by applying a suitable measure to the learning amendment coefficients used for the feedback control of the air-fuel ratio of the mixture gas.

In this regard, in the fifth embodiment, in the case that the EGR control is performed at the exhaust gas introduction shortage state being realized, the correction determined considering the learning deviation at the exhaust gas introduction shortage state being realized, the air-fuel ratio FB control deviation at the exhaust gas introduction shortage state being realized and the decrease of the exhaust emission property due to the exhaust gas introduction shortage is applied to the base air-fuel ratio and this corrected base air-fuel ratio is set as the target air-fuel ratio. That is, in the fifth embodiment, in the case that the EGR control is performed at the exhaust gas introduction shortage being realized, the suitable target air-fuel ratio in terms of obtaining the high exhaust emission property and the air-fuel ratio of the mixture gas is controlled by the feedback control on the basis of the thus set target air-fuel ratio. Thus, according to the fifth embodiment, in the case that the EGR control is performed at the exhaust gas introduction shortage state is realized, the effect that the exhaust emission property is maintained high can be obtained.

Further, in the fifth embodiment, when the EGR control is performed after the exhaust gas introduction shortage state being realized, the correction determined considering the learning error at the exhaust gas introduction shortage state being realized, the air-fuel ratio FB control error at the exhaust gas introduction shortage state being realized and the decrease of the exhaust emission property due to the exhaust gas introduction shortage is applied to the base air-fuel ratio and this corrected base air-fuel ratio is set as the target air-fuel ratio. That is, in the fifth embodiment, when the EGR control is performed after the exhaust gas introduction shortage state being realized, the suitable target air-fuel ratio in terms of obtaining the high exhaust emission property is set and the air-fuel ratio of the mixture gas is controlled by the feedback control on the basis of the thus set target air-fuel ratio. Thus, according to the fifth embodiment, when the EGR control is performed after the exhaust gas introduction shortage state being realized, the effect that the exhaust emission property is maintained high can be obtained.

Further, even when the EGR device is under the exhaust gas introduction shortage state and therefore, the exhaust gas having an amount smaller than the predetermined amount is introduced into the particular combustion chamber, a variation does not occur between the air-fuel ratios of the mixture gases formed in the combustion chambers due to the variation between the amounts of the exhaust gases introduced into the combustion chambers. That is, the matter causing the variation between the air-fuel ratios of the mixture gases formed in the combustion chambers when the EGR control is not performed at the exhaust gas introduction shortage state being realized is the error relative to the suitable learning amendment coefficients included in the learning amendment coefficients at the exhaust gas introduction shortage state being realized. In other words, when the learning amendment coefficient amendment coefficients at the exhaust gas introduction shortage state being realized correspond to the stationary air-fuel ratio deviation compensation values at the EGR control being not performed, the high exhaust emission property can be obtained even if the base fuel injection amount is amended using these learning coefficients.

In this regard, in the fifth embodiment, in the case that the currently calculated learning amendment coefficients corresponds to the stationary air-fuel ratio deviation compensation values at the EGR control being not performed when the EGR control is not performed at the exhaust gas introduction shortage state being realized, the base air-fuel ratio is set as the target air-fuel ratio while the learning amendment coefficients are employed as the learning amendment coefficients for the basis of the calculation of new learning amendment coefficients and the base fuel injection amount is amended using these learning amendment coefficients. Thus, according to the fifth embodiment, in the case that the currently calculated learning amendment coefficients correspond to the stationary air-fuel ratio deviation compensation values at the EGR control being not performed when the EGR control is not performed at the exhaust gas introduction shortage state being realized, the effect that the exhaust emission property is maintained high can be obtained.

Further, thereafter, as far as the EGR control is not performed, the learning amendment coefficients are calculated on the basis of the learning amendment coefficient at the exhaust gas introduction shortage state being realized and the base fuel injection amount is amended using the thus calculated learning amendment coefficients. According to this, when the EGR control is not performed after the exhaust gas introduction shortage state being realized, the effect that the exhaust emission property is maintained high can be obtained.

On the other hand, in the fifth embodiment, in the case that the main learning amendment coefficient at the exhaust gas introduction shortage state being realized does not correspond to the stationary air-fuel ratio deviation compensation value at the EGR control being not performed when the EGR control is not performed at the exhaust gas introduction shortage state being realized, the base air-fuel ratio is set as the target air-fuel ratio while the main learning amendment coefficient under the normal state is employed as the main learning amendment coefficient for the basis of the calculation of a new main learning amendment coefficient and the base fuel injection amount is amended using this main learning amendment coefficient under the normal state. As explained above, if the EGR control is not performed when the EGR device is under the exhaust gas introduction shortage state, it can be said that the main learning amendment coefficient under the normal state is the suitable main learning amendment coefficient as the main learning amendment coefficient used at the exhaust gas introduction shortage state being realized. Therefore, according to the fifth embodiment, in the case that the main learning amendment coefficient at the exhaust gas introduction shortage state being realized does not correspond to the stationary air-fuel ratio deviation compensation value at the EGR control being not performed when the EGR control is not performed at the exhaust gas introduction shortage being realized, the effect that the exhaust emission property is maintained high can be obtained.

Further, in the fifth embodiment, thereafter, as far as the EGR control is not performed and the continuous main learning amendment coefficient (i.e., the main learning amendment coefficient calculated on the basis of the main learning amendment coefficient at the exhaust gas introduction shortage state being realized) does not correspond to the stationary air-fuel ratio deviation compensation value at the EGR control being not performed, the base fuel injection amount is amended using the transient main learning amendment coefficient (i.e., the main learning amendment coefficient calculated on the basis of the main learning amendment coefficient under the normal state). According to this, thereafter, the effect that the exhaust emission property is maintained high can be obtained.

Further, in the fifth embodiment, thereafter, when the EGR control has not been performed and the continuous main learning amendment coefficient becomes the stationary air-fuel ratio deviation compensation value at the EGR control being not performed, the base air-fuel ratio is set as the target air-fuel ratio while the base fuel injection amount is amended using the continuous main learning amendment coefficient. The current continuous main learning amendment coefficient is the main learning amendment coefficient calculated, after the exhaust gas introduction shortage state being realized, on the basis of the main learning amendment coefficient at the exhaust gas introduction shortage state being realized. Therefore, it can be said that the current continuous main learning amendment coefficient is the main learning amendment coefficient suitable as the main learning amendment coefficient for compensating the stationary air-fuel ratio deviation when the EGR device is under the exhaust gas introduction shortage state and the EGR control is not performed. Therefore, according to this, the effect that the exhaust emission property is maintained high can be obtained.

Further, in the fifth embodiment, thereafter, as far as the EGR control is not performed, the base fuel injection amount is amended using the continuous main learning amendment coefficient. Thus, thereafter, the effect that the further high exhaust emission property is maintained can be obtained.

Further, in the fifth embodiment, when the EGR control is not performed at the exhaust gas introduction shortage state being realized and the sub learning amendment coefficient at the exhaust gas introduction shortage state being realized does not correspond to the stationary air-fuel ratio deviation compensation value at the EGR control being not performed, the base air-fuel ratio is set as the target air-fuel ratio while the sub learning amendment coefficient under the normal state is employed as the sub learning amendment coefficient for the basis of the calculation of the new sub learning amendment coefficient and the base fuel injection amount is amended using this sub learning amendment coefficient under the normal state. As explained above, even when the EGR device is under the exhaust gas introduction shortage state, if the EGR control is not performed, it can be said that the sub learning amendment coefficient under the normal state is the sub learning amendment coefficient suitable as the sub learning amendment coefficient used at the exhaust gas introduction shortage state being realized. Therefore, according to the fifth embodiment, even when the EGR control is not performed at the exhaust gas introduction shortage state being realized and the sub learning amendment coefficient at the exhaust gas introduction shortage state being realized does not correspond to the stationary air-fuel ratio deviation compensation value at the EGR control being not performed, the effect that the exhaust emission property is maintained high can be obtained.

Further, in the fifth embodiment, thereafter, as far as the EGR control is not performed and the continuous sub learning amendment coefficient (i.e., the sub learning amendment coefficient calculated on the basis of the sub learning amendment coefficient at the exhaust gas introduction shortage state being realized) does not correspond to the stationary air-fuel ratio deviation compensation value at the EGR control being not performed, the base fuel injection amount is amended using the transient sub learning amendment coefficient (i.e., the sub learning amendment coefficient calculated on the basis of the sub learning amendment coefficient under the normal state). According to this, thereafter, the effect that the exhaust emission property is maintained high can be obtained.

Further, in the fifth embodiment, thereafter, when the EGR control has not been performed and the continuous sub learning amendment coefficient becomes the stationary air-fuel ratio deviation compensation value at the EGR control being not performed, the base air-fuel is set as the target air-fuel ratio while the base fuel injection amount is amended using the continuous sub learning amendment coefficient. The current continuous sub learning amendment coefficient is the sub learning amendment coefficient calculated, after the exhaust gas introduction shortage state being realized, on the basis of the sub learning amendment coefficient at the exhaust gas introduction shortage state being realized. Therefore, it can be said that the current continuous sub learning amendment coefficient is the sub learning amendment coefficient suitable as the sub learning amendment coefficient for compensating the stationary air-fuel ratio deviation when the EGR device is under the exhaust gas introduction shortage state and the EGR control is not performed. Therefore, according to this, the effect that the exhaust emission property is maintained high can be obtained.

Further, in the fifth embodiment, thereafter, as far as the EGR control is not performed, the base fuel injection amount is amended using the continuous sub learning amendment coefficient. Thus, thereafter, the effect that the further high exhaust emission property is maintained can be obtained.

It should be noted that for example, the routine shown in FIG. 13 can be employed as the routine for performing the setting of the target air-fuel ratio according to the fifth embodiment.

Figure 17:
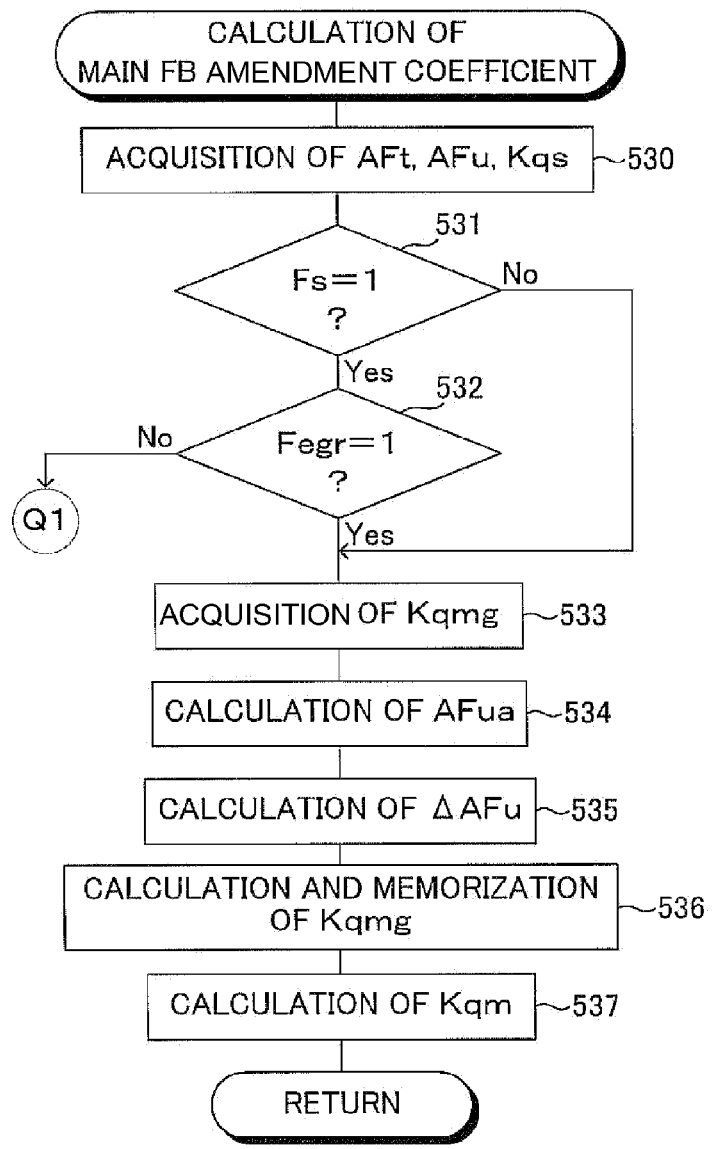
FIG. 17 is a view showing a part of an example of a routine for performing a calculation of a main FB amendment coefficient according to a fifth embodiment.
Figure 18:
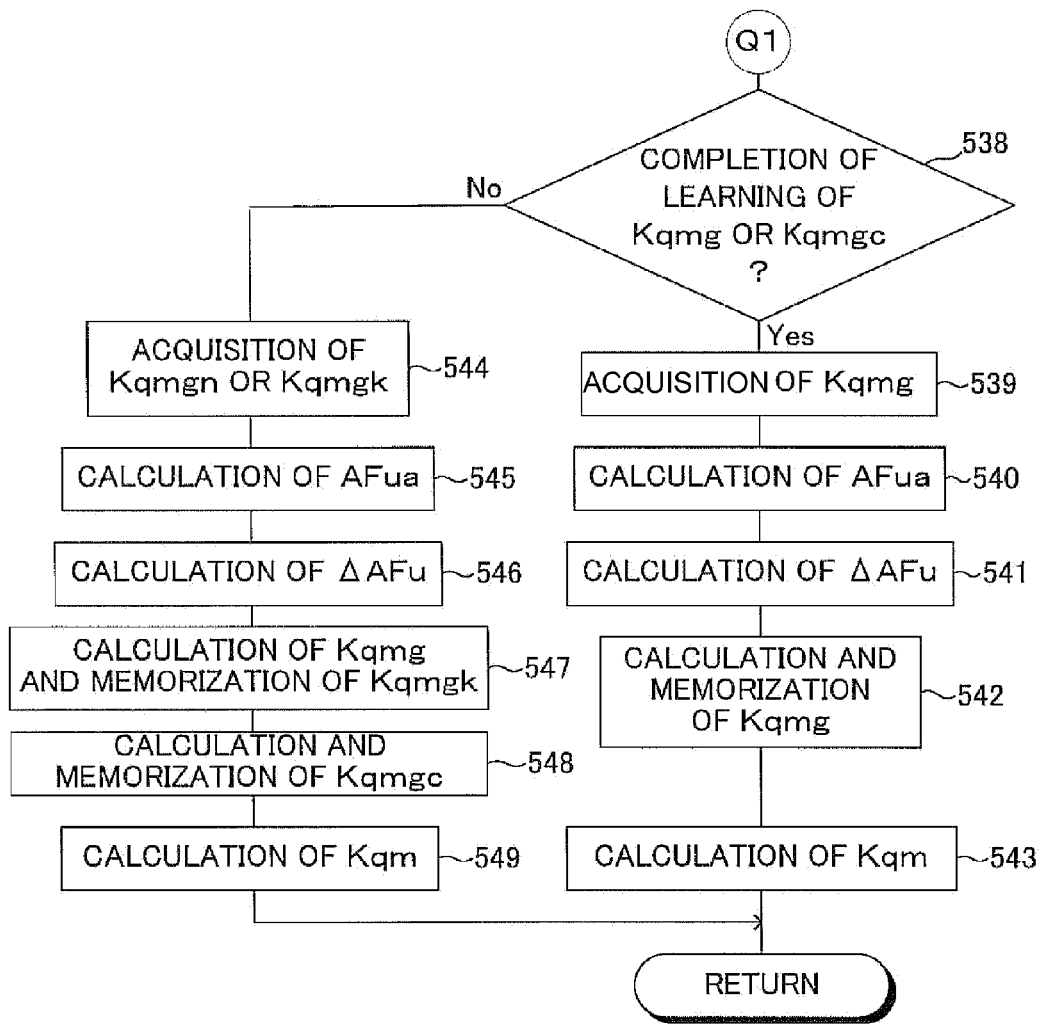
FIG. 18 is a view showing the remaining part of the example of the routine for performing the calculation of the main FB amendment coefficient according to the fifth embodiment.

Next, an example of a routine for performing the calculation of the main FB amendment coefficient according to the fifth embodiment will be explained. The example of this routine is shown in FIGS. 17 and 18. It should be noted that this routine starts every time a predetermined time has been elapsed. When the routine shown in FIGS. 17 and 18 starts, at first, at the step 530, the current target air-fuel ratio AFt, the current upstream air-fuel ratio AFu and the current sub FB amendment coefficient Kqs are acquired. Next, at the step 531, it is judged if an exhaust gas introduction shortage flag Fs is set (Fs=1). This exhaust gas introduction shortage flag Fs is set when it is realized that the EGR device is under the exhaust gas introduction shortage state and is reset when it is not realized that the EGR device is under the exhaust gas introduction shortage state. When it is judged that Fs=1 at the step 531, the routine proceeds to the step 532. On the other hand, when it is not judged that Fs=1 at the step 531, the routine proceeds to the step 533.

When the routine proceeds to the step 532, it is judged if an EGR control flag Fegr is set (Fegr=1). This EGR control flag Fegr is set when the EGR control starts and is reset when the EGR control stops. When it is judged that Fegr=1 at the step 532, the routine proceeds to the step 533. On the other hand, when it is not judged that Fegr=1 at the step 532, the routine proceeds to the step 538.

When the routine proceeds to the step 533, the main learning amendment coefficient Kqmg memorized at the step 536 at the last performance of this routine is acquired. Next, at the step 534, an amended upstream air-fuel ratio AFua is calculated by applying the upstream air-fuel ratio AFu and the sub FB amendment coefficient Kqs acquired at the step 530 to the above formula 3. Next, at the step 535, an instant upstream air-fuel ratio deviation ΔAFu is calculated by applying the target air-fuel ratio AFt acquired at the step 530 and the amended upstream air-fuel ratio AFua calculated at the step 534 to the above formula 4. Next, at the step 536, a new main learning amendment coefficient Kqmg is calculated by applying the main learning amendment coefficient Kqmg acquired at the step 533 and the instant upstream air-fuel ratio deviation ΔAFu calculated at the step 535 to the above formula 5 and this calculated main learning amendment coefficient Kqmg is memorized as an updated main learning amendment coefficient in the electronic control unit. That is, thereby, the main learning amendment coefficient is updated. Next, at the step 537, a new main FB amendment coefficient Kqm is calculated by applying the instant upstream air-fuel ratio deviation ΔAFu calculated at the step 535 and the main learning amendment coefficient Kqmg calculated at the step 536 to the above formula 6 and then, the routine terminates.

When the routine proceeds to the step 538, if this time routine is not one performed next to the routine performing the step 548, it is judged if the learning of the currently calculated main learning amendment coefficient Kqmg is completed (i.t. it is judged if the main learning amendment coefficient corresponds to the stationary air-fuel ratio deviation compensation value at the EGR control being not performed) and on the other hand, if this time routine is one performed next to the routine performing the step 548, it is judged if the learning of the continuous main learning amendment coefficient Kqmg memorized at the step 548 at the last performance of this routine is completed (i.e., it is judged if the continuous main learning amendment coefficient Kqmg corresponds to the stationary air-fuel ratio deviation compensation value at the EGR control being not performed. In this regard, when it is judged that the learning of the currently calculated main learning amendment coefficient Kqmg is completed or when it is judged that the learning of the continuous main learning amendment coefficient Kqmgc memorized at the step 548 at the last performance of this routine is completed, the routine proceeds to the step 539. On the other hand, when it is judged that the learning of the currently calculated main learning amendment coefficient Kqmg is not completed or when it is judged that the learning of the continuous main learning amendment coefficient Kqmgc memorized at the step 548 at the last performance of this routine is not completed, the routine proceeds to the step 544.

When it is judged at the step 538 that the learning of the currently calculated main learning amendment coefficient Kqmg is completed and then, the routine proceeds to the step 539, the currently calculated main learning amendment coefficient Kqmg is acquired and on the other hand, when it is judged at the step 538 that the learning of the continuous main learning amendment coefficient Kqmgc memorized at the step 548 at the last performance of this routine is completed and then, the routine proceeds to the step 539, the continuous main learning amendment coefficient Kqmgc memorized at the step 548 at the last performance of this routine is acquired as the main learning amendment coefficient Kqmg. Next, at the step 540, an amended upstream air-fuel ratio AFua is calculated by applying the upstream air-fuel ratio AFu and the sub FB amendment coefficient Kqs acquired at the 530 to the above formula 3. Next, at the step 541, an instant upstream air-fuel ratio deviation ΔAFu is calculated by applying the target air-fuel ratio AFt acquired at the step 530 and the amended upstream air-fuel ratio AFua calculated at the step 540 to the above formula 4. Next, at the step 542, a new main learning amendment coefficient Kqmg is calculated by applying the main learning amendment coefficient Kqmg acquired at the step 539 and the instant upstream air-fuel ratio deviation ΔAFu calculated at the step 541 to the above formula 5 and then, this calculated main learning amendment coefficient Kqmg is memorized as an updated main learning amendment coefficient Kqmgk in the electronic control unit. That is, thereby, the main learning amendment coefficient is updated. Next, at the step 543, a new main FB amendment coefficient Kqm is calculated by applying the instant upstream air-fuel ratio deviation ΔAFu calculated at the step 541 and the main learning amendment coefficient Kqmg calculated at the step 542 to the above formula 6 and then, the routine terminates.

In the case that the routine proceeds to the step 544, when the routine having proceeded from the step 531 to the step 533 or from the step 532 to the step 533 or from the step 538 to the step 539 first proceeds to the step 544, the main learning amendment coefficient under the normal state Kqmgn is acquired as the main learning amendment coefficient Kqmg and otherwise, the transient main learning amendment coefficient Kqmgk memorized at the step 547 at the last performance of this routine is acquired as the main learning amendment coefficient Kqmg. Next, at the step 545, an amended upstream air-fuel ratio AFua is calculated by applying the upstream air-fuel ratio AFu and the sub FB amendment coefficient Kqs acquired at the step 530 to the above formula 3. Next, at the step 546, an instant upstream air-fuel ratio deviation ΔAFu is calculated by applying the target air-fuel ratio AFt acquired at the step 530 and the amended upstream air-fuel ratio AFua calculated at the step 545 to the above formula 4. Next, a the step 547, a new main learning amendment coefficient Kqmg is calculated by applying the main learning amendment coefficient Kqmg acquired at the step 544 and the instant upstream air-fuel ratio deviation ΔAFu calculated at the step 546 to the above formula 5 and then, this calculated main learning amendment coefficient Kqmg is memorized as an updated transient main learning amendment coefficient Kqmgk in the electronic control unit. That is, thereby, the transient main learning amendment coefficient is updated. Next, at the step 548, when the routine having proceeded from the step 531 to the step 533 or from the step 532 to the step 533 first proceeds to the step 544, a new continuous main learning amendment coefficient Kqmgc is calculated by applying the main learning amendment coefficient Kqmg memorized at the step 536 at the last performance of this routine and the instant upstream air-fuel ratio deviation ΔAFu calculated at the step 546 to the above formula 5 and then, this calculated continuous main learning amendment coefficient Kqmgc is memorized as an updated continuous main learning amendment coefficient Kqmgc in the electronic control unit. On the other hand, at the step 548, when the routine having proceeded from the step 538 to the step 539 first proceeds to the step 544, a new continuous main learning amendment coefficient Kqmgc is calculated by applying the main learning amendment coefficient Kqmg memorized at the step 542 at the last performance of this routine and the instant upstream air-fuel ratio deviation ΔAFu calculated at the step 546 to the above formula 5 and then, this calculated continuous main learning amendment coefficient Kqmgc is memorized as an updated continuous main learning amendment coefficient Kqmgc in the electronic control unit. Otherwise, at the step 548, a new continuous main learning amendment coefficient Kqmgc is calculated by applying the main learning amendment coefficient Kqmg calculated at the step 548 at the last performance of this routine and the instant upstream air-fuel ratio deviation ΔAFu calculated at the step 546 to the above formula 5 and then, this calculated continuous main learning amendment coefficient Kqmgc is memorized as an updated continuous learning amendment coefficient Kqmgc in the electronic control unit. That is, thereby, the continuous main learning amendment coefficient is updated. Next, a new main FB amendment coefficient Kqm is calculated by applying the instant upstream air-fuel ratio deviation ΔAFu calculated at the step 546 and the main learning amendment coefficient Kqmg calculated at the step 547 to the above formula 6 at step 549 and then, the routine terminates.

Figure 19:
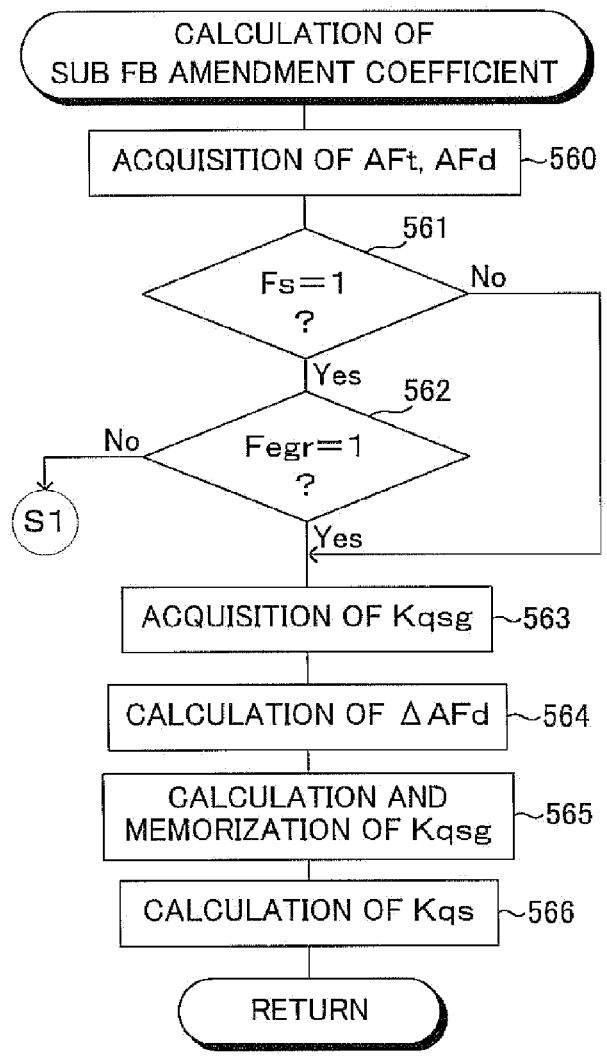
FIG. 19 is a view showing a part of a routine for performing a calculation of a sub FB amendment coefficient according to the fifth embodiment.
Figure 20:
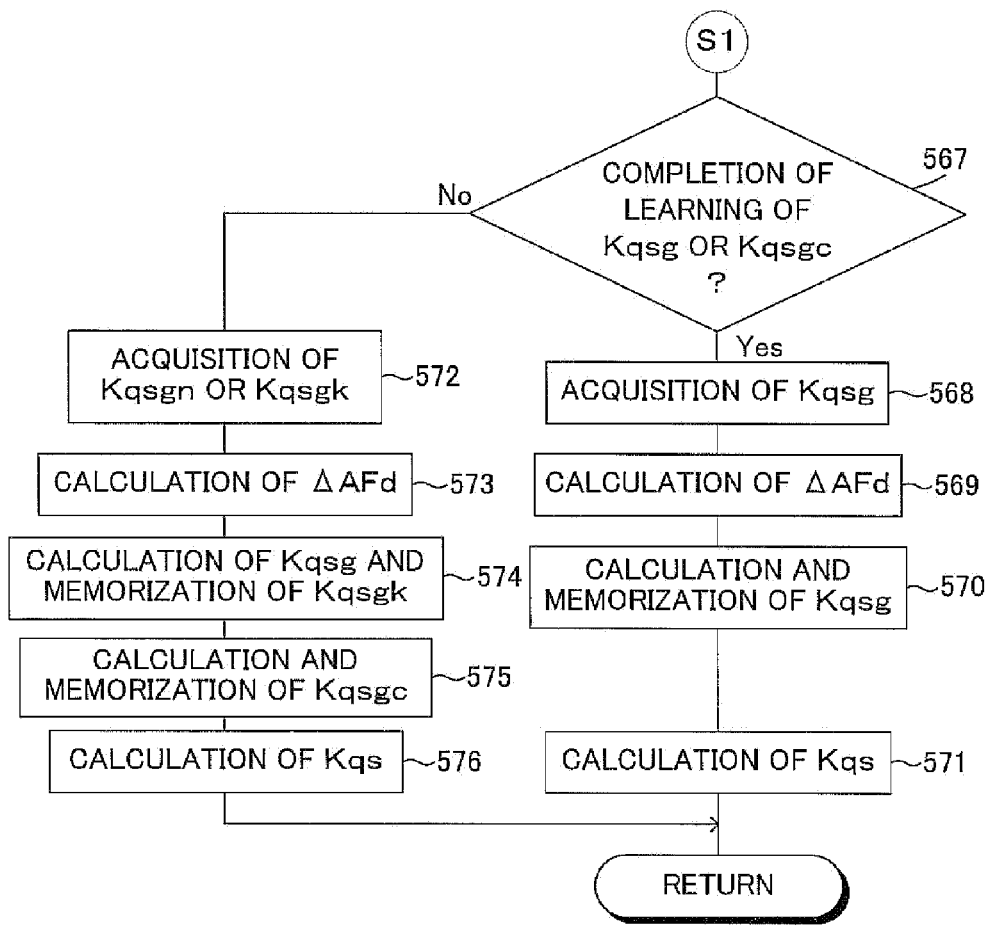
FIG. 20 is a view showing the remaining part of the example of the routing for performing the calculation of the sub FB amendment coefficient according to the fifth embodiment.

Next, an example of a routine for performing the calculation of the sub FB amendment coefficient according to the fifth embodiment will be explained. The example of this routine is shown in FIGS. 19 and 20. It should be noted that this routine starts every time a predetermined time has been elapsed. When the routine shown in FIGS. 19 and 20 starts, at first, at the step 560, the current target air-fuel ratio AFt and the current downstream air-fuel ratio AFd are acquired. Next, at the step 561, it is judged if an exhaust gas introduction shortage flag Fs is set (Fs=1). This exhaust gas introduction shortage flag Fs is set when it is realized that the EGR device is under the exhaust gas introduction shortage state and is reset when it is not realized that the EGR device is under the exhaust gas introduction shortage state. When it is judged that Fs=1 at the step 561, the routine proceeds to the step 562. On the other hand, when it is judged that Fs=1 at the step 561, the routine proceeds to the step 563.

When the routine proceeds to the step 562, it is judged if an EGR control flag Fegr is set (Fegr=1). This EGR control flag Fegr is set when the EGR control starts and is reset when the EGR control stops. When it is judged that Fegr=1 at the step 562, the routine proceeds to the step 563. On the other hand, when it is not judged that Fegr=1 at the step 562, the routine proceeds to the step 567.

When the routine proceeds to the step 563, the sub learning amendment coefficient Kqsg memorized at the step 565 at the last performance of this routine is acquired. Next, at the step 564, an instant downstream air-fuel ratio deviation ΔAFd is calculated by applying the target air-fuel ratio AFt and the downstream air-fuel ratio AFd acquired at the step 560 to the above formula 7. Next, at the step 565, a new sub learning amendment coefficient Kqsg is calculated by applying the sub learning amendment coefficient Kqsg acquired at the step 563 and the instant air-fuel ratio deviation ΔAFd calculated at the step 565 to the above formula 8 and this calculated sub learning amendment coefficient Kqsg is memorized as an updated sub learning amendment coefficient in the electronic control device. That is, thereby, the sub learning amendment coefficient is updated. Next, at the step 566, a new sub FB amendment coefficient Kqs is calculated by applying the instant downstream air-fuel ratio deviation ΔAFd calculated at the step 564 and the sub learning amendment coefficient Kqsg calculated at the step 565 to the above formula 9 and then, the routine terminates.

When the routine proceeds to the step 567, if this time routine is not one performed next to the routine performing the step 575, it is judged if the learning of the currently calculated sub learning amendment coefficient Kqsg is completed (i.e., it is judged if the currently calculated sub learning amendment coefficient corresponds to the stationary air-fuel ratio deviation compensation value at the EGR control being not performed) or if this time routine is one performed next to the routine performing the step 575, it is judged if the learning of the continuous sub learning amendment coefficient Kqsgc memorized at the step 575 at the last performance of this routine is completed (i.e., it is judged if the continuous sub learning amendment coefficient corresponds to the stationary air-fuel ratio deviation compensation value at the EGR control being not performed). In this regard, when it is judged that the learning of the currently calculated sub learning amendment coefficient Kqsg completed or when it is judged that the learning of the continuous sub learning amendment coefficient Kqsgc memorized at the step 575 at the last performance of this routine is completed, the routine proceeds to the step 568. On the other hand, when it is judged that the learning of the currently calculated sub learning amendment coefficient Kqsg has not been completed or when it is judged that the learning of the continuous sub learning amendment coefficient Kqsgc memorized at the step 575 at the last performance of this routine has not been completed, the routine proceeds to the step 572.

When it is judged at the step 567 that the learning of the currently calculated sub learning amendment coefficient Kqsg is completed and then, the routine proceeds to the step 568, the currently calculated sub learning amendment coefficient Kqsg is acquired and on the other hand, when it is judged at the step 567 that the learning of the continuous sub learning amendment coefficient Kqsgc memorized at the step 575 at the last performance of this routine is completed and then, the routine proceeds to the step 568, the continuous sub learning amendment coefficient Kqsgc memorized at the step 575 at the last performance of this routine is acquired as the sub learning amendment coefficient Kqsg. Next, at the step 569, an instant downstream air-fuel ratio deviation ΔAFd is calculated by applying the target air-fuel ratio AFt and the downstream air-fuel ratio AFd acquired at the step 560 to the above formula 7. Next, at the step 570, a new sub learning amendment coefficient Kqsg is calculated by applying the sub learning amendment coefficient Kqsg acquired at the step 568 and the instant downstream air-fuel ratio deviation ΔAFd calculated at the step 569 to the above formula 8 and then, this calculated sub learning amendment coefficient Kasg is memorized as an updated sub learning amendment coefficient Kqsg in the electronic control unit. That is, thereby, the sub learning amendment coefficient is updated. Next, at the step 571, a new sub FB amendment coefficient Kqs is calculated by applying the instant downstream air-fuel ratio deviation ΔAFd calculated at the step 569 and the sub learning amendment coefficient Kqsg calculated at the step 570 and then, the routine terminates.

When the routine which has proceeded form the step 561 to the step 563 or from the step 572 to the step 563 or from the step 567 to the step 568 first proceeds to the step 572, the sub learning amendment coefficient Kqsgn is acquired as the sub learning amendment coefficient kqsg and otherwise, the transient sub learning amendment Kqsgk memorized at the step 574 at the last performance of this routine is acquired as the sub learning amendment coefficient Kqsg. Next, at the step 573, an instant downstream air-fuel ratio deviation ΔAFd is calculated by applying the target air-fuel ratio AFt and the downstream air-fuel ratio AFd acquired at the step 560 to the above formula 7. Next, a new sub learning amendment coefficient Kqsg is calculated by applying the sub learning amendment coefficient Kqsg acquired at the step 572 and the instant downstream air-fuel ratio deviation ΔAFd calculated at the step 573 to the above formula 8 and then, this sub learning amendment coefficient Kqsg is memorized as an updated transient sub learning amendment coefficient Kqsg in the electronic control unit. That is, thereby, the sub learning amendment coefficient is updated. Next, at the step 575, when the routine having proceeded from the step 561 to the step 563 or from the step 562 to the step 563 first proceeds to the step 575, a new continuous sub learning amendment coefficient Kqsgc is calculated by applying the sub learning amendment coefficient Kqsg memorized at the step 565 and the instant downstream air-fuel ratio deviation ΔAFd calculated at the step 573 at the last performance of this routine to the above formula 8 and then, this calculated continuous sub learning amendment coefficient Kqsgc is memorized as a new continuous sub learning amendment coefficient Kqsgc in the electronic control unit. On the other hand, at the step 575, when the routine having proceeded from the step 567 to the step 568 first proceeds to the step 575, a new continuous sub learning amendment coefficient Kqsgc is calculated by applying the sub learning amendment coefficient Kqsg memorized at the step 570 and the instant downstream air-fuel ratio deviation ΔAFd calculated at the step 573 at the last performance of this routine to the above formula 8 and then, this calculated continuous sub learning amendment coefficient Kqsgc is memorized as a new continuous sub learning amendment coefficient Kqsgc in the electronic control unit. Otherwise, at the step 575, a new continuous sub learning amendment coefficient Kqsgc is calculated by applying the sub learning amendment coefficient Kqsg calculated at the step 575 and the instant downstream air-fuel ratio deviation ΔAFd calculated at the step 573 at the last performance of this routine to the above formula 8 and then, this calculated continuous sub learning amendment coefficient Kqsgc is memorized as a new continuous sub learning amendment coefficient Kqsgc in the electronic control unit. That is, thereby, the continuous sub learning amendment coefficient is updated. Next, at the step 576, a new sub FB amendment coefficient Kqs is calculated by applying the instant downstream air-fuel ratio deviation ΔAFd calculated at the step 573 and the sub learning amendment coefficient Kqsg calculated at the step 574 and then, the routine terminates.

Next, a sixth embodiment will be explained. It should be noted that the constitution and control of the sixth embodiment which are not explained below are the same as those of the above-explained embodiment or are ones obviously derived from the technical concept of the invention embodied in the sixth embodiment. In the sixth embodiment, when it is realized that the EGR device is under the exhaust gas introduction shortage state and the EGR control is performed in the fifth embodiment, a predetermined correction (hereinafter, this correction will be referred to as—correction under the exhaust gas introduction shortage state—) is applied to the acquired base air-fuel ratio and then, the corrected base air-fuel ratio is set as the target air-fuel ratio while the EGR control is stopped.

According to the sixth embodiment, the following effects can be obtained. That is, as explained above, when the EGR device is under the exhaust gas introduction shortage state, in the case that the air-fuel ratio of the mixture gas is controlled by the feedback control under the EGR control being stopped, there is a high possibility that the exhaust emission property is maintained high, compared with the case that the air-fuel ratio of the mixture gas is controlled by the feedback control under the EGR control being performed. In the sixth embodiment, when it is realized that the EGR device is under the exhaust gas introduction shortage state and the EGR control is performed, the EGR control is stopped and therefore, the calculation of the main and sub learning amendment coefficients continues under the EGR control being stopped. Thus, according to the sixth embodiment, the effect that the exhaust emission property is maintained can be obtained.

It should be noted that for example, the routine shown in FIG. 16 can be employed as the routine for performing the setting of the target air-fuel ratio according to the sixth embodiment, the routine shown in FIGS. 17 and 18 can be employed as the routine for performing the calculation of the main FB amendment coefficient according to the sixth embodiment and the routine shown in FIGS. 19 and 20 can be employed as the routine for performing the calculation of the sub FB amendment coefficient according to the sixth embodiment.

Next, an example of the method for judging if the EGR device is under the exhaust gas introduction shortage state in the above-explained embodiments will be explained. It should be noted that in the following explanation, "crank angle" means—rotation angle of the crank shaft—, "first cylinder" means—lowermost combustion chamber in FIG. 1—, "fourth cylinder" means—uppermost combustion chamber in FIG. 1—, "second cylinder" means—combustion chamber immediately above the first cylinder in FIG. 1—and "third cylinder" means—combustion chamber immediately below the fourth cylinder in FIG. 1—.

In the engine of the above-explained embodiments, the exhaust stroke is performed sequentially in the first, fourth, third and second cylinders #1, #2, #3 and #4 in order every the crank angle 180 degrees. Therefore, the exhaust gas is discharged sequentially from the combustion chambers every crank angle 180 degree and then, the exhaust gas reaches sequentially the upstream air-fuel ratio sensor. Therefore, in general, the upstream air-fuel ratio sensor sequentially detects the air-fuel ratio of the exhaust gas discharged from the first, fourth, third and second cylinders #1, #4, #3 and #2 in order.

In this regard, according to the air-fuel ratio of the above-explained embodiments, in order to control the air-fuel ratio of the mixture gas formed in each of the combustion chambers, as a result, the air-fuel ratio of the mixture gas formed in each of the combustion chambers is entirely controlled by the feedback control to the stoichiometric air-fuel ratio since the air-fuel ratio of the mixture gas formed in each of the combustion chambers becomes richer and leaner than the stoichiometric air-fuel ratio. Thus, when all fuel injectors are under the normal state, as shown in FIG. 21(A), the output value output from the upstream air-fuel ratio sensor (hereinafter, this output value will be referred to as—upstream air-fuel ratio sensor output value—) changes up and down with a relatively small range around the upstream air-fuel ratio sensor output value corresponding to the stoichiometric air-fuel ratio.

On the other hand, when the fuel injector corresponding to the first cylinder #1 has an error that the fuel having an amount larger than the command fuel injection amount is injected and the fuel injectors corresponding to the remaining cylinders #2-#4 are under the normal state, the upstream air-fuel ratio sensor output value changes as shown in FIG. 21(B). That is, the air-fuel ratio of the mixture gas formed in the first cylinder #1 corresponding to the malfunctioning fuel injector is largely richer than the stoichiometric air-fuel ratio and therefore, the air-fuel ratio of the exhaust gas discharged from the first cylinder #1 is also largely richer than the stoichiometric air-fuel ratio. Thus, when the exhaust gas discharged from the first cylinder #1 reaches the upstream air-fuel ratio sensor, the upstream air-fuel ratio sensor output value rapidly decreases toward the output value corresponding to the air-fuel ratio of the exhaust gas discharged from the first cylinder #1 (i.e., the air-fuel ratio largely richer than the stoichiometric air-fuel ratio). Then, according to the air-fuel ratio control of the above-explained embodiments, when the upstream air-fuel ratio sensor output value becomes the output value corresponding to the air-fuel ratio largely richer than the stoichiometric air-fuel ratio (i.e., when the upstream air-fuel ratio sensor detects the air-fuel ratio largely richer than the stoichiometric air-fuel ratio), the fuel injection amount is largely decreased in all fuel injectors and therefore, the air-fuel ratio of the mixture gas formed in the fourth, third and second cylinders #4, #3 and #2 becomes largely leaner than the stoichiometric air-fuel ratio. Therefore, when the exhaust gas discharged from the fourth to second cylinders #4 to #2 reaches the upstream air-fuel ratio sensor, the upstream air-fuel ratio sensor output value rapidly increases toward the output value corresponding to the air-fuel ratio of the exhaust gas discharged from the cylinder #4 to #2 (i.t. the air-fuel ratio largely leaner than the stoichiometric air-fuel ratio). Then, according to the air-fuel ratio control of the above-explained embodiments, when the upstream air-fuel ratio sensor output value becomes the output value corresponding to the air-fuel ratio leaner than the stoichiometric air-fuel ratio (i.e., the upstream air-fuel ratio sensor detects the air-fuel ratio leaner than the stoichiometric air-fuel ratio), the fuel injection amount is increased in all fuel injectors and therefore, the air-fuel ratio of the mixture gas formed in the first cylinder #1 becomes largely richer than the stoichiometric air-fuel ratio, again. Thus, when a certain particular fuel injector has an error that the fuel having an amount larger than the command fuel injection amount is injected, as shown in FIG. 21(B), the upstream air-fuel ratio sensor output value changes up and down with a relatively large range around the output value corresponding to the stoichiometric air-fuel ratio.

On the other hand, when the fuel injector corresponding to the first cylinder #1 has an error that the fuel having an amount smaller than the command fuel injection amount is injected and the fuel injectors corresponding to the remaining cylinder #2 to #4 are under the normal state, the upstream air-fuel ratio sensor output value changes as shown in FIG. 21(C). That is, the air-fuel ratio of the mixture gas formed in the first cylinder #1 corresponding to the malfunctioning fuel injector is largely leaner than the stoichiometric air-fuel ratio and therefore, the air-fuel ratio of the exhaust gas discharged from the first cylinder #1 is also largely leaner than the stoichiometric air-fuel ratio. Thus, when the exhaust gas discharged from the first cylinder #1 reaches the upstream air-fuel ratio sensor, the upstream air-fuel ratio sensor output value rapidly increases toward the output value corresponding to the air-fuel ratio of the exhaust gas discharged from the first cylinder #1 (i.e., the air-fuel ratio largely leaner than the stoichiometric air-fuel ratio). Then, according to the air-fuel ratio control of the above-explained embodiments, when the upstream air-fuel ratio sensor output value becomes the output value corresponding to the air-fuel ratio largely leaner than the stoichiometric air-fuel ratio (i.e., the upstream air-fuel ratio sensor detects the air-fuel ratio largely leaner than the stoichiometric air-fuel ratio), the fuel injection amount is largely increased in all fuel injectors and therefore, the air-fuel ratio of the mixture gas formed in the fourth, third and second cylinders #4, #3 and #2 becomes largely richer than the stoichiometric air-fuel ratio. Thus, when the exhaust gas discharged from the fourth to second cylinders #4 to #2 reaches the upstream air-fuel ratio, the upstream air-fuel ratio sensor output value largely decreases toward the output value corresponding to the air-fuel ratio of the exhaust gas discharged from the cylinders #4 to #2 (i.e., the air-fuel ratio largely richer than the stoichiometric air-fuel ratio). Then, according to the air-fuel ratio control of the above-explained embodiments, when the upstream air-fuel ratio sensor output value becomes the output value corresponding to the air-fuel ratio richer than the stoichiometric air-fuel ratio (i.e., the upstream air-fuel ratio sensor detects the air-fuel ratio richer than the stoichiometric air-fuel ratio), the fuel injection amount is decreased in all fuel injectors and therefore, the air-fuel ratio of the mixture gas formed in the first cylinder #1 becomes largely leaner than the stoichiometric air-fuel ratio, again. Thus, when a certain particular fuel injector has an error that the fuel having an amount larger than the command fuel injection amount is injected, as shown in FIG. 21(C), the upstream air-fuel ratio sensor output value changes up and down with a relatively large range around the output value corresponding to the stoichiometric air-fuel ratio.

As explained above, the change of the upstream air-fuel ratio sensor output value when a certain particular fuel injector has a malfunction is largely different from that when all fuel injectors are under the normal state.

In particular, in the case that all fuel injectors are under the normal state, as shown in FIG. 21(A), when the upstream air-fuel ratio sensor output value decreases along with the change of the air-fuel ratio of the exhaust gas reaching the upstream air-fuel ratio sensor toward the rich side, the average inclination of the line of the change of the upstream air-fuel ratio sensor output value (hereinafter, this average inclination will be simply referred to as—inclination—) is a relatively small inclination alpha1. On the other hand, when the upstream air-fuel ratio sensor output value increases along with the change of the air-fuel ratio of the exhaust gas reaching the upstream air-fuel ratio sensor toward the lean side, the average inclination of the line of the change of the upstream air-fuel ratio sensor output value (hereinafter, this average inclination will be also simply referred to as—inclination—) is a relatively small inclination alpha2. Then, in this case, the absolute value of the inclination alpha1 is generally equal to that of the inclination alpha2.

On the other hand, in the case that a certain particulate fuel injector has a malfunction that the fuel having an amount larger than the command fuel injection amount is injected, as shown in FIG. 21(B), when the upstream air-fuel ratio sensor output value decreases along with the change of the air-fuel ratio of the exhaust gas reaching the upstream air-fuel ratio sensor toward the rich side, the inclination of the line of the change of the upstream air-fuel ratio sensor output value is a relatively large inclination alpha3. On the other hand, when the upstream air-fuel ratio sensor output value increases along with the change of the air-fuel ratio of the exhaust gas reaching the upstream air-fuel ratio sensor toward the lean side, the inclination of the line of the change of the upstream air-fuel ratio sensor output value is a relatively large inclination alpha4. Then, in this case, the absolute value of the inclination alpha3 is slightly larger than that of the inclination alpha4.

On the other hand, in the case that a certain particular fuel injector has a malfunction that the fuel having an amount smaller than the command fuel injection amount is injected, as shown in FIG. 21(C), when the upstream air-fuel sensor output value increases along with the change of the air-fuel ratio of the exhaust gas reaching the upstream air-fuel ratio sensor toward the lean side, the inclination of the line of the change of the upstream air-fuel ratio sensor output value is a relatively large inclination alpha5. On the other hand, when the upstream air-fuel ratio sensor output value decreases along with the change of the air-fuel ratio of the exhaust gas reaching the upstream air-fuel ratio sensor toward the rich side, the inclination of the line of the change of the upstream air-fuel ratio sensor output value is a relatively large inclination alpha6. Then, in this case, the absolute value of the inclination alpha5 is slightly larger than that of the inclination alpha6.

Figure 21:
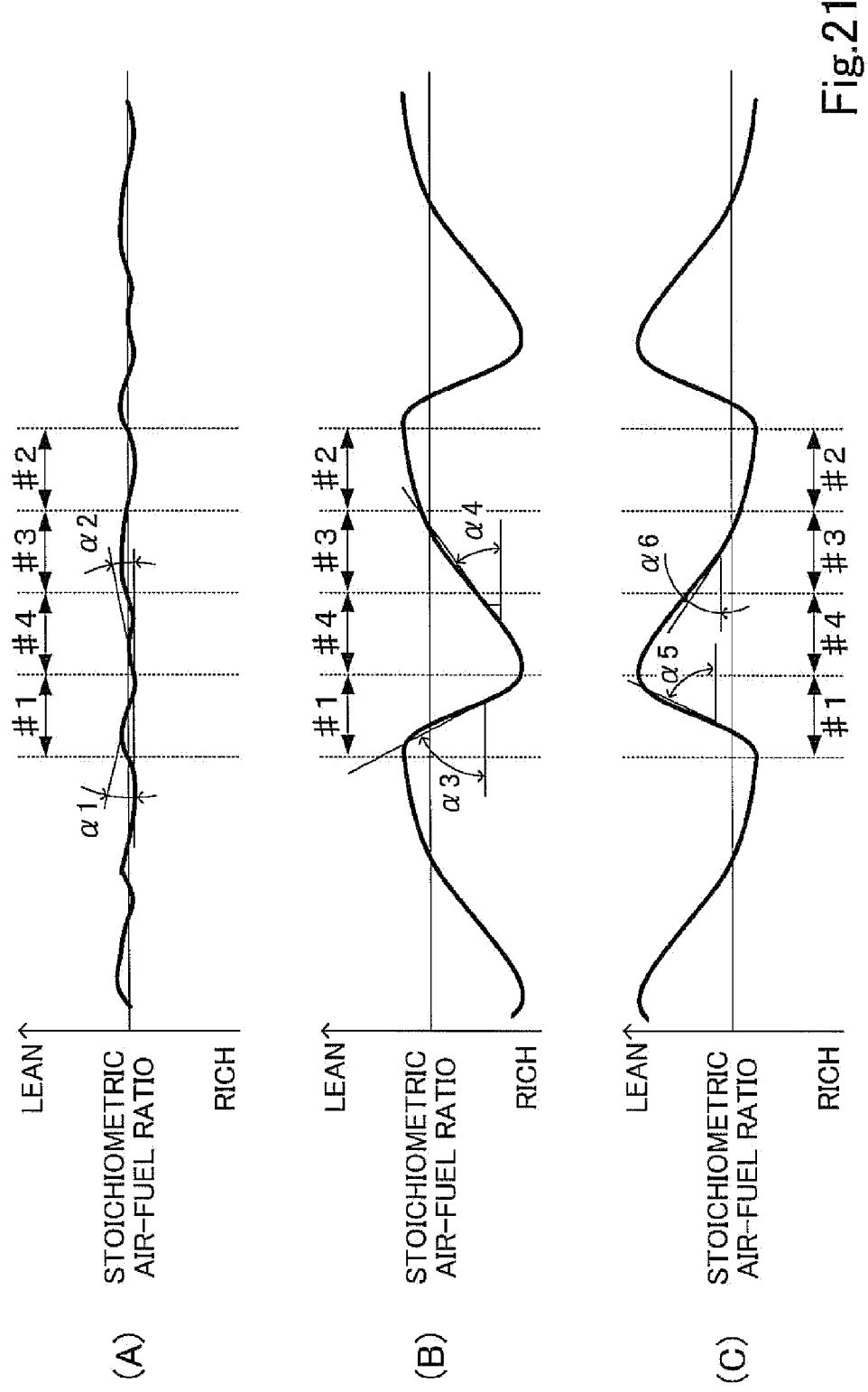
FIG. 21(A) is a view showing a movement of an output value from an upstream air-fuel ratio sensor when an air-fuel ratio of a mixture gas is controlled to a stoichiometric air-fuel ratio by a feedback control and all of the fuel injectors are under a normal state.
FIG. 21(B) is a view showing a movement of the output value from the upstream air-fuel ratio sensor when the air-fuel ratio of the mixture gas is controlled to the stoichiometric air-fuel ratio by the feedback control, the injector corresponding to a first cylinder #1 is under an abnormal state in which a fuel of an amount larger than a command fuel injection amount is injected and the remaining injector are under the normal state.
FIG. 21(C) is a view showing a movement of the output value from the upstream air-fuel ratio sensor when the air-fuel ratio of the mixture gas is controlled to the stoichiometric air-fuel ratio by the feedback control, the injector corresponding to the first cylinder #1 is under an abnormal state in which the fuel of an amount smaller than the command fuel injection amount is injected and the remaining injectors are under the normal state.

Therefore, it should be able to be judged if all fuel injectors are under the normal state, or if a certain particular fuel injector has a malfunction that the fuel having an amount smaller than the command fuel injection value is injected, or if a certain particular fuel injector has a malfunction that the fuel having an amount larger than the command fuel injection value is injected, for example, depending on whether the absolute value of the inclination (in FIG. 21, the inclinations alpha1, alpha2 and alpha3) of the line of the decreasing upstream air-fuel ratio sensor output value (hereinafter, this line will be referred to as—decrease line—) is larger than that of the inclination (in FIG. 21, the inclination alpha1) of the line of the decreasing upstream air-fuel ratio sensor output value when all fuel injectors are under the normal state (hereinafter, this line will be referred to as—normal decrease line—), or depending on whether the absolute value of the inclination (in FIG. 21, the inclinations alpha2, alpha4 and alpha5) of the line of the increasing upstream air-fuel ratio sensor output value (hereinafter, this line will be referred to as—increase line—) is larger than that of the inclination (in FIG. 21, the inclination alpha2) of the line of the increasing upstream air-fuel ratio sensor output value when all fuel injectors are under the normal state (hereinafter, this line will be referred to as—normal increase line), or depending on whether the absolute value of the inclination of the decrease line (in FIG. 21, the inclinations alpha1, alpha3 and alpha6) is larger than that of the inclination of the increase line (in FIG. 21, the inclinations alpha2, alpha4 and alpha5). That is, it should be able to be judged if the between-cylinder air-fuel ratio imbalance state occurs.

In regard, even when all fuel injector is under the normal state, if the EGR device is under the exhaust gas introduction shortage state, the amount of the exhaust gas introduced into a certain particular combustion chamber is smaller than that introduced into the remaining combustion chambers and therefore, the air-fuel ratio of the mixture gas formed in the particular combustion chamber is larger than that formed in the remaining combustion chamber (i.e., is the lean air-fuel ratio). In this case, the upstream air-fuel ratio sensor output value changes along a line similar to that of the upstream air-fuel ratio sensor output value when a certain particular fuel injector has a malfunction that the fuel having an amount smaller than the command fuel injection amount is injected (i.e., the line shown in FIG. 21(C)). Thus, even if the absolute value of the inclination of the increase line (the inclination alpha5 shown in FIG. 21) is larger than that of the inclination of the normal increase line (the inclination alpha2 shown in FIG. 21), the absolute value of the inclination of the decrease line (the inclination alpha6 shown in FIG. 21) is larger than that of the inclination of the normal decrease inclination (the inclination alpha 1 shown in FIG. 21), and the absolute value of the increase line (the inclination alpha5 shown in FIG. 21) is larger than that of the inclination of the decrease line (the inclination alpha6 shown in FIG. 21), it cannot be concluded that the between-cylinder air-fuel ratio imbalance state occurs.

In this method, the inclination of the increase line when the EGR control is performed (hereinafter, this increase line will be referred to as—increase line at the EGR control being performed—) and the inclination of the increase line when the EGR control is not performed (hereinafter, this increase line will be referred to as—increase line at the EGR control being not performed) are acquired. Then, when the absolute values of the inclinations of the increase lines at the EGR control being and not being performed are equal or generally equal to each other, not depending on whether the EGR control is performed or not, there is no change or almost no change in the absolute value of the inclination of the increase line and therefore, in this case, it is judged that the EGR device is not under the exhaust gas introduction shortage state. Then, the inclinations of the increase and decrease lines are further acquired when the EGR control is performed (or when the EGR control is not performed). Then, when the absolute value of the inclination of the increase line is larger than that of the normal increase line or the absolute value of the inclination of the decrease line is larger than that of the normal decrease line and the absolute value of the inclination of the increase line is larger than that of the decrease line, it is judged that the between-cylinder air-fuel ratio imbalance state occurs. Concretely, it is judged that a certain particular fuel injector has a malfunction that the fuel having an amount smaller than the command fuel injection amount is injected. On the other hand, also when the absolute value of the inclination of the increase line is larger than that of the normal increase line or the absolute value of the inclination of the decrease line is larger than that of the normal decrease line and the absolute value of the inclination of the increase line is smaller than that of the decrease line, it is judged that the between-cylinder air-fuel ratio imbalance state occurs. Concretely, it is judged that a certain particular fuel injector has a malfunction that the fuel having an amount larger than the command fuel injection value is injected. Obviously, when the absolute value of the inclination of the increase line is equal or generally equal to that of the normal increase line or the absolute value of the inclination of the decrease line is equal or generally equal to that of the normal decrease line, it is judged that the between-cylinder air-fuel ratio imbalance state does not occur and when the absolute value of the inclination of the increase line is equal or generally equal to that of the decrease line, it is judged that the between-cylinder air-fuel ratio imbalance state does not occur.

On the other hand, when the absolute values of the inclinations of the increase lines at the EGR control being performed are larger than the inclinations of the increase lines at the EGR control being not performed, the absolute value of the inclination of the increase line becomes larger due to the operation of the EGR control (i.e., there is something wrong with the operation of the EGR device when the EGR control is being performed). Therefore, in this case, it is judged that the EGR device is under the exhaust gas introduction shortage state.

Otherwise, in this method, the inclination of the decrease line when the EGR control is performed (hereinafter, this decrease line will be referred to as—decrease line at the EGR control being performed—) and the inclination of the decrease line when the EGR control is not performed (hereinafter, this decrease line will be referred to as—decrease line at the EGR control not being performed) are acquired. Then, the absolute values of the inclinations of the decrease lines at the EGR control being and not being performed are equal or generally equal to each other, not depending on whether the EGR control is performed or not, there is no change or almost no change in the absolute value of the inclination of the decrease line and therefore, in this case, it is judged that the EGR device is not under the exhaust gas introduction shortage state. Then, when the EGR control is performed (or when the EGR control is not performed) the inclinations of the increase and decrease lines are acquired. Then, when the absolute value of the inclination of the increase line is larger than that of the normal increase line or the absolute value of the inclination of the decrease line is larger than that of the normal decrease line and the absolute value of the inclination of the increase line is larger than that of the decrease line, it is judged that the between-cylinder air-fuel ratio imbalance state occurs. Concretely, it is judged that a certain particular fuel injector has a malfunction that the fuel having an amount smaller than the command fuel injection amount is injected. On the other hand, also when the absolute value of the inclination of the increase line is larger than that of the normal increase line or the absolute value of the inclination of the decrease line is larger than that of the normal decrease line and the absolute value of the inclination of the increase line is smaller than that of the decrease line, it is judged that the between-cylinder air-fuel ratio imbalance state occurs. Concretely, it is judged that a certain particular fuel injector has a malfunction that the fuel having an amount larger than the command fuel injection amount is injected. Obviously, when the absolute value of the inclination of the increase line is equal or generally equal to that of the normal increase line or the absolute value of the inclination of the decrease line is equal or generally equal to that of the normal decrease line, it is judged that no between-cylinder air-fuel ratio imbalance state occurs or when the absolute value of the inclination of the increase line is equal or generally equal to that of the decrease line, it is judged that no between-cylinder air-fuel ratio imbalance occurs.

On the other hand, when the absolute value of the inclination of the decrease line at the EGR control being performed is larger than that at the EGR control not being performed, the absolute value of the inclination increases due to the performance of the EGR control (i.e., the EGR device has an error in its operation when the EGR control is performed) and therefore, in this case, it is judged that the EGR device is under the exhaust gas introduction shortage.

It should be noted that in the above-explained method, it is judged if the EGR device is under the exhaust gas introduction shortage state, using the inclinations of the increase lines at the EGR control being and not being performed or using the inclinations of the decrease lines at the EGR control being and not being performed. However, according to the invention, it may be judged if the EGR device is under the exhaust gas introduction shortage state, using parameters obtained from the line of the upstream air-fuel ratio sensor output values when the EGR control is performed and is not performed.

Further, when the target air-fuel ratio is richer than the stoichiometric air-fuel ratio, the change of the upstream air-fuel ratio sensor output value corresponding to that shown in FIG. 21(A) is the change shown in FIG. 22(A), the change of the upstream air-fuel ratio sensor output value corresponding to that shown in FIG. 21(B) is the change shown in FIG. 22(B) and the change of the upstream air-fuel ratio sensor output value shown in FIG. 21(C) is the change shown in FIG. 22(C). That is, the line of the upstream air-fuel ratio sensor output value when the target air-fuel ratio is richer than the stoichiometric air-fuel ratio has the same shape as that when the target air-fuel ratio is the stoichiometric air-fuel ratio, except that it moves entirely toward the rich side relative to the line of the upstream air-fuel ratio sensor output value when the target air-fuel ratio is the stoichiometric air-fuel ratio. Therefore, the above-explained method can be used as a method for judging if the between-cylinder air-fuel ratio imbalance state occurs or if the EGR device is under the exhaust gas introduction shortage state when the target air-fuel ratio is richer than the stoichiometric air-fuel ratio.

Further, the line of the upstream air-fuel ratio sensor output value when the target air-fuel ratio is leaner than the stoichiometric air-fuel ratio (not shown) has the same shape as that when the target air-fuel ratio is the stoichiometric air-fuel ratio, except that it moves entirely toward the lean side relative to the line of the upstream air-fuel ratio sensor output value when the target air-fuel ratio is the stoichiometric air-fuel ratio. Therefore, the above-explained method can be used as a method for judging if the between-cylinder air-fuel ratio imbalance state occurs or the EGR device is under the exhaust gas introduction shortage state when the target air-fuel ratio is leaner than the stoichiometric air-fuel ratio.

By employing this method, it can be exactly judged if the EGR device is under the exhaust gas introduction shortage state and it can be exactly judged if the between-cylinder air-fuel ratio imbalance state occurs. Further, when it is judged that the between-cylinder air-fuel ratio imbalance state occurs, the exhaust emission property is maintained further high by amending the target fuel injection amount regarding to each of the fuel injectors so as to dissolve the between-cylinder air-fuel ratio imbalance state.

It should be noted that in the case that the above-explained method is employed, when it is judged that the between-cylinder air-fuel ratio imbalance state occurs and after the between-cylinder air-fuel ratio imbalance state is dissolved depending on the result of this judgment, it is realized that the EGR device is under the exhaust gas introduction shortage state, the degree of the correction, that is, the amount of the correction relative to the base air-fuel ratio by the first or second correction under the exhaust gas introduction shortage state may be, for example, an amount determined depending on the degree of the variation occurring between the fuel injection amounts regarding each of the fuel injectors.

Further, the above-explained embodiment is an embodiment obtained by applying the invention to the spark ignition type internal combustion engine. However, the invention can be applied to the compression self-ignition type internal combustion engine (so-called diesel engine).

The invention claimed is:

1. An air-fuel ratio control device of an internal combustion engine, comprising a plurality of exhaust gas introduction means for independently introducing into each combustion chamber an exhaust gas discharged from combustion chambers to an exhaust passage, wherein when at least one of the exhaust gas introduction means is under an exhaust gas introduction shortage state in which an amount of the exhaust gas which can be introduced into the corresponding combustion chamber is smaller than a target amount thereof, a target value of an air-fuel ratio of a mixture gas formed in the combustion chamber is changed depending on whether an exhaust gas introduction control for introducing the exhaust gas into the combustion chamber by the exhaust gas introduction means is performed.

2. The air-fuel ratio control device of the internal combustion engine as set forth in claim 1, wherein when at least one of the exhaust gas introduction means is under the exhaust gas introduction shortage state and the exhaust gas introduction control is performed, the performance of the exhaust gas introduction control is stopped.

3. An air-fuel ratio control device of an internal combustion engine, comprising a plurality of exhaust gas introduction means for independently introducing into each combustion chamber an exhaust gas discharged from combustion chambers to an exhaust passage, wherein when at least one of the exhaust gas introduction means is under an exhaust gas introduction shortage state in which an amount of the exhaust gas which can be introduced into the corresponding combustion chamber is smaller than a target amount thereof and an exhaust gas introduction control for introducing the exhaust gas into the combustion chamber by the exhaust gas introduction means is performed, an air-fuel ratio of a mixture gas formed in the combustion chamber is controlled by changing a target value of the air-fuel ratio of the mixture gas, and wherein when at least one of the exhaust gas introduction means is under the exhaust gas introduction shortage state and the exhaust gas introduction control is not performed, the air-fuel ratio of the mixture gas is controlled using an amendment coefficient obtained when all of the exhaust gas introduction means are not under the exhaust gas introduction shortage state without changing the target value of the air-fuel ratio of the mixture gas.

4. The air-fuel ratio control device of the internal combustion engine as set forth in claim 3, wherein when at least one of the exhaust gas introduction means is under the exhaust gas introduction shortage state and the exhaust gas introduction control is performed, the performance of the exhaust gas introduction control is stopped.

5. An air-fuel ratio control device of an internal combustion engine, comprising a plurality of exhaust gas introduction means for independently introducing into each combustion chamber an exhaust gas discharged from combustion chambers to an exhaust passage, wherein when at least one of the exhaust gas introduction means is under an exhaust gas introduction shortage state in which an amount of the exhaust gas which can be introduced into the corresponding combustion chamber is smaller than a target amount thereof and an exhaust gas introduction control for introducing the exhaust gas into the combustion chamber by the exhaust gas introduction means is performed, an air-fuel ratio of a mixture gas formed in the combustion chamber is controlled by changing a target value of the air-fuel ratio of the mixture gas, wherein when at least one of the exhaust gas introduction means is under the exhaust gas introduction shortage state, the exhaust gas introduction control is not performed, and an amendment coefficient for amending the air-fuel ratio of the mixture gas to control the air-fuel ratio of the mixture gas to the target value thereof is a value for compensating a stationary deviation of the air-fuel ratio, the air-fuel ratio is controlled using the amendment coefficient without changing the target value of the air-fuel ratio of the mixture gas, and wherein when at least one of the exhaust gas introduction means is under the exhaust gas introduction shortage state, the exhaust gas introduction control is not performed and the amendment coefficient is not a value for compensating a stationary deviation of the air-fuel ratio, the air-fuel ratio of the mixture gas is controlled using the amendment coefficient obtained when all of the exhaust gas introduction means are not under the exhaust gas introduction shortage state without changing the target value of the air-fuel ratio of the mixture gas.

6. The air-fuel ratio control device of the internal combustion engine as set forth in claim 5, wherein when at least one of the exhaust gas introduction means is under the exhaust gas introduction shortage state and the exhaust gas introduction control is performed, the performance of the exhaust gas introduction control is stopped.

7. An air-fuel ratio control device of an internal combustion engine, comprising a plurality of exhaust gas introduction devices for independently introducing into each combustion chamber an exhaust gas discharged from combustion chambers to an exhaust passage, wherein when at least one of the exhaust gas introduction devices is under an exhaust gas introduction shortage state in which an amount of the exhaust gas which can be introduced into the corresponding combustion chamber is smaller than a target amount thereof, a target value of an air-fuel ratio of a mixture gas formed in the combustion chamber is changed depending on whether an exhaust gas introduction control for introducing the exhaust gas into the combustion chamber by the exhaust gas introduction devices is performed.

8. The air-fuel ratio control device of the internal combustion engine as set forth in claim 7, wherein when at least one of the exhaust gas introduction devices is under the exhaust gas introduction shortage state and the exhaust gas introduction control is performed, the performance of the exhaust gas introduction control is stopped.

9. An air-fuel ratio control device of an internal combustion engine, comprising a plurality of devices for independently introducing into each combustion chamber an exhaust gas discharged from combustion chambers to an exhaust passage, wherein when at least one of the exhaust gas introduction devices is under an exhaust gas introduction shortage state in which an amount of the exhaust gas which can be introduced into the corresponding combustion chamber is smaller than a target amount thereof and an exhaust gas introduction control for introducing the exhaust gas into the combustion chamber by the exhaust gas introduction devices is performed, an air-fuel ratio of a mixture gas formed in the combustion chamber is controlled by changing a target value of the air-fuel ratio of the mixture gas, and wherein when at least one of the exhaust gas introduction device is under the exhaust gas introduction shortage state and the exhaust gas introduction control is not performed, the air-fuel ratio of the mixture gas is controlled using an amendment coefficient obtained when all of the exhaust gas introduction devices are not under the exhaust gas introduction shortage state without changing the target value of the air-fuel ratio of the mixture gas.

10. The air-fuel ratio control device of the internal combustion engine as set forth in claim 9, wherein when at least one of the exhaust gas introduction devices is under the exhaust gas introduction shortage state and the exhaust gas introduction control is performed, the performance of the exhaust gas introduction control is stopped.

11. An air-fuel ratio control device of an internal combustion engine, comprising a plurality of devices for independently introducing into each combustion chamber an exhaust gas discharged from combustion chambers to an exhaust passage, wherein when at least one of the exhaust gas introduction devices is under an exhaust gas introduction shortage state in which an amount of the exhaust gas which can be introduced into the corresponding combustion chamber is smaller than a target amount thereof and an exhaust gas introduction control for introducing the exhaust gas into the combustion chamber by the exhaust gas introduction devices is performed, an air-fuel ratio of a mixture gas formed in the combustion chamber is controlled by changing a target value of the air-fuel ratio of the mixture gas, wherein when at least one of the exhaust gas introduction devices is under the exhaust gas introduction shortage state, the exhaust gas introduction control is not performed and an amendment coefficient for amending the air-fuel ratio of the mixture gas to control the air-fuel ratio of the mixture gas to the target value thereof is a value for compensating a stationary deviation of the air-fuel ratio, the air-fuel ratio is controlled using the amendment coefficient without changing the target value of the air-fuel ratio of the mixture gas, and wherein when at least one of the exhaust gas introduction devices is under the exhaust gas introduction shortage state, the exhaust gas introduction control is not performed and the amendment coefficient is not a value for compensating a stationary deviation of the air-fuel ratio, the air-fuel ratio of the mixture gas is controlled using the amendment coefficient obtained when all of the exhaust gas introduction devices are not under the exhaust gas introduction shortage state without changing the target value of the air-fuel ratio of the mixture gas.

12. The air-fuel ratio control device of the internal combustion engine as set forth in claim 11, wherein when at least one of the exhaust gas introduction devices is under the exhaust gas introduction shortage state and the exhaust gas introduction control is performed, the performance of the exhaust gas introduction control is stopped.

\* \* \* \* \*